United States Patent [19]
Gove et al.

[11] Patent Number: 5,651,127
[45] Date of Patent: Jul. 22, 1997

[54] GUIDED TRANSFERS WITH VARIABLE STEPPING

[75] Inventors: Robert J. Gove, Plano; Karl M. Guttag, Sugarland, both of Tex.; Keith Balmer, Bedford, England; Christopher J. Read, Houston, Tex.; Iain Robertson, Bedfordshire, England; Nicholas Ing Simmons, Huntingdon, England

[73] Assignee: Texas Instruments Incorporated, Dallas, Tex.

[21] Appl. No.: 209,123

[22] Filed: Mar. 8, 1994

[51] Int. Cl.$^6$ .............. G06F 91/26; G06F 12/00; G06F 9/34; G06F 12/14

[52] U.S. Cl. .............. 395/412; 395/421.03; 395/421.07; 395/421.02; 395/401

[58] Field of Search .................... 395/421, 250, 395/157, 375, 800, 412, 401, 421.07, 421.03; 364/518, 200

[56] References Cited

U.S. PATENT DOCUMENTS

| | | | |
|---|---|---|---|
| 4,639,765 | 1/1987 | D'Hont | 358/19 |
| 4,656,597 | 4/1987 | Bond et al. | 364/518 |
| 4,665,495 | 5/1987 | Thaden | 364/518 |
| 4,718,024 | 1/1988 | Guttag et al. | 364/518 |
| 4,769,640 | 9/1988 | Sato | 340/799 |
| 4,809,201 | 2/1989 | Keklak | 364/518 |
| 4,812,988 | 3/1989 | Duthutt et al. | 364/522 |
| 4,920,483 | 4/1990 | Pogue et al. | 364/200 |
| 5,077,678 | 12/1991 | Guttage et al. | 395/157 |
| 5,142,621 | 8/1992 | Guttag et al. | 395/164 |

(List continued on next page.)

FOREIGN PATENT DOCUMENTS

| | | | |
|---|---|---|---|
| 0378423 | 7/1990 | European Pat. Off. | G06F 13/28 |
| 2250615 | 6/1992 | United Kingdom | G06F 13/28 |
| WO81/02487 | 9/1981 | WIPO . | |
| WO92/02879 | 2/1992 | WIPO . | |

OTHER PUBLICATIONS

Microprocessor Report, Slater Michael, "TTT Ships Programmable Video Processor," vo. 5, No. 20, Oct. 30, 1991, pp. 1,6–7,13.

Sanjay Desai, "The Architecture of the LR33020 GraphX Processor: A MIPS–RISC Based X Terminal Controller", Nov. 10, 1992, pp. 205–208.

*Primary Examiner*—David K. Moore
*Assistant Examiner*—Than V. Nguyen
*Attorney, Agent, or Firm*—Robers D. Marshall, Jr.; James C. Kesterson; Richard L. Donaldson

[57] ABSTRACT

This invention is a manner of control of the addresses of memory accesses. The data processing device of this invention includes a memory, a control circuit, a guide table and an address generating circuit. The control circuit receives a packet transfer request and packet transfer parameters. The packet transfer parameters include a start address, a number of guide table entries and a table pointer. The guide table includes guide table entries, each guide table entry having an address value and dimension values defining a block of addresses. The table pointer initially points to a first guide table entry in the guide table. The address generating circuit forms a set of block of addresses for memory access corresponding to each guide table entry, having a start address from a predetermined combination of the start address and the address value of the guide table entry. The block of addresses are formed from the dimension values. Following the memory accesses, the address generating circuit updates the table pointer to point to a next entry in the guide table. The address generating circuit may optionally form the predetermined combination of starting address and address value of guide table entry by adding the address value to the prior block starting address or by adding the guide table value to the starting address. The memory access may be a memory read from the block of addresses or a memory write to the block of addresses. In the preferred embodiment, memory, a data processor and a data transfer controller performing the above memory accesses is constructed in a single semiconductor chip. The data transfer controller may access external memory in the same manner as on-chip memory.

24 Claims, 24 Drawing Sheets

U.S. PATENT DOCUMENTS

| | | | |
|---|---|---|---|
| 5,162,784 | 11/1992 | Guttag et al. | 340/724 |
| 5,165,103 | 11/1992 | Takada et al. | 382/56 |
| 5,197,140 | 3/1993 | Balmer | 395/400 |
| 5,212,777 | 5/1993 | Gove et al. | 395/375 |
| 5,226,125 | 7/1993 | Balmer et al. | 395/325 |
| 5,239,654 | 8/1993 | Simmons et al. | 395/800 |
| 5,283,863 | 2/1994 | Guttag et al. | 395/157 |
| 5,315,708 | 5/1994 | Eidler et al. | 395/250 |
| 5,317,333 | 5/1994 | Gottag et al. | 345/133 |

2-DIMENSIONAL IMAGE

| Memory Region | ADDRESSES FOR DIGP'S PARAMETER RAMS | ADDRESSES FOR MP'S PARAMETER RAM |
|---|---|---|
| GENERAL PURPOSE RAM DIGP: 1536BYTES MP: 1504BYTES | 0x0100#200 → 0x0100#7FF | 0x01010220 → 0x010107FF |
| INTERRUPT VECTORS DIGP: 128BYTES MP: 160BYTES | 0x0100#180 → 0x0100#1FF | 0x01010180 → 0x0101021F |
| 128BYTE BUFFER FOR EXTERNAL → EXTERNAL TRANSFERS | 0x0100#100 → 0x0100#17F | 0x01010100 → 0x0101017F |
| LINKED-LIST START ADDRESS | 0x0100#0FC → 0x0100#0FF | 0x010100FC → 0x010100FF |
| DMA/CACHE FAULT ADDR. (DIGP'S ONLY) | 0x0100#0F8 → 0x0100#0FB | N/A |
| RESERVED (120BYTES) | 0x0100#080 → 0x0100#0F7 | 0x01010080 → 0x010100F7 |
| SUSPENDED PACKET PARAMETERS (128BYTES) | 0x0100#000 → 0x0100#07F | 0x01010000 → 0x0101007F |

\# = DIGP NUMBER

FIG. 15

| WORD NO. | 31 ... 0 | BYTE ADDRESS |
|---|---|---|
| 1 | RESERVED | PT+60 |
| 0 | RESERVED | PT+56 |
| 1 | TRANSPARENCY WORD 1 | PT+52 |
| 0 * | TRANSPARENCY WORD 0 | PT+48 |
| 1 | DST BC PITCH | PT+44 |
| 0 | SRC BC PITCH | PT+40 |
| 1 | DST AB PITCH | PT+36 |
| 0 | SRC AB PITCH | PT+32 |
| 1 | DST C COUNT | PT+28 |
| 0 | SRC C COUNT | PT+24 |
| 1 | DST B COUNT \| DST A COUNT | PT+20 |
| 0 | SRC B COUNT \| SRC A COUNT | PT+16 |
| 1 | DST START ADDRESS | PT+12 |
| 0 | SRC START ADDRESS | PT+8 |
| 1 | PT OPTIONS | PT+4 |
| 0 | NEXT PT START ADDRESS | PT |

\* 64-BIT TRANSPARENCY VALUE FORMED AS:

| 63 ... 32 | 31 ... 0 | |
|---|---|---|
| WORD 1 | WORD 0 | LITTLE ENDIAN |
| WORD 0 | WORD 1 | BIG ENDIAN |

FIG. 25

| WORD NO. | 31 | 0 | BYTE ADDRESS |
|---|---|---|---|
| 1 | RESERVED | | PT+60 |
| 0 | RESERVED | | PT+56 |
| 1 | RESERVED | | PT+52 |
| 0 | RESERVED | | PT+48 |
| 1 | DST BC PITCH | | PT+44 |
| 0* | MS FILL VALUE WORD | | PT+40 |
| 1 | DST AB PITCH | | PT+36 |
| 0* | LS FILL VALUE WORD | | PT+32 |
| 1 | DST C COUNT | | PT+28 |
| 0 | RESERVED | | PT+24 |
| 1 | DST B COUNT | DST A COUNT | PT+20 |
| 0 | RESERVED | | PT+16 |
| 1 | DST START ADDRESS | | PT+12 |
| 0 | RESERVED | | PT+8 |
| 1 | PT OPTIONS | | PT+4 |
| 0 | NEXT PT START ADDRESS | | PT |

\* 64-BIT FILL VALUE FORMED AS:

| 63 | 32 | 31 | 0 | |
|---|---|---|---|---|
| MS WORD | | LS WORD | | LITTLE ENDIAN |
| MS WORD | | LS WORD | | BIG ENDIAN |

*FIG. 26*

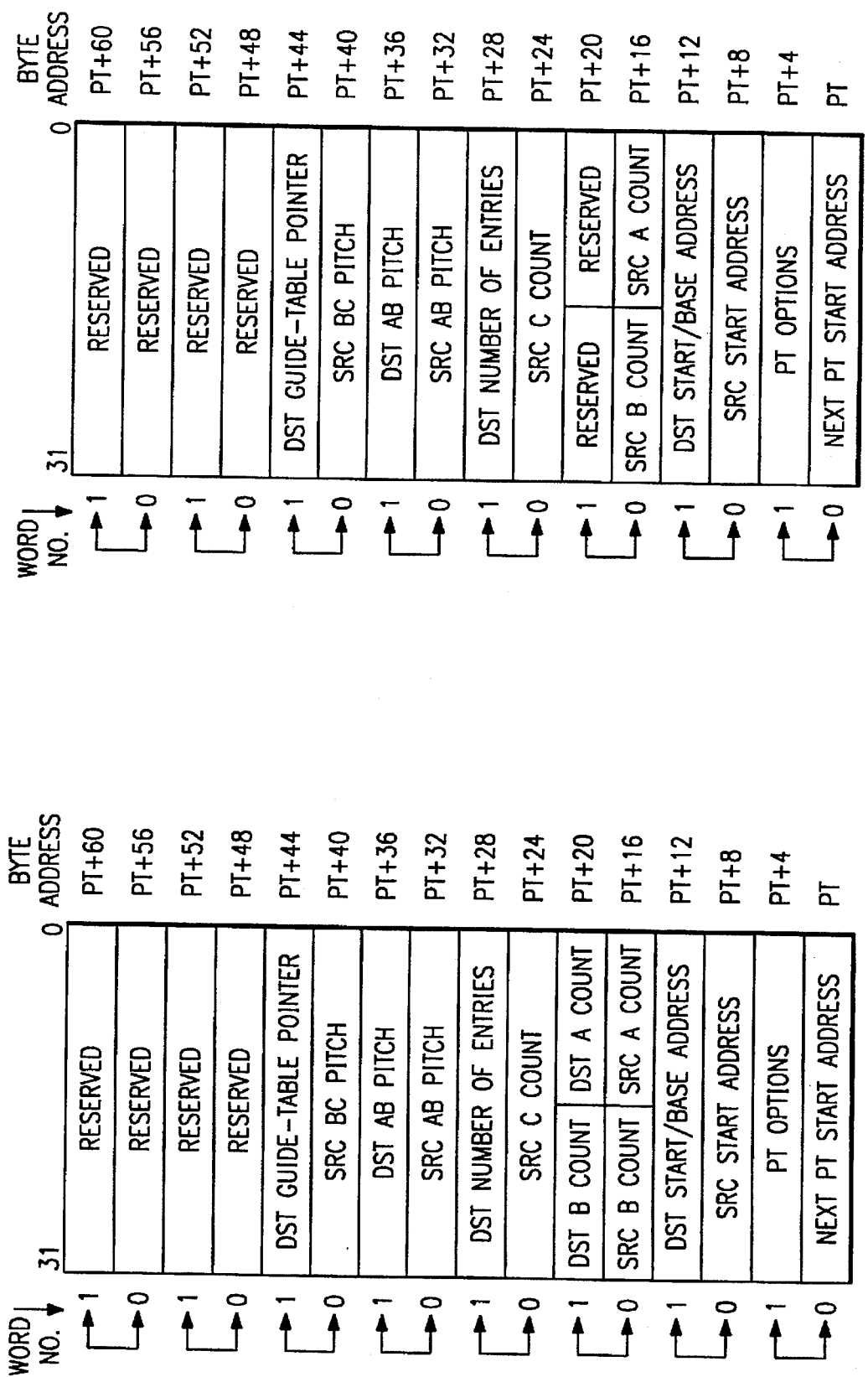

| WORD NO. | 31                      0 | BYTE ADDRESS |
|---|---|---|
| 1 | RESERVED | PT+60 |
| 0 | RESERVED | PT+56 |
| 1 | COLOR REGISTER WORD 1 | PT+52 |
| 0 | COLOR REGISTER WORD 0 | PT+48 |
| 1 | DST BC PITCH | PT+44 |
| 0 | SRC BC PITCH | PT+40 |
| 1 | DST AB PITCH | PT+36 |
| 0 | SRC AB PITCH | PT+32 |
| 1 | DST C COUNT | PT+28 |
| 0 | SRC C COUNT | PT+24 |
| 1 | DST B COUNT | DST A COUNT | PT+20 |
| 0 | SRC B COUNT | SRC A COUNT | PT+16 |
| 1 | DST START ADDRESS | PT+12 |
| 0 | SRC START ADDRESS | PT+8 |
| 1 | PT OPTIONS | PT+4 |
| 0 | NEXT PT START ADDRESS | PT |

* 64-BIT COLOR REGISTER VALUE FORMED AS:

| 63        32 | 31        0 | |
|---|---|---|
| WORD 1 | WORD 0 | LITTLE ENDIAN |
| WORD 0 | WORD 1 | BIG ENDIAN |

*FIG. 29*

|   | BIT NO. |
|---|---|
| STOP. – | 31 MS |
| PT STATUS: { | 30 |
|  | 29 |
| INTERRUPT WHEN FINISHED. – | 28 |
| RESERVED. – | 27 |
| RESERVED. – | 26 |
| REVERSE DESTINATION C ADDRESSING. – | 25 |
| REVERSE DESTINATION B ADDRESSING. – | 24 |
| REVERSE A ADDRESSING. – | 23 |
| REVERSE SOURCE C ADDRESSING. – | 22 |
| REVERSE SOURCE B ADDRESSING. – | 21 |
| RESERVED. – | 20 |
| EXCHANGE SRC AND DST PARAMETERS. – | 19 |
| PT ACCESS MODE: { | 18 |
|  | 17 |
|  | 16 |
| RESERVED. – | 15 |
| SOURCE TRANSFER MODE: { | 14 |
|  | 13 |
|  | 12 |
| RESERVED. – | 11 |
| RESERVED. – | 10 |
| SOURCE UPDATE MODE: { | 9 |
|  | 8 |
| RESERVED. – | 7 |
| DESTINATION TRANSFER MODE: { | 6 |
|  | 5 |
|  | 4 |
| RESERVED. – | 3 |
| RESERVED. – | 2 |
| DESTINATION UPDATE MODE: { | 1 |
|  | 0 |

*FIG. 30*

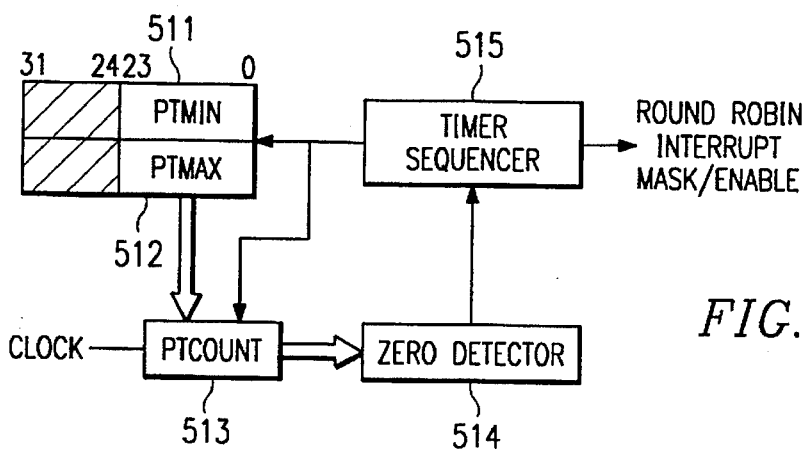

*FIG. 31*

| WORD NO. | 31 ... 0 | DIGP'S | MP |
|---|---|---|---|
| 1 | RESERVED (256-BIT TC) | 0x0100#07C | 0x0101007C |
| 0 | RESERVED (256-BIT TC) | 0x0100#078 | 0x01010078 |
| 1 | RESERVED (256-BIT TC) | 0x0100#074 | 0x01010074 |
| 0 | RESERVED (256-BIT TC) | 0x0100#070 | 0x01010070 |
| % | FIFO BITS (127-96) | | |
| % | FIFO BITS (95-64) | 0x0100#068 | 0x01010068 |
| % | FIFO BITS (63-32) | | |
| % | FIFO BITS (31-0) | 0x0100#060 | 0x01010060 |
| % | SUSPENDED PACKET | | |
| % | SERVICE PARAMETERS | 0x0100#058 | 0x01010058 |
| 1 | DST "B" START/BASE ADDRESS | 0x0100#054 | 0x01010054 |
| 0 | SRC "B" START/BASE ADDRESS | 0x0100#050 | 0x01010050 |
| 1 | DST "A" START/GUIDE VALUE | 0x0100#04C | 0x0101004C |
| 0 | SRC "A" START/GUIDE VALUE | 0x0100#048 | 0x01010048 |
| 1 | DST B CURRENT \| DST A CURRENT | 0x0100#044 | 0x01010044 |
| 0 | SRC B CURRENT \| SRC A CURRENT | 0x0100#040 | 0x01010040 |
| 1 | RESERVED | 0x0100#03C | 0x0101003C |
| 0 | RESERVED | 0x0100#038 | 0x01010038 |
| % | TRANS./COLOR WORD 1 | | |
| % | TRANS./COLOR WORD 0 | 0x0100#030 | 0x01010030 |
| 1 | DST BC PITCH/GUIDE PTR. | 0x0100#02C | 0x0101002C |
| 0 | SRC BC PITCH/GUIDE PTR. | 0x0100#028 | 0x01010028 |
| 1 | DST AB PITCH | 0x0100#024 | 0x01010024 |
| 0 | SRC AB PITCH | 0x0100#020 | 0x01010020 |
| 1 | DST C COUNT/GUIDE COUNT | 0x0100#01C | 0x0101001C |
| 0 | SRC C COUNT/GUIDE COUNT | 0x0100#018 | 0x01010018 |
| 1 | DST B COUNT \| DST A COUNT | 0x0100#014 | 0x01010014 |
| 0 | SRC B COUNT \| SRC A COUNT | 0x0100#010 | 0x01010010 |
| 1 | CURRENT DST ADDRESS | 0x0100#00C | 0x0101000C |
| 0 | CURRENT SRC ADDRESS | 0x0100#008 | 0x01010008 |
| 1 | PT OPTIONS | 0x0100#004 | 0x01010004 |
| 0 | SUSPENDED PT START ADDRESS | 0x0100#000 | 0x01010000 |

*FIG. 32*

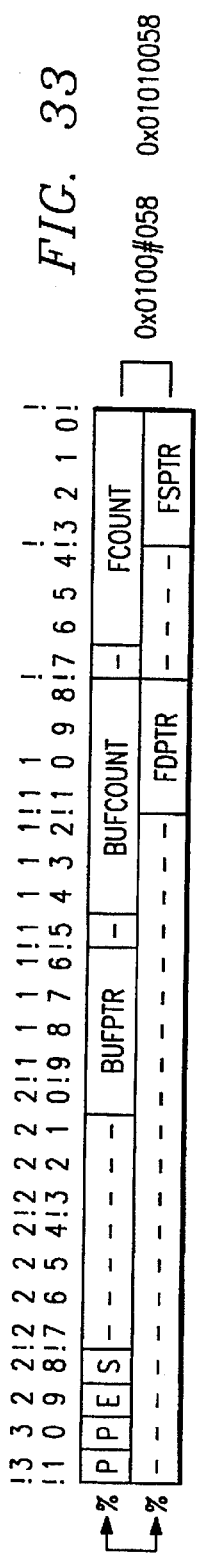

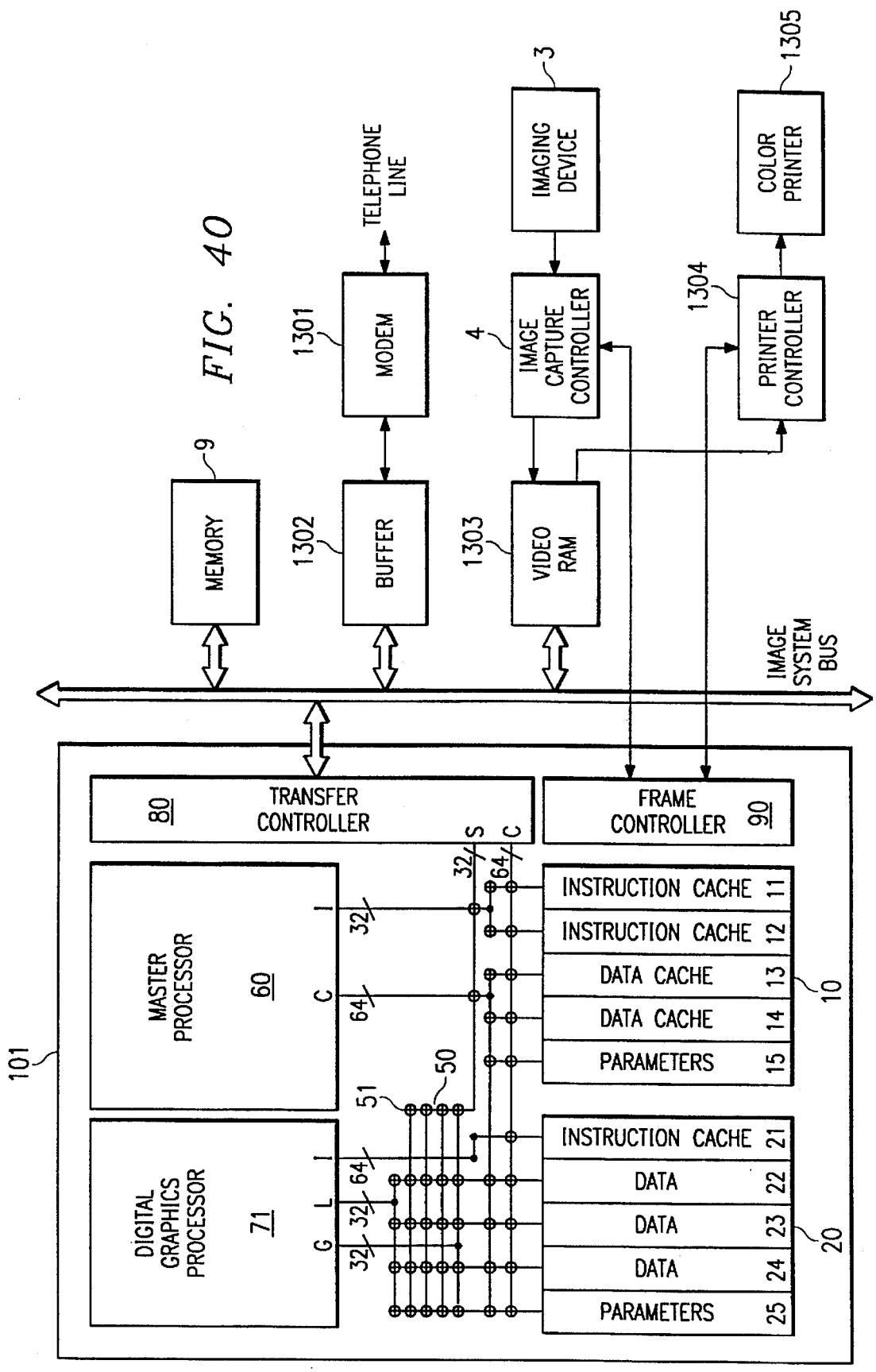

5,651,127

GUIDED TRANSFERS WITH VARIABLE STEPPING

CROSS REFERENCE TO RELATED APPLICATIONS

This application relates to improvements in the inventions disclosed in the following patents and U.S. patent applications, all of which are assigned to Texas Instruments and all of which are incorporated by reference:

U.S. patent application Ser No. 08/263,501 Jun. 21, 1994 entitled "MULTI-PROCESSOR WITH CROSSBAR LINK OF PROCESSORS AND MEMORIES AND METHOD OF OPERATION", a continuation of U.S. patent application Ser. No. 08/135,754 filed Oct. 12, 1993 and now abandoned, a continuation of U.S. patent application Ser. No. 07/933,865 filed Aug. 21, 1992 and now abandoned, which is a continuation of U.S. patent application Ser. No. 07/435,591 filed Nov. 17, 1989 and now abandoned;

U.S. Pat. No. 5,212,777, issued May 18, 1993, filed Nov. 17, 1989 and entitled "SIMD/MIMD RECONFIGURABLE MULTI-PROCESSOR AND METHOD OF OPERATION";

U.S. patent application Ser. No. 07/264,111 filed Jun. 22, 1994 entitled "RECONFIGURABLE COMMUNICATIONS FOR MULTI-PROCESSOR AND METHOD OF OPERATION," a continuation of U.S. patent application Ser. No. 07/895,565 filed Jun. 5, 1992 and now abandoned, a continuation of U.S. patent application Ser. No. 07/437,856 filed Nov. 17, 1989 and now abandoned;

U.S. patent application Ser. No. 08/264,582 filed Jun. 22, 1994 entitled "REDUCED AREA OF CROSSBAR AND METHOD OF OPERATION", a continuation of U.S. patent application Ser. No. 07/437,852 filed Nov. 17, 1989 and now abandoned;

U.S. patent application Ser. No. 08/032,530 filed Mar. 15, 1993 entitled "SYNCHRONIZED MIMD MULTI-PROCESSING SYSTEM AND METHOD OF OPERATION," a continuation of U.S. patent application Ser. No. 07/437,853 filed Nov. 17, 1989 and now abandoned;

U.S. Pat. No. 5,197,140 issued Mar. 23, 1993 filed Nov. 17, 1989 and entitled "SLICED ADDRESSING MULTI-PROCESSOR AND METHOD OF OPERATION";

U.S. Pat. No. 5,339,447 issued Aug. 16, 1994 filed Nov. 17, 1989 entitled "ONES COUNTING CIRCUIT, UTILIZING A MATRIX OF INTERCONNECTED HALF-ADDERS, FOR COUNTING THE NUMBER OF ONES IN A BINARY STRING OF IMAGE DATA";

U.S. Pat. No. 5,239,654 issued Aug. 24, 1993 filed Nov. 17, 1989 and entitled "DUAL MODE SIMD/MIMD PROCESSOR PROVIDING REUSE OF MIMD INSTRUCTION MEMORIES AS DATA MEMORIES WHEN OPERATING IN SIMD MODE";

U.S. Pat. No. 5,410,649 issued Apr. 25, 1995 filed Jun. 29, 1992 entitled "IMAGING COMPUTER AND METHOD OF OPERATION", a continuation of U.S. patent application Ser. No. 07/437,854 filed Nov. 17, 1989 and now abandoned; and U.S. Pat. No. 5,226,125 issued Jul. 6, 1993 filed Nov. 17, 1989 and entitled "SWITCH MATRIX HAVING INTEGRATED CROSSPOINT LOGIC AND METHOD OF OPERATION".

U.S. patent application Ser. No. 08/160,299 filed Nov. 30, 1993 and entitled "THREE INPUT ARITHMETIC LOGIC UNIT WITH BARREL ROTATOR";

U.S. patent application Ser. No. 08/158,742 filed Nov. 30, 1993 and entitled "ARITHMETIC LOGIC UNIT HAVING PLURAL INDEPENDENT SECTIONS AND REGISTER STORING RESULTANT INDICATOR BIT FROM EVERY SECTION";

U.S. patent application Ser. No. 08/160,118 filed Nov. 30, 1993 "MEMORY STORE FROM A REGISTER PAIR CONDITIONAL";

U.S. patent application Ser. No. 08/324,323 filed Oct. 17, 1994 and entitled "ITERATIVE DIVISION APPARATUS, SYSTEM AND METHOD FORMING PLURAL QUOTIENT BITS PER ITERATION" a continuation of U.S. patent application Ser. No. 08/160,115 concurrently filed with this application and now abandoned;

U.S. patent application Ser. No. 08/159,285 filed Nov. 30, 1993 and entitled "THREE INPUT ARITHMETIC LOGIC UNIT FORMING MIXED ARITHMETIC AND BOOLEAN COMBINATIONS";

U.S. patent application Ser. No. 08/160,119 filed Nov. 30, 1993 and entitled "METHOD, APPARATUS AND SYSTEM FORMING THE SUM OF DATA IN PLURAL EQUAL SECTIONS OF A SINGLE DATA WORD";

U.S. patent application Ser. No. 08/159,359 filed Nov. 30, 1993 and entitled "HUFFMAN ENCODING METHOD, CIRCUITS AND SYSTEM EMPLOYING MOST SIGNIFICANT BIT CHANGE FOR SIZE DETECTION";

U.S. patent application Ser. No. 08/160,296 filed Nov. 30, 1993 and entitled "HUFFMAN DECODING METHOD, CIRCUIT AND SYSTEM EMPLOYING CONDITIONAL SUBTRACTION FOR CONVERSION OF NEGATIVE NUMBERS";

U.S. patent application Ser. No. 08/160,112 filed Nov. 30, 1993 and entitled "METHOD, APPARATUS AND SYSTEM FOR SUM OF PLURAL ABSOLUTE DIFFERENCES";

U.S. patent application Ser. No. 08/160,120 filed Nov. 30, 1993 and entitled "ITERATIVE DIVISION APPARATUS, SYSTEM AND METHOD EMPLOYING LEFT MOST ONE'S DETECTION AND LEFT MOST ONE'S DETECTION WITH EXCLUSIVE OR";

U.S. patent application Ser. No. 08/160,114 filed Nov. 30, 1993 and entitled "ADDRESS GENERATOR EMPLOYING SELECTIVE MERGE OF TWO INDEPENDENT ADDRESSES";

U.S. patent application Ser. No. 08/160,116 filed Nov. 30, 1993 and entitled "METHOD, APPARATUS AND SYSTEM METHOD FOR CORRELATION";

U.S. patent application Ser. No. 08/160,297 filed Nov. 30, 1993 and entitled "LONG INSTRUCTION WORD CONTROLLING PLURAL INDEPENDENT PROCESSOR OPERATIONS";

U.S. patent application Ser. No. 08/159,346 filed Nov. 30, 1993 and entitled "ROTATION REGISTER FOR ORTHOGONAL DATA TRANSFORMATION";

U.S. patent application Ser. No. 08/159,652 filed Nov. 30, 1993 "MEDIAN FILTER METHOD, CIRCUIT AND SYSTEM";

U.S. patent application Ser. No. 08/159,344 filed Nov. 30, 1993 and entitled "ARITHMETIC LOGIC UNIT WITH CONDITIONAL REGISTER SOURCE SELECTION";

U.S. patent application Ser. No. 08/160,301 filed Nov. 30, 1993 and entitled "APPARATUS, SYSTEM AND METHOD FOR DIVISION BY ITERATION";

U.S. patent application Ser. No. 08/159,650 filed Nov. 30, 1993 and entitled "MULTIPLY ROUNDING USING REDUNDANT CODED MULTIPLY RESULT";

U.S. patent application Ser. No. 08/159,349 filed Nov. 30, 1993 and entitled "SPLIT MULTIPLY OPERATION";

U.S. patent application Ser. No. 08/158,741 filed Nov. 30, 1993 and entitled "MIXED CONDITION TEST CONDITIONAL AND BRANCH OPERATIONS INCLUDING CONDITIONAL TEST FOR ZERO";

U.S. patent application Ser. No. 08/160,302 filed Nov. 30, 1993 and entitled "PACKED WORD PAIR MULTIPLY OPERATION";

U.S. patent application Ser. No. 08/160,573 filed Nov. 30, 1993 and entitled "THREE INPUT ARITHMETIC LOGIC UNIT WITH SHIFTER U.S. patent application Ser. No. 08/159,282 filed Nov. 30, 1993 and entitled "THREE INPUT ARITHMETIC LOGIC UNIT WITH MASK GENERATOR";

U.S. patent application Ser. No. 08/160,111 filed Nov. 30, 1993 and entitled "THREE INPUT ARITHMETIC LOGIC UNIT WITH BARREL ROTATOR AND MASK GENERATOR";

U.S. patent application Ser. No. 08/160,298 filed Nov. 30, 1993 and entitled "THREE INPUT ARITHMETIC LOGIC UNIT WITH SHIFTER AND MASK GENERATOR";

U.S. patent application Ser. No. 08/159,345 filed Nov. 30, 1993 and entitled "THREE INPUT ARITHMETIC LOGIC UNIT FORMING THE SUM OF A FIRST INPUT ADDED WITH A FIRST BOOLEAN COMBINATION OF A SECOND INPUT AND THIRD INPUT PLUS A SECOND BOOLEAN COMBINATION OF THE SECOND AND THIRD INPUTS";

U.S. patent application Ser. No. 08/160,113 filed Nov. 30, 1993 and entitled "THREE INPUT ARITHMETIC LOGIC UNIT FORMING THE SUM OF FIRST BOOLEAN COMBINATION OF FIRST, SECOND AND THIRD INPUTS PLUS A SECOND BOOLEAN COMBINATION OF FIRST, SECOND AND THIRD INPUTS";

U.S. patent application Ser. No. 08/159,640 filed Nov. 30, 1993 and entitled "THREE INPUT ARITHMETIC LOGIC UNIT EMPLOYING CARRY PROPAGATE LOGIC";

U.S. patent application Ser. No. 08/160,300 filed Nov. 30, 1993 and entitled "DATA PROCESSING APPARATUS, SYSTEM AND METHOD FOR IF, THEN, ELSE OPERATION USING WRITE PRIORITY";

U.S. patent application Ser. No. 08/207,987 (TI-15521) filed Mar. 8, 1994 and entitled "MP VECTOR INSTRUCTIONS FP+LOAD/STORE"; and U.S. patent application Ser. No. 08/207,992 (TI-18695) filed Mar. 8, 1993 and entitled. "NORMALIZATION METHOD FOR FLOATING POINT NUMBERS".

This application is also related to the following concurrently filed U.S. patent applications, all of which are hereby incorporated by reference:

U.S. patent application Ser. No. 08/208,413 (TI-15522) filed Mar. 8, 1994 and entitled "TRANSPARENCY AND PLANE MASKING IN TP TRANSFER PROCESSOR";

U.S. patent application Ser. No. 08/208,161 (TI-15523) filed Mar. 8, 1994 and entitled "PIXEL BLOCK TRANSFER WITH TRANSPARENCY";

U.S. patent application Ser. No. 08/205,171 (TI-15524) filed Mar. 8, 1994 and entitled "MESSAGE PASSING AND BLAST INTERRUPT FROM PROCESSOR";

U.S. patent application Ser. No. 08/209,124 (TI-15534) filed Mar. 8, 1994 and entitled "GUIDED TRANSFER LINE DRAWING";

U.S. patent application Ser. No. 08/208,517 (TI-15540) filed Mar. 8, 1994 and entitled "TRANSFER PROCESSOR MEMORY INTERFACE CONTROLS DIFFERENT MEMORY TYPES SIMULTANEOUSLY"; and U.S. patent application Ser. No. 08/207,503 (TI-15543) filed Mar. 8, 1994 and entitled "ARCHITECTURE OF TP TRANSFER PROCESSOR".

NOTICE

©Copyright, ™Texas Instruments Incorporated 1991. A portion of the disclosure of this patent document contains material which is subject to copyright and mask work protection. The copyright and mask work owner has no objection to the facsimile reproduction by anyone of the patent document or the patent disclosure, as it appears in the Patent and Trademark Office patent file or records, but otherwise reserves all copyright and mask work rights whatsoever.

TECHNICAL FIELD OF THE INVENTION

The technical field of this invention is the field of digital data processing and more particularly microprocessor circuits, architectures and methods for digital data processing especially digital image/graphics processing.

BACKGROUND OF THE INVENTION

The inventive embodiments have many applications some of which relate to the field of computer graphics, discussed herein as an illustrative background. In a field of computer graphics known as bit mapped graphics, computer memory stores data for each individual picture element or pixel of an image at memory locations that correspond to the location of that pixel within the image. This image may be an image to be displayed or a captured image to be manipulated, stored, displayed or retransmitted. The field of bit mapped computer graphics has benefited greatly from the lowered cost and increased capacity of dynamic random access memory (DRAM) and the lowered cost and increased processing power of microprocessors. These advantageous changes in the cost and performance of component parts enable larger and more complex computer image systems to be economically feasible.

The field of bit mapped graphics has undergone several stages in evolution of the types of processing used for image data manipulation. Initially a computer system supporting bit mapped graphics employed the system processor for all bit mapped operations. This type of system suffered several drawbacks. First, the computer system processor was not particularly designed for handling bit mapped graphics. Design choices that are very reasonable for general purpose computing are unsuitable for bit mapped graphics systems. Consequently some routine graphics tasks operated slowly. In addition, it was quickly discovered that the processing needed for image manipulation of bit mapped graphics was so loading the computational capacity of the system processor that other operations were also slowed.

The next step in the evolution of bit mapped graphics processing was dedicated hardware graphics controllers. These devices can draw simple figures, such as lines, ellipses and circles, under the control of the system processor. Some of these devices can also do pixel block transfers (PixBlt). A pixel block transfer is a memory move operation of image data from one portion of memory to another. A pixel block transfer is useful for rendering standard image elements, such as alphanumeric characters in a particular type font, within a display by transfer from nondisplayed memory to bit mapped display memory. This function can also be used for tiling by transferring the same small image to the whole of bit mapped display memory. Built-in algorithms for performing some of the most frequently used graphics functions provide a way of improving system performance. Also a graphics computer system may desirably include other functions besides those few that are implemented in such a hardware graphics controller. These additional functions might be implemented in software by the system processor. These hardware graphics controllers will typically allow the system processor only limited access to the bit map memory. This limits the degree to which system software can augment the fixed set of functions of the hardware graphics controller.

The graphics system processor represents yet a further step in the evolution of bit mapped graphics processing. A graphics system processor is a programmable device that has all the attributes of a microprocessor and also includes special functions for bit mapped graphics. The TMS34010 and TMS34020 graphics system processors manufactured by Texas Instruments Incorporated represent this class of devices. These graphics system processors respond to a stored program in the same manner as a microprocessor and include the capability of data manipulation via an arithmetic logic unit, data storage in register files and control of both program flow and external data memory. In addition, these devices include special purpose graphics manipulation hardware that operate under program control. Additional instructions within the instruction set of these graphics system processors control the special purpose graphics hardware. These instructions and the hardware that supports them are selected to perform base level graphics functions that are useful in many contexts. Thus a graphics system processor can be programmed for many differing graphics applications using algorithms selected for the particular problem. This provides an increase in usefulness similar to that provided by changing from hardware controllers to programmed microprocessors. Because such graphics system processors are programmable devices in the same manner as microprocessors, they can operate as stand alone graphics processors, graphics co-processors slaved to a system processor or tightly coupled graphics controllers.

Several fields would desirably utilize more cost effective, powerful graphics operations to be economically feasible. These include video conferencing, multi-media computing with full motion video, high definition television, color facsimile, smart photocopiers, image recognition systems and digital photography, among other examples. Each of these fields presents unique problems. Image data compression and decompression are common themes in some of these applications. The amount of transmission bandwidth and the amount of storage capacity required for images and particular full motion video is enormous. Without efficient video compression and decompression that result in acceptable final image quality, these applications will be limited by the costs associated with transmission bandwidth and storage capacity. There is also a need in the art for a single system that can support both image processing functions such as image recognition and graphics functions such as display control.

SUMMARY OF THE INVENTION

This invention is a manner of control of the addresses of memory accesses. The data processing device of this invention includes a memory, a control circuit, a guide table and an address generating circuit. The control circuit receives a packet transfer request and packet transfer parameters. The packet transfer parameters include a start address, a number of guide table entries and a table pointer. The guide table includes guide table entries, each guide table entry having an address value and dimension values defining a block of addresses. The table pointer initially points to a first guide table entry in the guide table. The address generating circuit forms a set of block of addresses for memory access corresponding to each guide table entry. The address generating circuit forms a block start address from a predetermined combination of the start address and the address value of the guide table entry pointed to by the table pointer. The first block start address is the start address. The address generating circuit forms a block of addresses from the block start address and the dimension values of the guide table entry pointed to by the table pointer. The data processing device performs memory accesses to the block of addresses. Following the memory accesses, the address generating circuit updates the table pointer to point to a next entry in the guide table.

The address generating circuit may optionally form the predetermined combination of starting address and address value of guide table entry by adding the address value to the prior block starting address. This is known as delta guided addressing. The address generating circuit may optionally form the predetermined combination of starting address and address value of the guide table entry by adding the guide table value to the starting address. This is known as offset guided addressing.

The dimension values of each guide table entry comprise a horizontal dimension value and a vertical dimension value of an array of pixels.

The memory access may be a memory read from the block of addresses. The memory access may be of a memory write to the block of addresses.

In the preferred embodiment, memory, a data processor and a data transfer controller performing the above memory accesses is constructed in a single semiconductor chip. The data transfer controller may access external memory in the same manner as on-chip memory.

BRIEF DESCRIPTION OF THE FIGURES

These and other aspects of the preferred embodiment of the present invention are described below together with the Figures, in which:

FIG. 3 illustrates the interrupt enable and interrupt flag registers of the digital image/graphics processors;

FIG. 4 illustrates the fields of a command word;

FIG. 5 illustrates a communications register of the digital image/graphics processors;

FIG. 15 illustrates the usage of the parameter memory of the processors;

FIG. 25 illustrates a dimensioned packet transfer with source transparency parameters example;

FIG. 26 illustrates a dimensioned packet transfer with fill parameters example;

FIG. 27 illustrates a dimensioned source and fixed patch guided destination packet transfer parameters example;

FIG. 28 illustrates a dimensioned source and variable patch guided destination packet transfer parameters example;

FIG. 29 illustrates a dimensioned block write packet transfer parameters example;

FIG. 30 illustrates the encoding of the packet transfer options field of the packet transfer parameters;

FIG. 31 illustrates a packet transfer timer structure;

FIG. 32 illustrates an example of the manner of storage of suspended packet transfer parameters;

FIG. 33 illustrates an encoding of the suspended packet service parameters;

FIG. 34 illustrates an example of bit remapping in an 8× block-write bit remapping in little endian mode;

FIG. 35 illustrates an example of bit remapping in a 4× block-write bit remapping in little endian mode;

FIG. 40 illustrates an example embodiment of color facsimile system including a multiprocessor integrated circuit having a single digital image/graphics processor.

DETAILED DESCRIPTION OF PREFERRED EMBODIMENTS

Figure 1:
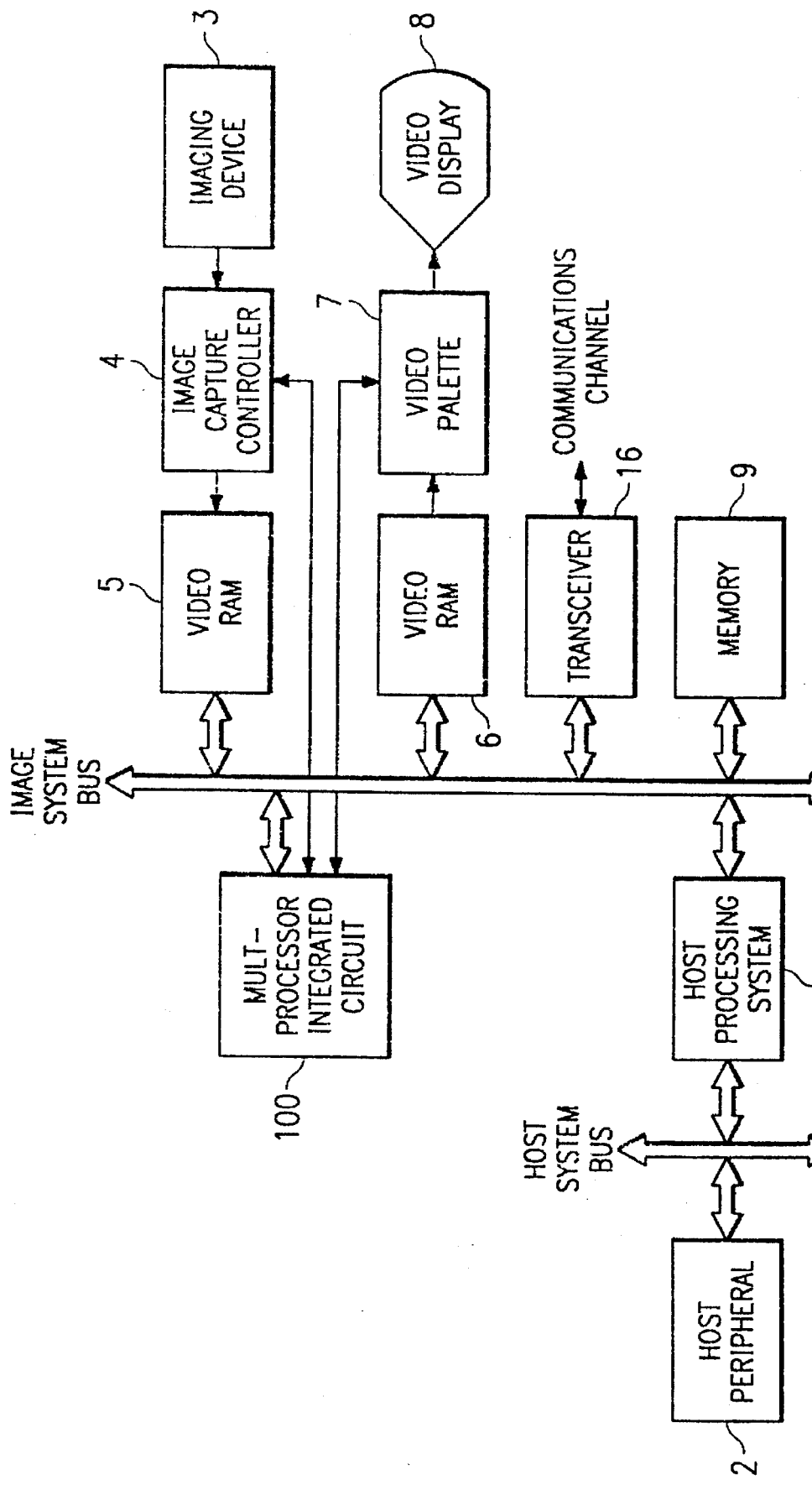
FIG. 1 illustrates the system architecture of an image processing system embodiment of this invention.

FIG. 1 is a block diagram of an image data processing system including a multiprocessor integrated circuit constructed for image and graphics processing according to this invention. This data processing system includes a host processing system 1. Host processing system 1 provides the data processing for the host system of data processing system of FIG. 1. Included in the host processing system 1 are a processor, at least one input device, a long term storage device, a read only memory, a random access memory and at least one host peripheral 2 coupled to a host system bus. Because of its processing functions, the host processing system 1 controls the function of the image data processing system.

Multiprocessor integrated circuit 100 provides most of the data processing including data manipulation and computation for image operations of the image data processing system of FIG. 1. Multiprocessor integrated circuit 100 is bi-directionally coupled to an image system bus and communicates with host processing system 1 by way of this image system bus. In the arrangement of FIG. 1, multiprocessor integrated circuit 100 operates independently from the host processing system 1. The multiprocessor integrated circuit 100, however, is responsive to host processing system 1.

FIG. 1 illustrates two image systems. Imaging device 3 represents a document scanner, charge coupled device scanner or video camera that serves as an image input device. Imaging device 3 supplies this image to image capture controller 4, which serves to digitize the image and form it into raster scan frames. This frame capture process is controlled by signals from multiprocessor integrated circuit 100. The thus formed image frames are stored in video random access memory 5. Video random access memory 5 may be accessed via the image system bus permitting data transfer for image processing by multiprocessor integrated circuit 100.

The second image system drives a video display. Multiprocessor integrated circuit 100 communicates with video random access memory 6 for specification of a displayed image via a pixel map. Multiprocessor integrated circuit 100 controls the image data stored in video random access memory 6 via the image system bus. Data corresponding to this image is recalled from video random access memory 6 and supplied to video palette 7. Video palette 7 may transform this recalled data into another color space, expand the number of bits per pixel and the like. This conversion may be accomplished through a look-up table. Video palette 7 also generates the proper video signals to drive video display 8. If these video signals are analog signals, then video palette 7 includes suitable digital to analog conversion. The video level signal output from the video palette 7 may include color, saturation, and brightness information. Multiprocessor integrated circuit 100 controls data stored within the video palette 7, thus controlling the data transformation process and the timing of image frames. Multiprocessor integrated circuit 100 can control the line length and the number of lines per frame of the video display image, the synchronization, retrace, and blanking signals through control of video palette 7. Significantly, multiprocessor integrated circuit 100 determines and controls where graphic display information is stored in the video random access memory 6. Subsequently, during readout from the video random access memory 6, multiprocessor integrated circuit 100 determines the readout sequence from the video random access memory 6, the addresses to be accessed, and control information needed to produce the desired graphic image on video display 8.

Video display 8 produces the specified video display for viewing by the user. There are two widely used techniques.

The first technique specifies video data in terms of color, hue, brightness, and saturation for each pixel. For the second technique, color levels of red, blue and green are specified for each pixel. Video palette 7 the video display 8 is designed and fabricated to be compatible with the selected technique.

FIG. 1 illustrates an additional memory 9 coupled to the image system bus. This additional memory may include additional video random access memory, dynamic random access memory, static random access memory or read only memory. Multiprocessor integrated circuit 100 may be controlled either in wholly or partially by a program stored in the memory 9. This memory 9 may also store various types of graphic image data. In addition, multiprocessor integrated circuit 100 preferably includes memory interface circuits for video random access memory, dynamic random access memory and static random access memory. Thus a system could be constructed using multiprocessor integrated circuit 100 without any video random access memory 5 or 6.

FIG. 1 illustrates transceiver 16. Transceiver 16 provides translation and bidirectional communication between the image system bus and a communications channel. One example of a system employing transceiver 16 is video conferencing. The image data processing system illustrated in FIG. 1 employs imaging device 3 and image capture controller 4 to form a video image of persons at a first location. Multiprocessor integrated circuit 100 provides video compression and transmits the compressed video signal to a similar image data processing system at another location via transceiver 16 and the communications channel. Transceiver 16 receives a similarly compressed video signal from the remote image data processing system via the communications channel. Multiprocessor integrated circuit 100 decompresses this received signal and controls video random access memory 6 and video palette 7 to display the corresponding decompressed video signal on video display 8. Note this is not the only example where the image data processing system employs transceiver 16. Also note that the bidirectional communications need not be the same type signals. For example, in an interactive cable television signal the cable system head in would transmit compressed video signals to the image data processing system via the communications channel. The image data processing system could transmit control and data signals back to the cable system head in via transceiver 16 and the communications channel.

FIG. 1 illustrates multiprocessor integrated circuit 100 embodied in a system including host processing system 1. Those skilled in the art would realize from the disclosure the preferred embodiments of the invention that multiprocessor integrated circuit 100 may also be employed as the only processor of a useful system. In such a system multiprocessor integrated circuit 100 is programmed to perform all the functions of the system.

This multiprocessor integrated circuit 100 is particularly useful in systems used for image processing. Multiprocessor integrated circuit 100 preferably includes plural identical processors. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

Figure 2:
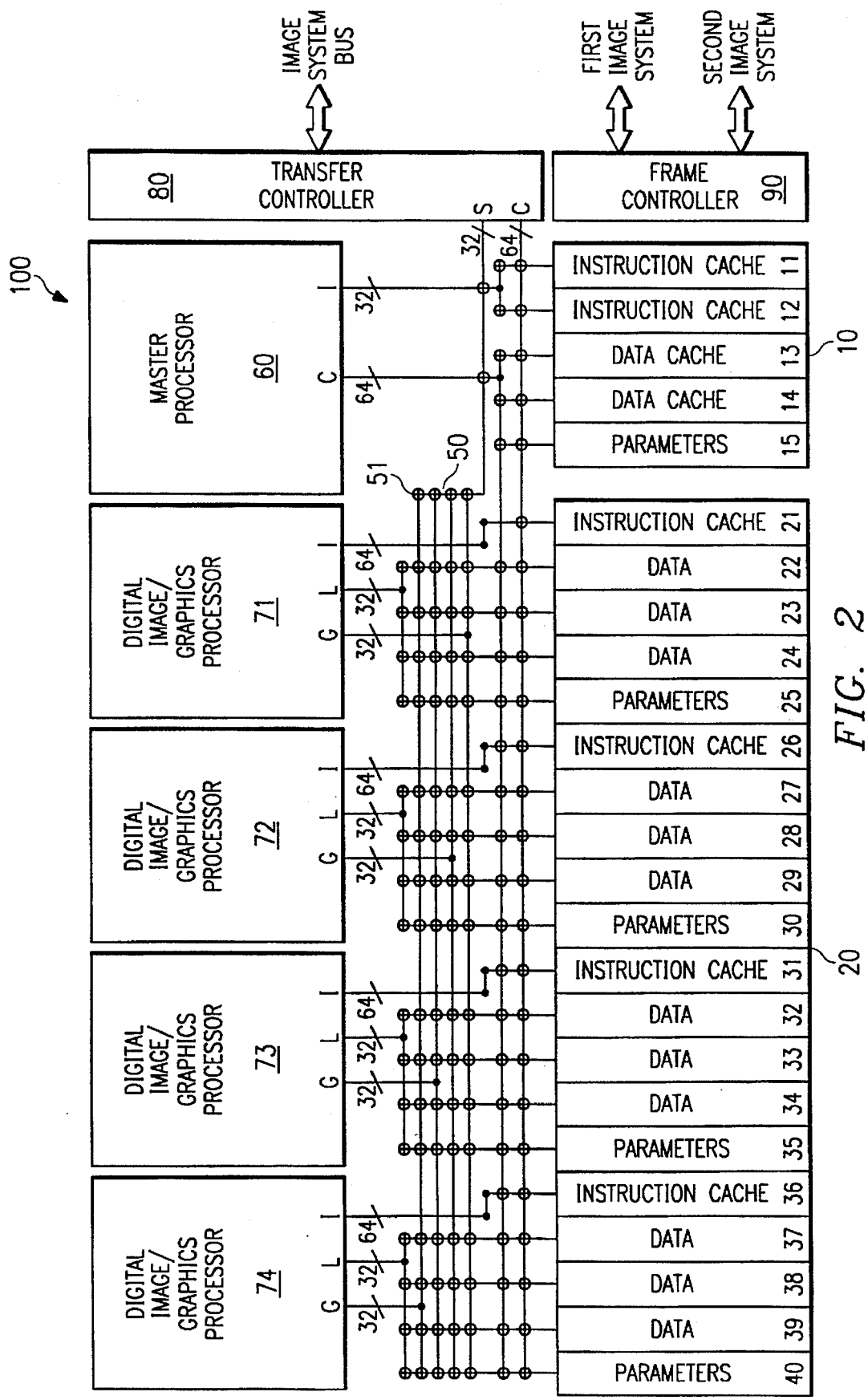
FIG. 2 illustrates the architecture of a single integrated circuit multiprocessor.

FIG. 2 illustrates the architecture of the multiprocessor integrated circuit 100. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multimedia computing. Since there are computing applications other than image and graphics processing where these processors will be useful, reference to processors 71, 72, 73 and 74 as image/graphics processors is for convenience only.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 includes 2K bytes for example, with a total memory within multiprocessor integrated circuit 100 of 50K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit data words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories or random access memory 20. Master Processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, the parameter memories of random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2K bytes of memory, there is 4K bytes of instruction cache and 4K bytes of data cache. Cache control is an integral function of master processor 60. As previously mentioned, master processor 60 may also access other memory sections via crossbar 50.

The four digital image/graphics processors 71, 72, 73 and 74 each have a highly parallel digital signal processor (DSP) architecture. Digital image/graphics processors 71, 72, 73 and 74 achieve a high degree of parallelism of operation employing three separate units: a data unit; an address unit; and a program flow control unit. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet transfers. These linked list packet transfers allow multidimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controlled 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width in this embodiment. This permits architecture flexibility by accommodating the addition or removal of digital image/graphics processors and corresponding memory modularly while maintaining the same pin out.

In one embodiment all parts of multiprocessor integrated circuit 100 are disposed on a single integrated circuit, which is formed in complementary metal oxide semiconductor (CMOS) using feature sizes of 0.6 μm. Multiprocessor integrated circuit 100 is suitably constructed in a pin grid array package having 256 pins. The inputs and outputs are compatible with transistor-transistor logic (TTL) logic voltages for example. Multiprocessor integrated circuit 100 includes about 3 million transistors and employs a clock rate of 50 MHz.

Figures 3, 4, 5:
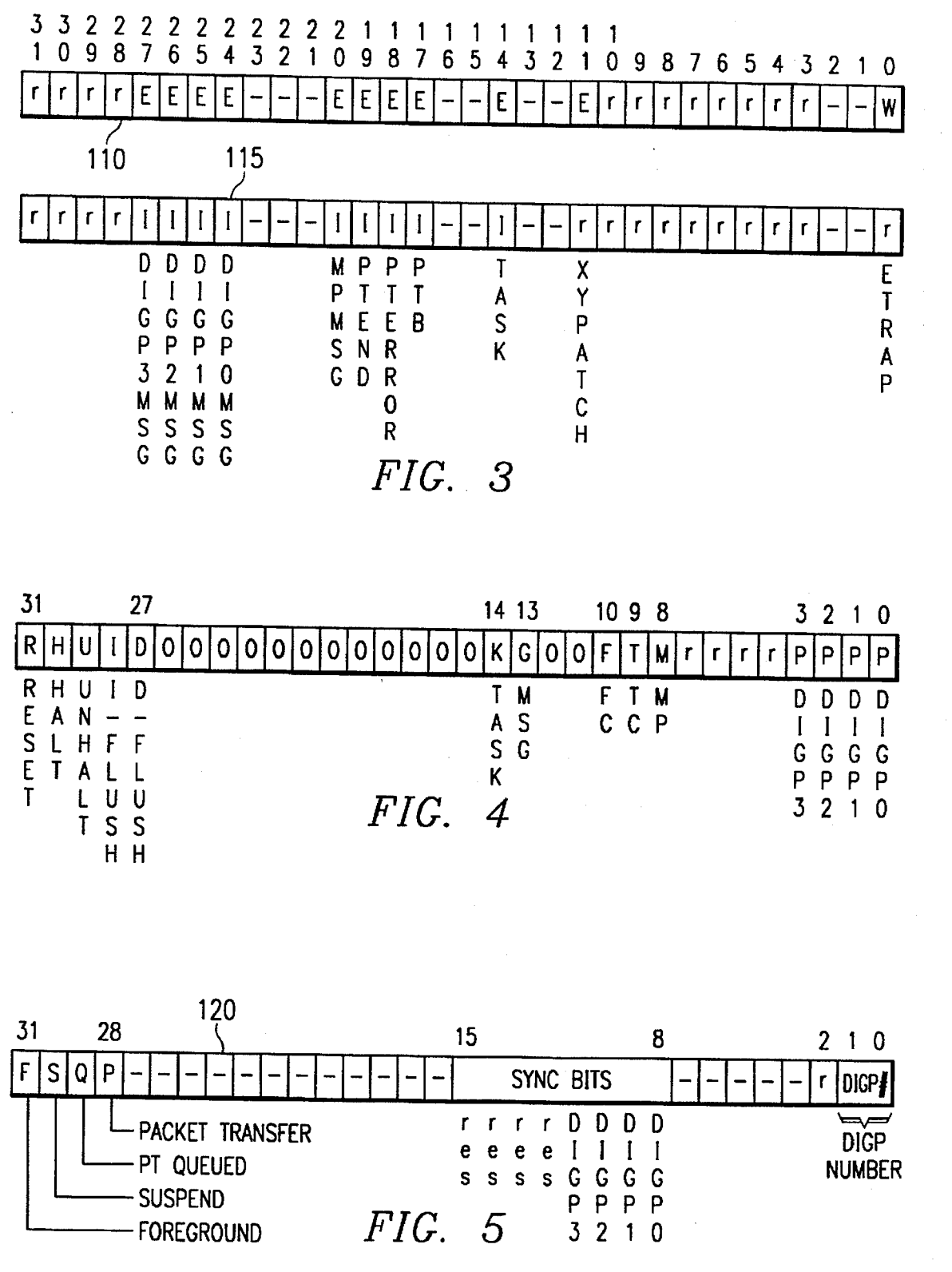

FIG. 3 illustrates the field definitions for interrupt enable register INTEN 110 and interrupt flag register INTFLG. The bits labeled "r" are reserved for future use and bits labeled "—" are not implemented in the preferred embodiment but may be used in other embodiments. Interrupts are prioritized from left to right. Each interrupt source can be individually enabled by setting a "1" in the corresponding Enable (E) bit of interrupt enable register INTEN 110. The interrupt source bits of interrupt flag register INTFLG 115 are in descending order of priority from right to left: Emulation interrupt ETRAP, which is always enabled; XY patch interrupt; task interrupt; packet transfer busy interrupt PTB; packet transfer error interrupt PTERROR; packet transfer successful interrupt PTEND; master processor 60 message interrupt MPMSG; digital image/graphics processor 71 message interrupt DIGP0MSG; digital image/graphics processor 72 message interrupt DIGP1MSG; digital image/graphics processor 73 message interrupt DIGP2MSG; digital image/graphics processor 74 message interrupt DIGP3MSG. Bits 31-28 are reserved for message interrupts from four additional digital image/graphics processors in an implementation of multiprocessor integrated circuit 100 including eight digital image/graphics processors.

The "W" bit (bit 0) of interrupt enable register INTEN 110 controls writes to interrupt flag register INTFLG 115. This bit would ordinarily control whether the emulation interrupt is enabled. Since in the preferred embodiment the emulation interrupt cannot be disabled there is no need for an enable bit for this interrupt in interrupt enable register INTEN 110. Bit 0 of interrupt enable register INTEN 110 modifies the behavior of the interrupt flag register INTFLG 115. When the "W" bit of interrupt enable register INTEN 110 is "1", software writes to interrupt flag register INTFLG 115 can only set bits to "1". Under these conditions, an attempt to write a "0" to any bit of interrupt flag register INTFLG 115 has no effect. When this "W" bit "0", writing a "1" to any bit of interrupt flag register INTFLG 115 clears that bit to "0". An attempt to write a "0" to any bit of interrupt flag register INTFLG 115 has no effect. This allows individual interrupt flags within interrupt flag register INTFLG 115 to be cleared without disturbing the state of others. Each interrupt service routine suitably clears its corresponding interrupt flag before returning because these flags are not cleared by hardware in the preferred embodiment. The emulation interrupt ETRAP, the only exception to this, is cleared by hardware because this interrupt is always enabled. If a particular interrupt source is trying to set a bit within interrupt flag register INTFLG 115 simultaneously as a software write operation attempts to clear it, logic causes the bit to be set.

The ETRAP interrupt flag (bit 0 of interrupt flag register INTFLG 115) is set from either analysis logic or an ETRAP instruction. This interrupt is normally serviced immediately because it cannot be disabled, however interrupt servicing does wait until pipeline stall conditions such as memory contention via crossbar 50 are resolved. The ENTRAP interrupt flag is the only interrupt bit in interrupt flag register INTFLG 115 cleared by hardware when the interrupt is serviced.

The XY PATCH interrupt flag (bit 11 of interrupt flag register INTFLG 115) is set under certain conditions when employing the global address unit 610 and local Address unit 620 combine to perform XY addressing. XY patched addressing may generate interrupts on certain conditions. The instruction word calling for XY patched addressing indicates whether such an interrupt may be generated and whether a permitted interrupt is made on an address inside or outside a designated patch.

The TASK interrupt flag (bit 14 in interrupt flag register INTFLG 115) is set upon receipt of a command word from master processor 60. This interrupt causes digital image/graphics processor 71 to load its TASK interrupt vector. This interrupt may cause a selected digital image/graphics processor 71, 72, 73 or 74 to switch tasks under control of master processor 70, for instance.

The packet transfer busy interrupt flag PTB (bit 17 of interrupt flag register INTFLG 115) is set if software writes a "1" to the packet transfer bit of communications register COMM 120 when the queue active bit is a "1". This allows packet transfers to be submitted without checking that the previous one has finished. If the previous packet transfer is still queued then this interrupt flag becomes set. This will be further explained below in conjunction with a description of communications register COMM 120.

The packet transfer error interrupt flag PTERROR (bit 18 of interrupt flag register INTFLG 115) is set if transfer controller 80 encounters an error condition while executing a packet transfer submitted by the digital image/graphics processor.

The packet transfer end interrupt flag PTEND (bit 19 of interrupt flag register INTFLG 115) is set by transfer controller 80 when it encounters the end of the digital image/graphics processor's linked-list, or when it completes a packet transfer that instructs transfer controller 80 to interrupt the requesting digital image/graphics processor upon completion.

The master processor message interrupt flag MPMSG (bit 20 of interrupt flag register INTFLG 115) becomes set when master processor 60 sends a message-interrupt to that digital image/graphics processor.

Bits 27-24 of interrupt flag register INTFLG 115 log message interrupts from digital image/graphics processors 71, 72, 73 and 74. Note that a digital image/graphics processor 71, 72, 73 or 74 can send a message to itself and interrupt itself via the corresponding bit of interrupt flag register INTFLG 115. The digital image/graphics processor 0 message interrupt flag DIGP0MSG (bit 24 of interrupt flag register INTFLG 115) is set when digital image/graphics processor 71 sends a message interrupt to the digital image/graphics processor. In a similar fashion, digital image/graphics processor 1 message interrupt flag DIGP1MSG (bit 25 of interrupt flag register INTFLG 115) is set when digital image/graphics processor 72 sends a message interrupt; digital image/graphics processor 2 message interrupt flag DIGP2MSG (bit 26 of interrupt flag register INTFLG 115) is set when digital image/graphics processor 73 sends a message interrupt, and digital image/graphics processor 3 message interrupt flag DIGP3MSG (bit 27 of interrupt flag register INTFLG 115) is set when digital image/graphics processor 74 sends a message interrupt. As previously stated, bits 31-28 of interrupt flag register INTFLG 115 are reserved for message interrupts from four additional digital image/graphics processors in an implementation of multi-processor integrated circuit 100 including eight digital image/graphics processors.

When an enabled interrupt occurs, an interrupt pseudo-instruction unit, which may be a small state machine, injects the following a set of pseudo-instructions into the pipeline at instruction register-address stage:

*(A14-=16)=SR

*(A14+12)=PC

BR=*vectadd; Two LS bits of vectadd="11", to load S, G and L

*(A14+8)=IPA

*(A14+4)=IPE

These pseudo-instructions are referred to as PS1, PS2, PS3, PS4 and PS5, respectively. Instruction pointer-return from subroutine IPRS is not saved by this sequence. If an interrupt service routine performs any branches then instruction pointer-return from subroutine IPRS should first be pushed by the interrupt service routine, and then restored before returning. Note that the vector fetch is a load of the entire program counter PC 701, with instruction pointer-return from subroutine IPRS protected. Since this causes the S, G and L bits of program counter PC 701 to be loaded, the three least significant bits of all interrupt vectors are made "0". One exception to this statement is that the task vector fetched after a reset should have the "L" bit (bit 0 of program counter PC 701) set, in order to disable looping.

The respective addresses of starting points of interrupt service routines for any interrupt represented in the interrupt flag register INTFLG 115 are called the digital image/graphics processor interrupt vectors. These addresses are generated by software and loaded as data to the parameter memory 25, 30, 35 and 40 corresponding to the respective interrupted digital image/graphics processor 71, 72, 73 and 74 at the fixed addresses shown in Table 1. Interrupt pseudo-instruction PS3 takes the 32 bit address stored in the indicated address in the corresponding parameter memory 25, 30, 35 or 40 and stored this in program counter PC 701. Interrupt pseudo-instruction unit 770 computes the addresses for the corresponding parameter memory based upon the highest priority interrupt enabled via interrupt enable register. Interrupt pseudo-instruction unit 770 operates to include the digital image/graphics processor number from communications register COMM 120 in order to generate unique addresses for each digital image/graphics processor. Note interrupt pseudo-instruction PS4 and PS5 are in the delay slots following this branch to the interrupt service routine.

TABLE 1

| INTFLG bit | Interrupt Name | Address |
|---|---|---|
| 31 | Reserved for DIGP7 Message | 0100#1FC |
| 30 | Reserved for DIGP6 Message | 0100#1F8 |
| 29 | Reserved for DIGP5 Message | 0100#1F4 |
| 28 | Reserved for DIGP4 Message | 0100#1F0 |
| 27 | DIGP3 Message | 0100#1EC |
| 26 | DIGP2 Message | 0100#1E8 |
| 25 | DIGP1 Message | 0100#1E4 |
| 24 | DIGP0 Message | 0100#1E0 |
| 23 | Spare | 0100#1DC |
| 22 | Spare | 0100#1D8 |
| 21 | Spare | 0100#1D4 |
| 20 | Master Processor Message | 0100#1D0 |
| 19 | Packet transfer Successful | 0100#1CC |
| 18 | Packet transfer Error | 0100#1C8 |
| 17 | Packet transfer Busy | 0100#1C4 |
| 16 | Spare | 0100#1C0 |
| 15 | Spare | 0100#1BC |
| 14 | TASK interrupt | 0100#1B8 |
| 13 | Spare | 0100#1B4 |
| 12 | Spare | 0100#1B0 |
| 11 | XY Patching | 0100#1AC |
| 10 | Reserved | 0100#1A8 |
| 9 | Reserved | 0100#1A4 |
| 8 | Reserved | 0100#1A0 |
| 7 | Reserved | 0100#19C |
| 6 | Reserved | 0100#198 |
| 5 | Reserved | 0100#194 |
| 4 | Reserved | 0100#190 |
| 3 | Reserved | 0100#18C |
| 2 | Spare | 0100#188 |
| 1 | Spare | 0100#184 |
| 0 | Emulation | 0100#180 |

In each address the "#" is replaced by the digital image/graphics processor number obtained from communications register COMM 120.

The final 4 instructions of an interrupt service routine should contain the following (32 bit data, unshifted-index) operations:

SR=*(A14++=4)

BR=*(A14++=7)

BR=*(A14++=5)

BR=*(A14++=5)

These instructions are referred to as RETI1, RETI2, RETI3 and RETI4, respectively, Other operations can be coded in parallel with these if desired, but none of these operations should modify status register 211.

The interrupt state can be saved if a new task is to be executed on the digital image/graphics processor, and then restored to the original state after finishing the new task. The write mode controlled by the "W" bit on interrupt enable register INTEN 110 allows this to be done without missing any interrupts during the saving or restoring operations. This may be achieved by the following instruction sequence. First, disable interrupts via a DINT instruction. Next save both interrupt enable register INTEN 110 and interrupt flag register INTFLG 115. Set the "W" bit (bit 0) of interrupt enable register INTEN 110 to "0" and then write Hex "FFFFFFFF" to interrupt flag register INTFLG 115. Run the new task, which may include enabling interrupts. Following completion of the new task, recover the original task. First, disable interrupts via the DINT instruction. Set the "W" bit of interrupt enable register INTEN 110 to "1". Restore the status of interrupt flag register INTFLG 115 from memory. Next, restore the status of interrupt enable register INTEN 110 from memory. Last, enable interrupts via the EINT instruction.

Each digital image/graphics processor 71, 72, 73 and 74 may transmit command words to other digital image/graphics processors and to master processor 60. A register to register move with a destination of register A15, the zero value address register of the global address unit, initiates a command word transfer to a designated processor. Note that this register to register transfer can be combined in a single instruction with operations of data unit 110 and an access via local data port 144, as will be described below. This command word is transmitted to crossbar 50 via global data port 148 accompanied by a special command word signal. This allows master processor 60 and digital image/graphics processors 71, 72, 73 and 74 to communicate with the other processors of multiprocessor integrated circuit 100.

FIG. 4 illustrates schematically the field definitions of these command words. In the preferred embodiment command words have the same 32 bit length as data transmitted via global data port 148. The least significant bits of each command word define the one or more processors and other circuits to which the command word is addressed. Each recipient circuit responds to a received command word only if these bits indicate the command word is directed to that circuit. Bits 3–0 of each command word designate digital image/graphics processors 74, 73, 72 and 71, respectively. Bits 7–4 are not used in the preferred embodiment, but are reserved for use in a multiprocessor integrated circuit 100 having eight digital image/graphics processors. Bit 8 indicates the command word is addressed to master processor 60. Bit 9 indicates the command word is directed to transfer controller 80. Bit 10 indicates the command word is directed to frame controller 90. Note that not all circuits are permitted to send all command words to all other circuits. For example, system level command words cannot be sent from a digital image/graphics processor to another digital image/graphics processor or to master processor 60. Only master processor 60 can send command words to transfer controller 80 or to frame controller 90. The limitations on which circuit can send which command words to which other circuits will be explained below in conjunction with the description of each command word field.

The "R" bit (bit 31) of the command word is a reset bit. Master processor 60 may issue this command word to any digital image/graphics processor, or a digital image/graphics processor may issue this command word to itself. In the contemplated embodiment no digital image/graphics processor may reset another digital image/graphics processor. Note throughout the following description of the reset sequence each digit "#" within an address should be replaced with the digital image/graphics processor number, which is stored in bits 1–0 of command register COMM 120. When a designated digital image/graphics processor receives a reset command word, it first sets its halt latch and sends a reset request signal to transfer controller 80. Transfer controller 80 sends a reset acknowledge signal to the digital image/graphics processor. The resetting digital image/graphics processor performs no further action until receipt of this reset acknowledge signal from transfer processor 80. Upon receipt of the reset acknowledge signal, the digital image/graphics processor initiates the following sequence of operations: sets the halt latch if not already set; clears to "0" the "F", "P", "Q" and "S" bits of communications register COMM 120 (the use of these bits will be described below; clears any pending memory accesses by address unit 120; resets any instruction cache service requests; loads into instruction register-execute stage IRE 752 the instruction $BR=[u.ncvz]A14<<1$ $\|A14=Hex\ "0100\#7F0"$ which unconditionally loads the contents of the stack pointer A14 left shifted one bit to program counter PC 701 with the negative, carry, overflow and zero status bits protected from change and with the "R" bit set to reset stack pointer A14 in parallel with a load of the stack pointer A14; loads into instruction register-address stage IRA the instruction $*(PBA+Hex\ "FC")=PC$ which instruction stores the contents of program counter PC 701 at the address indicated by the sum of the address PBA and Hex "FC"; sets interrupt pseudo-instruction unit 770 to next load interrupt pseudo-instruction PS3; sets bit 14 of interrupt flag register INTFLG 115 indicating a task interrupt; clears bit 0 of interrupt flag register INTFLG 115 thus clearing the emulator trap interrupt ETRAP; and clears bits 11, 7 and 3 of loop control register LCTL thus disabling all three loops.

Execution by the digital image/graphics processor begins when master processor 60 transmits an unhalt command word. Once execution begins the digital image/graphics processor: save address stored in program counter PC 701 to address Hex "0100#7FC", this saves the prior contents of stack pointer A14 left-shifted by one place and the current value of the control bits (bits 2–0) of program counter PC 701; loads the address Hex "0100#7F0" into stack pointer A14; loads program counter PC 701 with the task interrupt vector, where control bits 2–0 are "000"; stores the contents of instruction register-address stage IPA including control bits 2–0 at address Hex "0100#7F8"; stores the contents of instruction register-execute stage IPE including control bits 2–0 at address Hex "0100#7F4"; and begins program execution at the address given by the Task interrupt. The stack-state following reset is shown in Table 2.

TABLE 2

| Address | Contents |
| --- | --- |
| Hex "0100#7FC" | stack pointer register A14 from before reset left shifted one place |
| Hex "0100#7F8" | instruction register-address stage IRA from before reset |
| Hex "0100#7F4" | instruction register-execute stage IRE from before reset |

The prior states of instruction register-address stage IRA and instruction register-execute stage IRE include the control bits 2–0. Note that stack pointer A14 now contains the address Hex "0100#7F0".

The "H" bit (bit 30) of the command word is a halt bit. Master processor 60 may issue this command word to any digital image/graphics processor, or a digital image/graphics processor may issue this command word to itself. In the contemplated embodiment no digital image/graphics processor may halt another digital image/graphics processor. When a designated digital image/graphics processor receives this command word, the digital image/graphics processor sets a halt latch and stalls the pipeline. The digital image/graphics processor after that behaves as if in an infinite crossbar memory contention. Nothing is reset and no interrupts occur or are recognized. Note that when a digital image/graphics processor halts itself by sending a command word, the two instructions following the instruction sending the halt command word are in its instruction pipeline. Note that the address pipeline stage of the first instruction following an instruction issuing a halt command word will have already executed its address pipeline stage due to the nature of the instruction pipeline. This halt state can only be reversed by receiving an unhalt command word from master processor 60.

The Halt condition reduces power consumption within the digital image/graphics processor because its state is unchanging. Further reduced power is achieved by stopping the clocks while the digital image/graphics processor is in this mode.

The "U" bit (bit 29) of the command word is an unhalt bit. This command word can only be issued by master processor 60 to one or more of digital image/graphics processors 71, 72, 73 and 74. An unhalt command word clears halt latch of the destination digital image/graphics processor. The digital image/graphics processor then recommences code execution following a halt as if nothing had happened. This is the preferable way to start a digital image/graphics processor following a hardware or command word reset. Upon execution of an unhalt command word, the destination digital image/graphics processor begins code execution at the address given by its task interrupt vector. The "U" bit takes priority over the "H" bit of a single command word. Thus receipt of a single command word with both the "H" bit and the "U" bit set results in execution of the unhalt command. Note that simultaneously receipt of an unhalt command word from master processor 60 and a halt command word transmitted by the digital image/graphics processor itself grants priority to the master processor 60 unhalt command word. The "R" bit takes priority over the "U" bit. Thus receipt of a single command word from master processor 60 having both the "R" bit and the "U" bit set results in the digital image/graphics processor reset to the halted condition.

The "T" bit (bit 28) of the command word is an instruction cache flush bit. Master processor 60 may issue this command word to any digital image/graphics processor, or a digital image/graphics processor may issue such a command word to itself. In the contemplated embodiment no digital image/graphics processor may order an instruction cache flush by another digital image/graphics processor. A designated digital image/graphics processor receiving this command word flushes its instruction cache. An instruction cache flush causes the cache tag value field to be set to the cache tag register's own number, clears all their present bits, and sets the LRU bits to the tag register's own number.

The "D" bit (bit 27) of the command word indicates a data cache flush. Digital image/graphics processors 71, 72, 73 and 74 do not employ data caches, therefore this command word does not apply to digital image/graphics processors and is ignored by them. Master processor 60 may send this command word to itself to flush its data cache memories 13 and 14.

The "K" bit (bit 14) of the command word indicates a task interrupt. Master processor 60 may send this command word to any digital image/graphics processor 71, 72, 73 or 74, but no digital image/graphics processor may send this command word to another digital image/graphics processor or to master processor 60. Upon receipt of a task command word, any digital image/graphics processor designated in the command word takes a task interrupt if enabled by bit 14 of interrupt enable register INTEN 110.

The "G" bit (bit 13) of the command word indicates a message interrupt. Any digital image/graphics processor may send this message interrupt to any other digital image/graphics processor or to master processor 60. Any digital image/graphics processor designated in such a command word will set its message interrupt flag, and take a message interrupt if message interrupts are enabled via bit 20 of interrupt enable register INTEN 110. In the preferred embodiment this command word is not sent to transfer controller 80.

When a digital image/graphics processor issues a command word to itself, to halt itself via the "H" bit or flush its instruction cache via the "T" bit, this command word should have the corresponding digital image/graphics processor designator bit set, to execute the .command. This is for consistency, and to allow future expansion of command word functions.

FIG. 5 illustrates schematically the field definitions of communications register COMM. The "F", "S", "Q" and "P" bits (bits 31–28) are employed in communication of packet transfers from a digital image/graphics processor 71, 72, 73 or 74 and transfer controller 80. The "F" and "S" bits are normal read/write bits. The "P" bit may be written to only if the "S" bit is "0" or is being simultaneously cleared to "0". The "Q" bit is read only. Packet transfers are requests by a digital image/graphics processor 71, 72, 73 or 74 for data movement by transfer controller 80. These data movements may involve only memories 11–14 and 21–40 internal to multiprocessor integrated circuit 100 or may involve both internal memory and external memory. Packet transfers are stored as a linked-list structure and only a single packet transfer may be active at a time for each digital image/graphics processor. A linked-list pointer at a dedicated address within the parameter memory 25, 30, 35 or 40 corresponding to the requesting digital image/graphics processor 71, 72, 73 or 74 points to the beginning of the active linked-list. Each entry in the linked-list contains a pointer to the next list entry.

Initializing a packet transfer involves the following steps. First, the digital image/graphics processor sets the desired packet transfer parameters into its corresponding parameter memory. Next, the digital image/graphics processor stores the address of the first link of the linked-list at the predetermined address Hex "0100#0FC" in its corresponding parameter memory, where "#" is replaced with the digital image/graphics processor number. Setting the "P" bit (bit 28) of communications register COMM 120 to "1" alerts transfer controller 80 of the packet transfer. The digital image/graphics processor may request a high priority by setting the "F" bit (bit 31) to "1" or a low priority by clearing the "F" bit "0".

Transfer controller 80 recognizes when the "P" bit is set and assigns a priority to the packet transfer based upon the state of the "F" bit. Transfer controller 80 clears the "P" bit and sets the "Q" bit, indicating that a packet transfer is in queue. Transfer controller 80 then accesses the predetermined address Hex "0100#0FC" within the corresponding parameter memory and services the packet transfer based upon the linked-list. Upon completion of the packet transfer, transfer controller 80 clears the "Q" bit to "0" indicating that the queue is no longer active. The digital image/graphics processor may periodically read this bit for an indication that the packet transfer is complete. Alternatively, the packet transfer itself may instruct transfer controller 80 to interrupt the requesting digital image/graphics processor when the packet transfer is complete. In this case, transfer controller 80 sends an interrupt to the digital image/graphics processor by setting bit 19, the packet transfer end interrupt bit PTEND, in interrupt flag register INTFLG 115. If transfer controller 80 encounters an error in servicing the packet transfer, it sends an interrupt to the digital image/graphics processor by setting bit 18, the packet transfer error interrupt bit PTERROR, in interrupt flag register INTFLG 115. The digital image/graphics processor has the appropriate interrupt vectors stored at the locations noted in Table 1 and the appropriate interrupt service routines.

The digital image/graphics processor may request another packet while transfer controller 80 is servicing a prior request. In this event the digital image/graphics processor sets the "P" bit to "1" while the "Q" bit is "1". If this occurs, transfer controller 80 sends a packet transfer busy interrupt PTB to the digital image/graphics processor by setting bit 17 of interrupt flag register INTFLG 115. Transfer controller 80 then clears the "P" bit to "0". The interrupt service routine of requesting digital image/graphics processor may suspend the second packet transfer while the first packet transfer is in queue, cancel the packet transfer or take some other corrective action. This feature permits the digital image/graphics processor to submit packet transfers without first checking the "Q" bit of communications register COMM 120.

The digital image/graphics processor may suspend service of the packet transfer by setting the "S" bit to "1". Transfer controller 80 detects when the "S" bit is "1". If this occurs while a packet transfer is in queue, transfer controller 80 copies the "Q" bit into the "P" bit and clears the "Q" bit. This will generally set the "P" bit to "1". Software within the requesting digital image/graphics processor may then change the status of the "S" and "P" bits. Transfer controller 80 retains in memory its location within the linked-list of the suspended packet transfer. If transfer controller 80 determines that the "S" bit is "0" and the "P" bit is simultaneously "1", then the suspended packet transfer is resumed.

The "Sync bits" field (bits 15–8) of communications register COMM 120 are used in a synchronized multiple instruction, multiple data mode. This operates for any instructions bounded by a lock instruction LCK, which enables the synchronized multiple instruction, multiple data mode, and an unlock instruction UNLCK, which disables this mode. Bits 11–8 indicate whether instruction fetching is to be synchronized with digital image/graphics processors 74, 73, 72 and 71, respectively. A "1" in any of these bits indicates the digital image/graphics processor delays instruction fetch until the corresponding digital image/graphics processor indicates it has completed execution of the prior instruction. The other digital image/graphics processors to which this digital image/graphics processor is to be synchronized will similarly have set the corresponding bits in their communication register COMM 120. It is not necessary that the "Sync bit" corresponding to itself be set when a digital image/graphics processor is in the synchronized multiple instruction, multiple data mode, but this does no harm. Note that bits 15–12 are reserved for a possible extension to eight digital image/graphics processors.

The "DIGP#" field (bits 2–0) of communications register COMM 120 are unique to each particular digital image/graphics processor on multiprocessor integrated circuit 100. These bits are read only, and any attempt to write to these bits fails. This is the only part of the digital image/graphics processors 71, 72, 73 and 74 that is not identical. Bits 1–0 are hardwired to a two bit code that identifies the particular digital image/graphics processor as shown in Table 3.

TABLE 3

| COMM field | | Parallel |
|---|---|---|
| 1 | 0 | Processor |
| 0 | 0 | DIGP0 (71) |
| 0 | 1 | DIGP1 (72) |
| 1 | 0 | DIGP2 (73) |
| 1 | 1 | DIGP3 (74) |

Note that bit 2 of communications register COMM 120 is reserved for use in a multiprocessor integrated circuit 100 having eight digital image/graphics processors. In the current preferred embodiment this bit is hardwired to "0" for all four digital image/graphics processors 71, 72, 73 and 74.

This part of communications register COMM 120 serves to identify the particular digital image/graphics processor. The identity number of a digital image/graphics processor may be extracted by ANDing communications register COMM 120 with 7 (Hex "0000007"). The instruction "D0= COMM&7" does this, for example. This instruction returns only the data in bits 2–0 of communications register COMM 120. Note that this instruction is suitable for embodiments having eight digital image/graphics processors. Since the addresses of the data memories and parameter memories corresponding to each digital image/graphics processor depend on the identity of that digital image/graphics processor, the identity number permits software to compute the addresses for these corresponding memories. Using this identity number makes it is possible to write software that is independent of the particular digital image/graphics processor executing the program.

Multiprocessor integrated circuit 100 can operate in either little endian or big endian data formats. Unless otherwise noted, figures and tables represent operation in big endian format. Bit numbering for internal registers and the external data bus will always follow little endian convention with bit 0 on the right. Bytes within 64 bit double words are addressed from the right in little endian mode and from the left in big endian mode. Confusion can be avoided by always accessing internal registers using 32 bit operations. In other embodiments, wider or narrower bus widths are contemplated. Bus widths that are integral multiples of 16 bits are believed quite useful.

Transfer controller 80 provides the interface between master processor 60 and digital image/graphic processors 71, 72, 73 and 74 of multiprocessor integrated circuit 100 and external memory such as video RAM's 5 and 6 and memory 9. Transfer controller 80 performs some autonomous memory operations as well as memory operations requested by the processors. These will be described below. Transfer controller 80 has a 64 bit bus connection to crossbar 50 that provides access to all memories 11, 12, 13, 14, 15, 21, 22, 23, 24, 25, 26, 27, 28, 29, 30, 31, 32, 33, 34, 35, 36, 37, 38, 39 and 40. Thus transfer controller 80 may access all the instruction caches, data memories and parameter memories. A second 64 bit bus connects to the image system bus and provides off-chip access.

Transfer controller 80 permits an external host to gain access to the external memory via the image systems bus through the use of its hold/hold-acknowledge mechanism. Transfer controller 80 services cache misses and packet transfer requests, performs refresh of external DRAMs/VRAMs and performs the serial register transfer cycles required by the frame controller 90 to update VRAM based display/capture buffers. Transfer controller 80 memory operations involving memories 22, 23, 24, 27, 28, 29, 32, 33, 34, 37, 38 and 39 usually occur in response to packet transfer requests from digital image/graphics processors 71, 72, 73 and 74 or master processor 60. Packet transfers provide an extremely flexible method of transferring data between on-chip and/or off-chip memory. Transfer controller 80 may also provide data directly to the processors using direct external access (DEA) cycles. A direct external access cycle allows digital image/graphics processors 71, 72, 73 and 74 to access off-chip memory and allows master processor 60 to by-pass its data cache memories 12 and 13 when accessing external memory. Transfer controller 80 prioritizes the various requests and, when necessary, time-shares the external memory interface between packet transfer requests. All requests from the master processor 60, digital image/graphics processors 71, 72, 73 and 74, frame controller 90 and host processing system 1 are evaluated by transfer controller 80 and then serviced based on a fixed prioritization scheme. When multiple requests of the same priority are pending, transfer controller 80 services them on a round robin basis.

Transfer controller 80 must handle many different types of requests from the processors. In order to assure optimal system performance, these requests are prioritized by their urgency and importance. Because transfer controller 80 operates at these different priorities, its own priority on crossbar 50 can vary from cycle to cycle.

Figure 6:
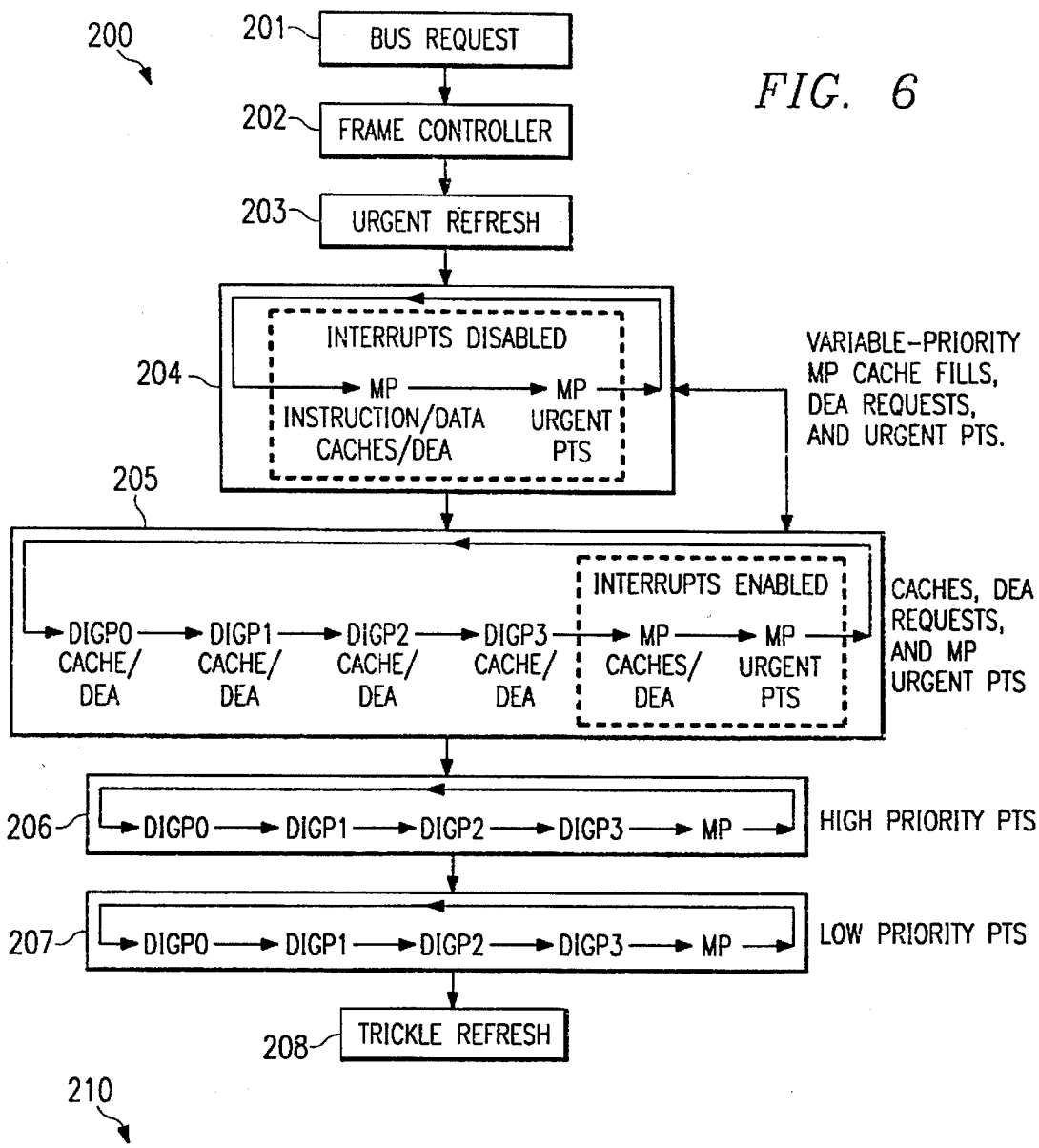
FIG. 6 illustrates image system bus priorities and method of operation.

FIG. 6 illustrates the priority of operation of transfer controller 80 on the image system bus. This is shown as a hierarchy 200. When multiple requests are received with the same priority, transfer controller 80 will round robin between them. This is shown in FIG. 6. Note that any processor can have only one active priority for its packet transfer. Digital image/graphics processors 71, 72, 73 and 74 are restricted to high and low priority packet transfers, while master processor 60 may submit a packet transfer request of urgent, high and low priority.

Top priority 201 is service of external bus request by host processing system 1 (HREQ). Transfer processor 80 is responsive to a signal on a host request line to surrender control of the image system bus to host processing system 1.

The next lower priority 202 is service of memory requests from frame controller 90. The next lower priority 203 is service of urgent dynamic random access memory (DRAM) refresh requests. As described further below, these urgent DRAM refresh requests occur when a predetermined backlog of DRAM refresh requests form.

The next priority 204 is service of master processor 60 instruction cache memories 11 and 12, data cache memories 12 and 13 and urgent packet transfer requests of master processor 60 when interrupts are disabled. All operations of transfer controller 80 involving the caches are requested automatically by the associated cache logic contained within each processor. The requested data is moved from its external memory location to the appropriate sub-block in the data cache memory of the requesting processor. Transfer controller 80 also saves the dirty sub-blocks of data cache memories 13 and 14 for master processor 60 when required by master processor 60. The urgent packet transfer request may only be requested by master processor 60 and includes setting a particular bit within the packet transfer request. This will be further described below. Note that these data transfers have a lower priority if master processor 60 has interrupts enabled.

The next lower level of priority involves service of instruction cache requests or direct external access (DEA) request of digital image/graphics processors 71, 72, 73 and 74 or master processor 60 instruction cache memories 11 and 12, data cache memories 12 and 13 and urgent packet transfer requests of master processor 60 when interrupts are enabled. Note that simultaneous access requests at this level are handled on a round robin basis depending on the requesting processor. A cache service request and a direct external access request for the same processor are serviced before passing the token to the next processor.

The next level of priority 206 is high priority packet transfers. As illustrated in FIG. 6, the packet transfers originating from the various processors are handled in a round robin fashion. Master processor 60 or one of the digital image/graphics processors 71, 72, 73 or 74 would ordinarily employ a high priority packet transfer if that processor is waiting for the requested data. Transfer controller 80 employs a similar round robin for low priority packet transfers, which form the next level of priority 207. Master processor 60 or one of the digital image/graphics processors 71, 72, 73 or 74 would ordinarily employ a low priority packet transfer if that processor is not waiting for the requested data. As will be further described below, the requesting processor indicates whether the packet transfer is to be urgent, high or low priority.

The rationale for the priority of each request is explained below. An external device, such as a host processing system 1, should be able to gain immediate access if it wishes. The external device can yield the image system bus back to transfer controller 80 for high priority requests if required by monitoring the REQ[1:0] pins as explained further below. Frame controller 90 requests receive the second highest priority so that time critical VRAM transfer cycles can occur without disruption to video display or capture. Since host request cycles and frame controller 90 requests occur only intermittently, urgent DRAM refreshes, which require high priority, are prioritized below them. The next priority level is for master processor 60 cache service, direct external access and urgent priority packet transfer cycles that occur when master processor 60's interrupts are disabled. This allows master processor 60 interrupt service routines (which normally disable interrupts) to be performed as quickly as possible to maximize system performance. Digital image/graphics processors 71, 72, 73 and 74 cache service and direct external access requests are next in priority. It is important that these be serviced quickly since the processor is idle until the request is serviced. Master processor 60 cache service, and direct external access requests and urgent packet transfers are also at this priority if interrupts are enabled, since master processor 60 is not servicing an interrupt request from elsewhere in the system. High priority packet transfers imply that the requesting processor is waiting for data to finish transferring or that transfer controller 80 needs to take priority over the digital image/graphics processors 71, 72, 73 and 74 for crossbar access in order to optimize external bus bandwidth. Low priority packet transfers imply that the processor is not waiting for the data so they are given a very low priority. The lowest priority in the contemplated embodiment is given to trickle refresh cycles. These are only performed when the external bus is idle and the refresh backlog is non-zero. This helps lower the backlog and reduce the likelihood of a high priority urgent refresh being requested at a later time.

Whenever transfer controller 80 receives multiple requests from different processors of the same priority, it will form a round robin between them. The round robin is a fixed cyclical priority scheme. This means that no processor may be removed from the round robin nor may the order of the processors within the cycle be changed. When a request of a particular processor is completed, the round robin token will always be passed to the next processor with a pending request in the chain. This prevents any one processor from monopolizing transfer controller 80 when requests of equal priority from other processors need to be serviced.

The crossbar priority of transfer controller 80 changes dynamically according to the level of request that transfer controller 80 is servicing. This is shown in hierarchy 210 illustrated in FIG. 7. Transfer controller 80 is assigned priority as follows. Transfer controller 80 operates with a priority 211 above master processor 60 priority 212 when servicing an urgent priority packet transfer request, a cache service request, a direct external access request, or when flushing its pipeline. Transfer controller 80 flushes its pipeline whenever it receives an urgent DRAM refresh request, a request from frame controller 90, host interface request or a soft reset. These may not begin with external cycles waiting to be completed. Pipeline flushing only occurs occasionally and only locks out master processor 60 for a short period of time.

Transfer controller 80 is given a priority 213 above the priority 214 of digital image/graphics processors 71, 72, 73 and 74 but below master processor 60 for high priority packet transfers. This gives transfer controller 80 maximum possible priority without locking out master processor 60. Since master processor 60 will generally be used as the controller, locking it out for prolonged periods could have undesirable system implications.

Transfer controller 80 has priority 215 is below the priority 214 of digital image/graphics processors 71, 72, 73 and 74 round robin if it is performing a low priority packet transfer. This prevents transfer controller 80 from stealing crossbar bandwidth from digital image/graphics processors 71, 72, 73 and 74 when the packet transfer has a low priority. Note local memory accesses of digital image/graphics processors 71, 72, 73 and 74 are directed to different memories and cannot interfere. Thus these local memory accesses have the same stage in the round robin.

Whenever a higher priority request is received by transfer controller 80, it will complete or suspend its current operations at the crossbar priority of the new request. This ensures that no blockages occur in the system. Thus, for example, a low priority packet transfer suspension will occur at the high priority level when a high priority packet transfer request is received.

Transfer controller 80 automatically services digital image/graphics processors 71, 72, 73 and 74 instruction cache misses and master processor 60 instruction and data cache misses. When multiple cache service requests are received, transfer controller 80 prioritizes them on a round robin basis as shown in FIG. 6. Transfer controller 80 signals the requesting processor when its cache miss has been serviced. Master processor 60 may have both its instruction and data caches serviced within its turn on the round robin.

The instruction caches of digital image/graphics processors 71, 72, 73 and 74 are one-way set associative (fully associative) caches consisting of 4 blocks each with 4 128-byte (16-instruction) sub-blocks. Multiple-way set associative caches are contemplated in other embodiments. When a digital image/graphics processor experiences a cache miss, its program flow control unit will signal transfer controller 80, requesting a cache miss service. The digital image/graphics processors 71, 72, 73 or 74 determines the cache block in which the instructions should be placed and passes this information as well as the address to transfer controller 80. Transfer controller 80 will then fetch a complete sub-block (128 bytes) from external memory and place it in the appropriate cache sub-block of the requesting digital image/graphics processor 71, 72, 73 or 74. Transfer controller 80 then informs digital image/graphics processor 71, 72, 73 or 74 that the request has been serviced so that the processor can continue executing its program.

Master processor 60 caches are four-way set associative with each set consisting of 4 blocks. Each block contains 4 64-byte sub-blocks. Master processor 60 may request service on it's instruction cache or data cache or both. Master processor 60 instruction cache service request is handled identically to digital image/graphics processors 71, 72, 73 and 74 cache request except that the size of the sub-block fetched by transfer controller 80 is only 64 bytes.

Data cache memories 13 and 14 of master processor 60 are different from instruction caches 11 and 12 in that transfer controller 80 may be requested to write the contents back to external memory. For master processor 60 data cache misses, transfer controller 80 fetches a 64 byte sub-block as with master processor 60 instruction cache. If, however, master processor 60 experienced a block miss because no matching tag address is found and all blocks have been used, it will first request transfer controller 80 to write back any dirty sub-blocks in the "least recently used" block before that block is replaced. Dirty sub-block write backs can all take place within a single master processor 60 "turn" in the round robin priority. Transfer controller 80 may also be requested to write back a dirty sub-block in response to special cache instruction.

Transfer controller 80 is responsible for handling all direct external access (DEA) requests from master processor 60 and digital image/graphics processors 71, 72, 73 and 74. Direct external access cycles allow digital image/graphics processors 71, 72, 73 and 74 to access data in external memory directly and allow the master processor 60 to by-pass its data cache. Since direct external access accesses are given a high priority, they are limited to a single access which may be a byte, half-word (16 bits), word (32 bits), or double-word (64 bits) in length. This prevents a single processor from monopolizing the external bus with multiple direct external access cycles, which would prevent the direct external access request and cache misses of other processors from being serviced. Direct external access cycles are meant to be used when fast access to a single off-chip memory location, such as a program variable or off-chip register, is needed.

Digital image/graphics processors 71, 72, 73 and 74 may access their parameter memories 25, 30, 35 and 40, and their data memories 22, 23, 24, 26, 28, 29, 32, 33, 34, 37, 38 and 39 normally. Accesses to addresses of Hex "02000000" and above automatically cause a direct external access request to be sent to transfer controller 80. The request will be serviced when the requesting digital image/graphics processors 71, 72, 73 and 74 turn in the cache/direct external access round robin is reached. Both a cache-miss and direct external access request may be serviced in a single turn if both requests are pending. A digital image/graphics processor 71, 72, 73 or 74 access to an on-chip memory area not accessible via the crossbar such as master processor 60 parameter memory 15 will be converted to a direct external access request to transfer controller 80. That direct external access, however, will result in a fault. Digital image/graphics processors 71, 72, 73 and 74 direct external access cycles that cause a fault to occur are handled identically to faulted digital image/graphics processors 71, 72, 73 and 74 cache cycles.

Master processor 60 uses direct external access cycles in a slightly different manner than digital image/graphics processors 71, 72, 73 and 74. Master processor 60 normally accesses external memory through data cache memories 13 and 14. Master processor 60 uses direct external access cycles to by-pass data cache memories 13 and 14 and access memory directly. Direct external access cycles are specified explicitly using special memory load or store instructions. If master processor 60 attempts to perform such a special load or store instruction to an on-chip address that is not accessible to master processor 60 (such as a digital image/ graphics processors 71, 72, 73 and 74 instruction cache memories 21, 26, 31 and 36) the operation will be converted into a direct external access request which will then be faulted by transfer controller 80. A special memory load or store operation to an accessible on-chip memory area such as the on-chip registers or a digital image/graphics processors 71, 72, 73 and 74 data memories 22, 23, 24, 27, 28, 29, 32, 33, 34, 37, 38 and 39) will be converted to a normal load or store operation and no direct external access request will occur via transfer controller 80.

Figure 8:
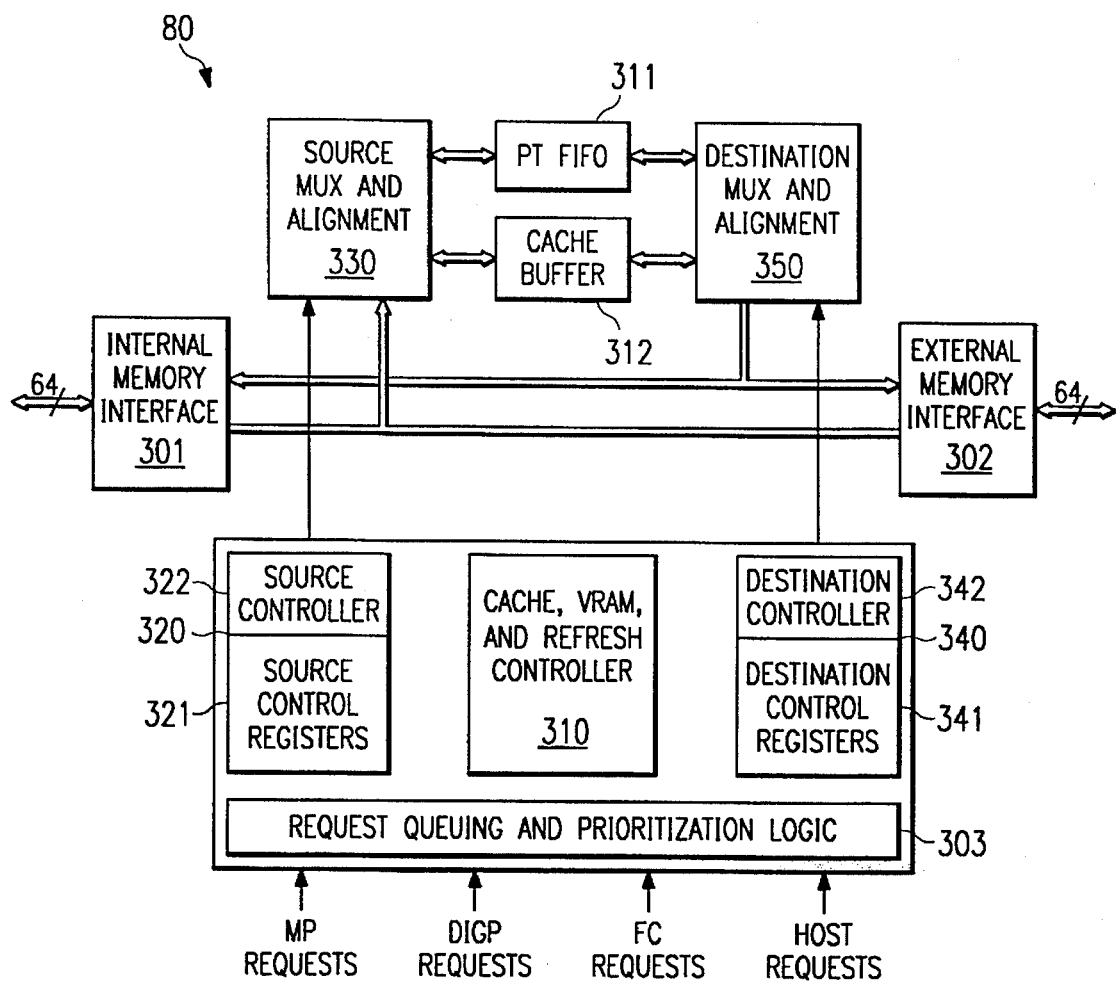
FIG. 8 illustrates the transfer processor structure of an inventive embodiment.

FIG. 8 illustrates a high-level block diagram of transfer controller 80. A brief description of each major block is given below. Transfer controller 80 includes: internal memory interface 301; external memory interface 302; request queuing and prioritization circuit 303; cache, VRAM and refresh controller 310; packet transfer first-in-first-out (FIFO) buffer 311; cache buffer 312; source machine 320 consisting of source registers 321 and source control logic 322; source multiplexer and alignment logic 330; destination machine 340 consisting of destination registers 341 and destination control logic 342; and destination multiplexer and alignment logic 350.

Transfer controller 80 is responsible for all accesses to external memory by multiprocessor integrated circuit 100. The external memory interface is designed to accommodate many different types and sizes of memory devices and peripherals. The type of memory being accessed is dynamically determined, allowing the timing of each memory cycle to be optimized for the device being accessed.

The following is a list of multiprocessor integrated circuit 100 signals used for external data access via external memory interface 302.

Address bus A[31:0]. This provides a 32 bit byte address from multiprocessor integrated circuit 100 into external memory. The address can be multiplexed for DRAM accesses.

Address shift selection AS[2:0]. These inputs determines shift amount of imparted to the column address by transfer processor 80. Eight shift amounts (including none) are supported as shown in Tables 4a and 4b. Note Table 4a shows the output on address bus bits A[31:16] and Table 4b shows the output on address bus bits A[15:0]

TABLE 4a

| AS[2:0] | | | A[31:16] | | | | | | | | | | | | | | | |
|---|---|---|---|---|---|---|---|---|---|---|---|---|---|---|---|---|---|---|
| | | | 31 | 30 | 20 | 28 | 27 | 26 | 25 | 24 | 23 | 22 | 21 | 20 | 19 | 18 | 17 | 16 |
| 0 | 0 | 0 | 31 | 30 | 20 | 28 | 27 | 26 | 25 | 24 | 23 | 22 | 21 | 20 | 19 | 18 | 17 | 16 |
| 0 | 0 | 1 | 23 | 22 | 21 | 20 | 19 | 18 | 17 | 16 | 15 | 14 | 13 | 12 | 11 | 10 | 9 | 8 |
| 0 | 1 | 0 | 22 | 21 | 20 | 19 | 18 | 17 | 16 | 15 | 14 | 13 | 12 | 11 | 10 | 9 | 8 | 7 |
| 0 | 1 | 1 | 21 | 20 | 19 | 18 | 17 | 16 | 15 | 14 | 13 | 12 | 11 | 10 | 9 | 8 | 7 | 6 |
| 1 | 0 | 0 | 20 | 19 | 18 | 17 | 16 | 15 | 14 | 13 | 12 | 11 | 10 | 9 | 8 | 7 | 6 | 5 |
| 1 | 0 | 1 | 19 | 18 | 17 | 16 | 15 | 14 | 13 | 12 | 11 | 10 | 9 | 8 | 7 | 6 | 5 | 4 |
| 1 | 1 | 0 | 18 | 17 | 16 | 15 | 14 | 13 | 12 | 11 | 10 | 9 | 8 | 7 | 6 | 5 | 4 | 3 |
| 1 | 1 | 1 | 17 | 16 | 15 | 14 | 13 | 12 | 11 | 10 | 9 | 8 | 7 | 6 | 5 | 4 | 3 | 2 |

TABLE 4b

| AS[2:1] | | | A[15: 0] | | | | | | | | | | | | | | | |
|---|---|---|---|---|---|---|---|---|---|---|---|---|---|---|---|---|---|---|
| | | | 15 | 14 | 13 | 12 | 11 | 10 | 9 | 8 | 7 | 6 | 5 | 4 | 3 | 2 | 1 | 0 |
| 0 | 0 | 0 | 15 | 14 | 13 | 12 | 11 | 10 | 9 | 8 | 7 | 6 | 5 | 4 | 3 | 2 | 1 | 0 |
| 0 | 0 | 1 | 7 | 6 | 5 | 4 | 3 | 2 | 1 | 0 | X | X | X | X | X | 2 | 1 | 0 |
| 0 | 1 | 0 | 6 | 5 | 4 | 3 | 2 | 1 | 0 | X | X | X | X | X | X | 2 | 1 | 0 |
| 0 | 1 | 1 | 5 | 4 | 3 | 2 | 1 | 0 | X | X | X | X | X | X | X | 2 | 1 | 0 |
| 1 | 0 | 0 | 4 | 3 | 2 | 1 | 0 | X | X | X | X | X | X | X | X | 2 | 1 | 0 |
| 1 | 0 | 1 | 3 | 2 | 1 | 0 | X | X | X | X | X | X | X | X | X | 2 | 1 | 0 |
| 1 | 1 | 0 | 2 | 1 | 0 | X | X | X | X | X | X | X | X | X | X | 2 | 1 | 0 |
| 1 | 1 | 1 | 1 | 0 | X | X | X | X | X | X | X | X | X | X | X | 2 | 1 | 0 |

During the row address time address bus A[31:0] outputs normal address values. During the column address time address bus A[31:0] outputs address values shifted according to the address shift selection AS[2:0] as shown in Tables 4a and 4b. Note that address line outputs noted as "X" are not driven and set at a high impedance state.

Bus size selection BS[1:0]. Allows dynamic bus sizing for data buses less than 64 bits wide. The encoding of these inputs is shown below in Table 5.

TABLE 5

| BS[1:0] | | Bus Size |
| --- | --- | --- |
| 0 | 0 | 8 bits |
| 0 | 1 | 16 bits |
| 1 | 0 | 32 bits |
| 1 | 1 | 64 bits |

Output clock CLKOUT. This clock output allows of external logic to synchronize to the operation of multiprocessor integrated circuit 100.

Column timing selection CT[1:0]. These inputs determine what the timing of the current memory cycle imparted by transfer controller 80. The encoding of these inputs is shown below in Table 6.

TABLE 6

| CT[1:0] | | Memory Timing |
| --- | --- | --- |
| 0 | 0 | Pipelined one cycle/column |
| 0 | 1 | Non-Pipelined one cycle/column |
| 1 | 0 | Non-Pipelined two cycles/column |
| 1 | 1 | Non-Pipelined three cycles/column |

Column address strobes $\overline{CAS}$[7:0]. These outputs drive the $\overline{CAS}$ inputs of DRAMs/VRAMs. Eight strobes are provided to allow individual byte access. $\overline{CAS}$[0] corresponds to the transfer of data on D[7:0], $\overline{CAS}$[1] to a transfer on D[15:8], etc. regardless of the endian mode. In transparency, these signals are used as byte write strobes.

Data bus D[63:0]. This input/output bus allows access of up to 64 bits per memory cycle into or out of multiprocessor integrated circuit 100.

Data buffer output enable $\overline{DBEN}$. This output can be used to turn on data transceivers.

Data direction indicator $\overline{DDIN}$. This output provides direction indicator to data transceivers.

Special function pins DSF1 and DSF2. These outputs are used to select special VRAM functions.

Fault $\overline{FAULT}$. This input informs multiprocessor integrated circuit 100 that a memory fault has occurred.

Page size selection PS[2:0]. These inputs indicate to multiprocessor integrated circuit 100 the page size of the memory currently being accessed. The use of these inputs will be further detailed below.

Row address strobe $\overline{RAS}$. These outputs drive the $\overline{RAS}$ inputs of DRAMs/VRAMs.

READY. This input indicates that the external device is ready for the memory cycle to be completed. This is used by transfer controller 80 to insert wait states into memory cycles.

Retry $\overline{RETRY}$. This input indicates to multiprocessor integrated circuit 100 that the memory is busy and transfer controller 80 should begin the memory cycle again.

Row latch $\overline{RL}$. This output indicates that a valid 32 bit address is present on the address bus.

Status code STATUS[4:0]. These output provide detailed information about the type and origin of the current transfer controller memory cycle. From the start of the row access until the start of the column access STATUS[4:0] outputs are encoded as shown in Table 7. These encoding together with $\overline{UTIME}$ described below permit an external device to generate memory timings corresponding to those of multiprocessor integrated circuit 100.

TABLE 7

| STATUS[4:0] | | | | | Activity |
| --- | --- | --- | --- | --- | --- |
| 0 | 0 | 0 | 0 | 0 | Normal read |
| 0 | 0 | 0 | 0 | 1 | Normal write |
| 0 | 0 | 0 | 1 | 0 | Refresh |
| 0 | 0 | 0 | 1 | 1 | Reserved |
| 0 | 0 | 1 | 0 | 0 | Peripheral device packet transfer read |
| 0 | 0 | 1 | 0 | 1 | Peripheral device packet transfer write |
| 0 | 0 | 1 | 1 | 0 | Reserved |
| 0 | 0 | 1 | 1 | 1 | Reserved |
| 0 | 1 | 0 | 0 | 0 | Reserved |
| 0 | 1 | 0 | 0 | 1 | Block write |
| 0 | 1 | 0 | 1 | 0 | Reserved |
| 0 | 1 | 0 | 1 | 1 | Reserved |
| 0 | 1 | 1 | 0 | 0 | Reserved |
| 0 | 1 | 1 | 0 | 1 | Load color register |
| 0 | 1 | 1 | 1 | 0 | Reserved |
| 0 | 1 | 1 | 1 | 1 | Reserved |
| 1 | 0 | 0 | 0 | 0 | Frame 0 full shift register read |
| 1 | 0 | 0 | 0 | 1 | Frame 0 full shift register write |
| 1 | 0 | 0 | 1 | 0 | Frame 0 split shift register read |
| 1 | 0 | 0 | 1 | 1 | Frame 0 split shift register read |
| 1 | 0 | 1 | 0 | 0 | Frame 1 full shift register read |
| 1 | 0 | 1 | 0 | 1 | Frame 1 full shift register read |
| 1 | 0 | 1 | 1 | 0 | Frame 1 split shift register read |
| 1 | 0 | 1 | 1 | 1 | Frame 1 split shift register read |
| 1 | 1 | 0 | 0 | 0 | Reserved |
| 1 | 1 | 0 | 0 | 1 | Reserved |
| 1 | 1 | 0 | 1 | 0 | Reserved |
| 1 | 1 | 0 | 1 | 1 | Reserved |
| 1 | 1 | 1 | 0 | 0 | Packet transfer full shift register read |
| 1 | 1 | 1 | 0 | 1 | Packet transfer full shift register write |
| 1 | 1 | 1 | 1 | 0 | Reserved |
| 1 | 1 | 1 | 1 | 1 | Reserved |

The details of the row time status codes are as follows. A normal read code is output for any read cycle generated by a packet transfer, cache miss, or direct external access request. A normal write code is output for any normal write cycle generated by a packet transfer, data cache write back or direct external access request. A refresh code is output during trickle refresh cycles and during burst refresh cycles generated by an urgent refresh request from the refresh controller.

The peripheral device packet reads and writes will be further explained below. A peripheral device packet transfer read code is output for a memory read cycle that is occurring as a result of a peripheral device packet transfer. This indicates that the data read from memory on the subsequent column accesses should be latched by the peripheral device that initiated the transfer. A peripheral device packet transfer write code is output for a memory write cycle that is occurring as a result of a peripheral device packet transfer. This indicates that multiprocessor integrated circuit 100 will be placing its data bus in high-impedance during the subsequent column access so that the peripheral device may drive the bus with data to be placed in memory.

Block writes are special VRAM cycles. The block write code is output during a block write cycle to VRAMs generated by a packet transfer with block write access mode. The load color register code is output during the color register load portion of a packet transfer that has specified block write as its access mode. This cycle is used to place data in the color registers of system VRAMs. This color register data is written to memory during a block write cycle.

A packet transfer shift register read code is output during source cycles of packet transfers using the serial register transfer access mode. This cycle performs a read memory to register transfer on system VRAMs. A packet transfer shift register write code is output during destination cycles of a packet transfer that specified serial register transfer access mode. This cycle performs a write register to memory transfer on system VRAMs.

The frame cycles are memory accesses required by frame controller 90. Shift register reads and writes are special serial register VRAM cycles. The frame 0 of 1 read transfer code is output during respective full read transfer cycles requested by frame controller 90. These cycles perform full read transfer cycles on system VRAMs. The STATUS[2] signal is "0" for frame 0 requested cycles and "1" for frame 1 requested cycles. The frame 0 or 1 write transfer code is output during full write transfer cycles requested by frame controller 90. These cycles perform full write transfer cycles on system VRAMs. The STATUS[2] signal is "0" for frame 0 requested cycles and "1" for frame 1 requested cycles. The frame 0 or 1 split read transfer code is output when frame controller 90 requests a split read transfer cycle. These cycles transfer from a row of VRAM memory into half of the serial register. The STATUS[2] signal is "0" for frame 0 requested cycles and "1" for frame 1 requested cycles. The frame 0 or 1 split write transfer code is output during a split write transfer cycle requested by frame controller 90. These cycles transfer half of a VRAM serial register into the memory array. The STATUS[2] signal is "0" for frame 0 requested cycles and "1" for frame 1 requested cycles.

From the start of the column access until the start of the row access STATUS[4:0] outputs are encoded as shown in Table 8. This information is output by multiprocessor integrated circuit 100 via transfer controller 80 to indicate the module requesting the memory cycle. These signals are provided for system analysis and debug, they are not needed by the external memory system.

TABLE 8

| STATUS[4:0] | | | | | Activity |
|---|---|---|---|---|---|
| 0 | 0 | 0 | 0 | 0 | DIGP0 low priority packet transfer |
| 0 | 0 | 0 | 0 | 1 | DIGP0 high priority packet transfer |
| 0 | 0 | 0 | 1 | 0 | DIGP0 cache |
| 0 | 0 | 0 | 1 | 1 | DIPG0 DEA |
| 0 | 0 | 1 | 0 | 0 | DIGP1 low priority packet transfer |
| 0 | 0 | 1 | 0 | 1 | DIGP1 high priority packet transfer |
| 0 | 0 | 1 | 1 | 0 | DIGP1 cache |
| 0 | 0 | 1 | 1 | 1 | DIPG1 DEA |
| 0 | 1 | 0 | 0 | 0 | DIGP2 low priority packet transfer |
| 0 | 1 | 0 | 0 | 1 | DIGP2 high priority packet transfer |
| 0 | 1 | 0 | 1 | 0 | DIGP2 cache |
| 0 | 1 | 0 | 1 | 1 | DIPG2 DEA |
| 0 | 1 | 1 | 0 | 0 | DIGP3 low priority packet transfer |
| 0 | 1 | 1 | 0 | 1 | DIGP3 high priority packet transfer |
| 0 | 1 | 1 | 1 | 0 | DIGP3 cache |
| 0 | 1 | 1 | 1 | 1 | DIPG3 DEA |
| 1 | 0 | 0 | 0 | 0 | MP low priority packet transfer |
| 1 | 0 | 0 | 0 | 1 | MP high priority packet transfer |
| 1 | 0 | 0 | 1 | 0 | MP urgent packet transfer interrupts enabled |
| 1 | 0 | 0 | 1 | 1 | MP urgent packet transfer interrupts disabled |
| 1 | 0 | 1 | 0 | 0 | Reserved |
| 1 | 0 | 1 | 0 | 1 | Reserved |
| 1 | 0 | 1 | 1 | 0 | MP instruction cache interrupts enabled |
| 1 | 0 | 1 | 1 | 1 | MP instruction cache interrupts disabled |
| 1 | 1 | 0 | 0 | 0 | MP DEA interrupts enabled |
| 1 | 1 | 0 | 0 | 1 | MP DEA interrupts disabled |
| 1 | 1 | 0 | 1 | 0 | MP data cache interrupts enabled |
| 1 | 1 | 0 | 1 | 1 | MP data cache interrupts disabled |
| 1 | 1 | 1 | 0 | 0 | Frame memory 0 |
| 1 | 1 | 1 | 0 | 1 | Frame memory 1 |
| 1 | 1 | 1 | 1 | 0 | Refresh |
| 1 | 1 | 1 | 1 | 1 | Reserved |

Transfer/output enable $\overline{TR}$. This output from transfer controller 80 enables DRAM output drivers and VRAM shift register transfer cycles.

User-timing selection $\overline{UTIME}$. This input causes transfer controller to modify the timings of $\overline{RAS}$ and $\overline{CAS}[7:0]$ so that the user may produce their own memory timings. This input also used at reset to determine the endian mode in which multiprocessor integrated circuit 100 will operate.

Write enable $\overline{WE}$. This is normally an output which indicates to memory that a write or write transfer cycle is occurring. In the internal memory test mode this is an input driven by an external device to write to internal memory.

Each external memory cycle generated by multiprocessor integrated circuit 100 is a least 5 machine states in duration except for page-mode cycles. A machine state is one clock period long and begins on the falling edge of CLKOUT. Each memory cycle has two-parts; the address subcycle, and the data subcycle. Page mode cycles are an extension of this form wherein an access has one address subcycle and multiple data subcycles.

The address subcycle begins with the first machine state of the external memory cycle and is at least four machine states long. The address and status code for the access are output at this time. This portion of the cycle is also called the row address time because the row address for DRAMs and VRAMs is latched at this time.

The address bus A[31:0] outputs a 32 bit address that points to the beginning byte of the 64 bit word currently being accessed. The access may be anywhere from 1 to 8 bytes depending on the starting byte and the amount of data to be transferred. This address is used to decode multiprocessor integrated circuit 100 external memory space. The external decode logic then sends a number of signals back to multiprocessor integrated circuit 100 to indicate the type via address shift selection AS[2:0], the speed via column timing selection CT[1:0], the page size via page size selection PS[2:0], and the data bus width via bus size selection BS[1:0] of the device or devices being accessed. This information is used to determine the length of the address subcycle as well as the length, addressing, and number of the data subcycles. The address and status may be latched with $\overline{RL}$ or $\overline{RAS}$.

The address subcycle will be automatically extended by an integral number of machine states beyond four machine states as required by the type of access being performed. It may also be extended by the insertion of wait states. This subcycle is at least one machine state long and immediately follows the address subcycle. The column address for DRAMs and VRAMs is output at this time and data is transferred between multiprocessor integrated circuit 100 and external memory. This portion of the memory cycle is often called the column address time.

The data bus D[63:0] transfers the data between multiprocessor integrated circuit 100 and external memory. Data is either driven out for a write cycle or latched in for a read cycle. The position of valid data on the bus is determined by the endian mode of multiprocessor integrated circuit 100, the amount of data being transferred, and the width of the memory.

The column address output during this time is a shifted version of the 32 bit byte address. The alignment of addresses on the address bus A[31:0] bus is determined by the address shift selection AS[2:0] value input to multiprocessor integrated circuit 100 during the address subcycle.

The length of the data subcycle is normally 1, 2, or 3 machine states as determined by the column timing selection CT[1:0] input to multiprocessor integrated circuit 100 during the address subcycle. Devices requiring longer access times may insert wait states in either the address or the data subcycle.

Whenever the current memory access is the same direction and is within the same memory page as the previous access based on the page size selection PS[2:0] inputs at row time, transfer controller 80 will use page-mode cycles. Page-mode cycles consist of one address subcycle followed by multiple data subcycles. Data need not be contiguous, only within the same memory page.

During both the address and data subcycles, multiprocessor integrated circuit 100 outputs status codes on the STATUS[4:0] pins. These status codes provide information about the external cycle being performed. During row time of the address subcycle, the STATUS[4:0] pins output a code as shown in Table 7 to indicate the type of cycle being performed. The row time status code may be latched by the $\overline{RL}$ or $\overline{RAS}$ signal and used by external logic to perform memory-bank decoding or enable special hardware features. During column time of the data subcycle the information on the STATUS[4:0] pins changes to provide detail about the cycle and its requesting processor. These activity codes are shown in Table 8. These codes provide no information as to the type of cycle itself and are thus intended to be used mainly to facilitate system debug.

In order for transfer controller 80 to properly communicate with external memory, it must know what type of memory it is accessing. This is accomplished by identifying the memory type at row time using multiprocessor integrated circuit 100 address shift selection AS[2:0], bus size selection BS[1:0], column time selection CT[1:0], and page size selection PS[2:0] inputs. Multiprocessor integrated circuit 100 outputs the external memory address and row-time status code and then samples these inputs to determine the memory type. This gives external logic time to decode the address and drive the memory identification signals to their proper levels. The selected memory type remains in effect until the next address subcycle.

Since multiprocessor integrated circuit 100 supports DRAM as well as SRAM, it must provide multiplexed row and column addresses on its address bus. Multiprocessor integrated circuit 100 always outputs the full 32 bit byte address at row time. At column time, it must shift the address on its bus to align column addresses to the row addresses already latched by the DRAMs. In order to properly align the column addresses, multiprocessor integrated circuit 100 must know the array size of the DRAM it is accessing since the array size determines the number of row/column address bits of the device. This is done selection is made using the address shift selection AS[2:0] inputs. External logic decodes the address output by multiprocessor integrated circuit 100 at row time and supplies a 3 bit shift code on the address shift selection AS[2:0] inputs. Transfer controller 80 samples and latches this value, and uses it to determine if the address should be multiplexed as required for dynamic memories, or remain unmultiplexed for use with static memories and peripherals.

Tables 4a and 4b show how the sampled address shift selection AS[2:0] value affects the address output at column time. If the value is "000", an unshifted 32 bit address is output for each subsequent "column" access. If the value is non-zero, then subsequent column addresses will be shifted as Tables 4a and 4b show. Shift values range from 8 to 14 bits, meaning that dynamic memories with 8 to 14 address pins, corresponding to 64K by N to 256M by N array sizes, are supported. Note that address bus A[2:0] always output byte address bits 0 to 2 regardless of the shift amount. This is done to support dynamic bus sizing.

For example, assume 1M by 4 DRAMs are connected to the data bus in a 64 bit wide configuration. The memories require 10 bits each of row and column address. An address shift selection AS[2:0] of the address bits of multiprocessor integrated circuit 100 represent the byte address and can be ignored since the memory bank is 64 bits wide and the individual bytes are controlled by the $\overline{CAS}$[7:0] strobes. This means that the memories need 20 contiguous address bits starting with bit A[3]. Looking at Tables 4a and 4b shows that an address shift selection AS[1:0] value of "011" provides 10 bits of multiplexed address. Since the starting address bit A[3] corresponds to address pin A[13] at column time, the DRAMs address pins are connected to the ten multiprocessor integrated circuit 100 address pins starting with A[13].

Since transfer controller 80 performs page-mode cycles whenever possible, it needs to know when it crosses a page or row boundary for the memory it is currently accessing so that it can perform a row access on the new page. The page size for the current access is indicated by the 3 bit value placed by external logic on the page size selection PS[2:0] pins. Transfer controller 80 samples these pins at row time and uses them to determine which changing address bits indicate a page change. The sampled value is retained by transfer controller 80 until the next row access. The page size indicated on page size selection PS[2:0] does not necessarily correspond to the shift amount indicated on address shift selection AS[2:0] since multiple banks may be interleaved.

Figure 9:
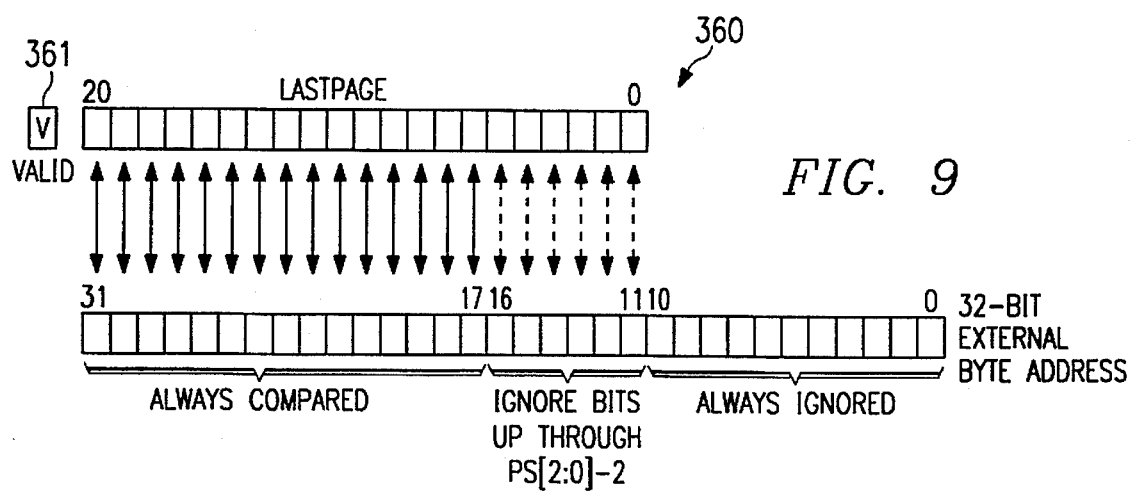
FIG. 9 illustrates the use of a LASTPAGE register.

Whenever an external memory access occurs, transfer controller 80 records the 21 most significant bits of the address in an internal LASTPAGE register 360. The address of each subsequent column access is then compared to this value. This is diagrammed in FIG. 9. The value that was input on page size selection PS[2:0] is used to selectively ignore the 6 least significant bits of LASTPAGE register 360 during the comparison. The LASTPAGE register bits below the bit number equal to the value of page size selection PS[2:0]-1 are ignored in the comparison. The 15 most significant bits are always compared and the 11 least significant bits of the next address are always ignored. If no match is found between the enabled bits of LASTPAGE register 360 and the next memory address, then the page has changed and the next memory access will begin with a row address cycle. If page size selection PS[2:0]="000" then page mode is disabled and any subsequent cycles will begin with another row access.

For example, assume the memory being accessed consists of 16 1M by 4 DRAMs connected as a 64 bit data bus with no interleaving with other banks. Each memory device has a row size of $2^{10}$ bits. Since any location within a single row may be accessed during a page mode cycle of the DRAM, the page size for this configuration would be: $2^{10}$ locations/page×8 bytes/location=8K bytes/page. As Table 9 shows, this corresponds to a page size selection PS[2:0] value of "011". When transfer controller 80 samples page size selection PS[2:0]="011" at row time, it will check only bits 31–13 of subsequent accesses to determine if a page boundary has been crossed. Notice that this corresponds to the DRAMs' row address bits and bank decode bits for this particular configuration. The compared address bits and page sizes for the eight possible page size selection PS[2:0] values are shown in Table 9.

TABLE 9

| PS[2:0] | | | Page size | Bits compared |
|---|---|---|---|---|
| 0 | 0 | 0 | no page mode | 31–0 |
| 0 | 0 | 1 | 2K | 31–11 |
| 0 | 1 | 0 | 4K | 31–12 |
| 0 | 1 | 1 | 8K | 31–13 |

TABLE 9-continued

| PS[2:0] | | | Page size | Bits compared |
|---|---|---|---|---|
| 1 | 0 | 0 | 16K | 31–14 |
| 1 | 0 | 1 | 32K | 31–15 |
| 1 | 1 | 0 | 64K | 31–16 |
| 1 | 1 | 1 | 128K | 31–17 |

The LASTPAGE register 360 has an associated valid bit 361. This valid bit 361 indicates whether the data stored in LASTPAGE register 360 is treated as valid or invalid. The LASTPAGE register 360 is treated as invalid after reset, host accesses, faults, and retries, or after a change in direction of the access, i.e. read versus write. This forces a row access to always occur before subsequent accesses. In addition, LASTPAGE register 360 is considered invalid both before and after refresh cycles, frame controller 90 requested cycles, and packet transfer generated serial register transfer cycles so that these always occur as single non-page-mode cycles. In the special case of peripheral device packet transfers, the transfers will always begin with a row access to ensure that the peripheral device transfer status code is output. The data in LASTPAGE register 360 will be considered invalid at the completion of the transfer so that a new status code may be output. During the transfer, however, LASTPAGE register 360 will behave normally to allow the peripheral device transfer to use page-mode cycles wherever possible.

The bus size selection BS[1:0] pins are sampled at row time to determine the bus size for the current access. Transfer controller 80 supports bus sizes of 8, 16, 32, or 64 bits as shown in Table 5. Setting the bus size determines the maximum number of bytes that transfer controller 80 can transfer during each column access. If the number of bytes requested exceeds the bus size, transfer controller 80 will automatically perform multiple accesses to complete the transfer. The selected bus size also determines which portion of the data bus will be used for the transfer. For 64 bit memory, the entire bus is available for transfers. For 32 bit memory, data bus D[63:32] pins are used in big endian mode and data bus D[31:0] pins are used in little endian mode. For 16 bit buses use data bus D[63:48] pins and data bus D[15:0] pins and 8 bit buses use data bus D[63:56] pins and data bus D[7:0] pins for big and little endian, respectively. No matter what bus size is used, transfer controller 80 always aligns data to the proper portion of the bus and activates the appropriate CAS strobes to ensure that only valid bytes are transferred.

Transfer controller 80 supports four basic sets of memory timings. These allow the choice of having one, two or three clock cycles per column access, without having to use wait states. Although all the types are DRAM-like in nature, each is suited to a particular type of DRAM or SRAM. The timing used is determined by the column timing selection CT[1:0] inputs as shown in Table 6. External decode logic drives these pins to the appropriate levels after decoding the address to determine the type of memory currently being accessed. A non-pipelined one cycle/column timing is designed to be used with devices that have very fast access times. A pipelined one cycle/column timing is similar to one cycle/column timing except that the access is pipelined. An address is output in one cycle and the data corresponding to that address is accessed during the following cycle. This timing is for use with DRAMs/VRAMs that support pipelined page mode cycles but could also be used with synchronous SRAM devices. A non-pipelined two cycles/column timing cycles provide two clock cycles of column access time for SRAMs and fast DRAM devices. They also add one cycle to the row address time. A non-pipelined three cycles/column cycle is for use with DRAM and other slower devices. In addition to providing three clock cycles of column access time, it adds two clock cycles to the row access time. The selected column timing remains in effect for the entire page, that is until the next row access occurs. It is the responsibility of the external device to supply the proper column timing selection CT[1:0] based upon the generated address.

During block write and load color register cycles, the bus size selection BS[1:0] pins are used for a different purpose. Since block writes are only supported for 64 bit buses, the bus size information is not needed. Instead, bus size selection BS[1:0] are used to indicate the type of block write that the addressed memory supports. The values for BS[1:0] during these cycles is shown in Table 23. Block write is discussed in detail below.

In the contemplated embodiment illustrated in FIG. 8, multiprocessor integrated circuit 100 external memory cycles are generated by external memory interface 302 of transfer controller 80. External memory interface 302 contains a complex state machine which generates a sequence of states to control the transition of the memory interface signals. The states generated and their sequence vary based on the type of cycle being performed, the column timing of the memory being accessed, the next access to be performed, and internal or external events such as faults, etc. Though the contemplated embodiment includes a state machine, those skilled in the art would realize that these functions may be preformed by a microcontroller having a fixed program in read only memory or by a programmable microprocessor.

Figure 10:
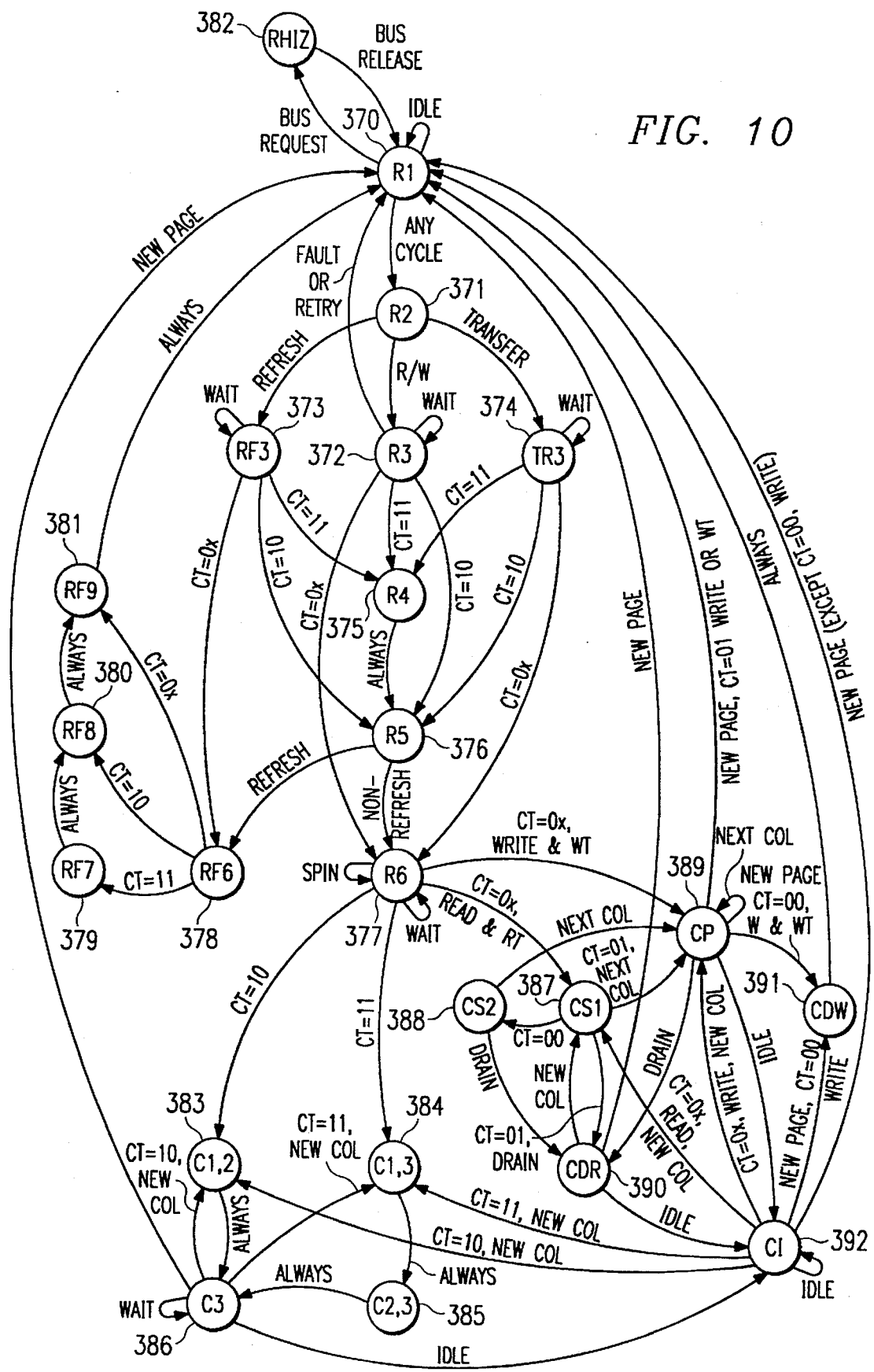
FIG. 10 illustrates a state diagram of the external memory sequencer and method of operation.

FIG. 10 shows the complete state diagram defining a method embodiment for external memory interface 302. Although a large number states and state transitions exist, their sequence is basically dependent on the column timing selected for the memory access being performed. Additionally the states can be broken into two groups, row time states and column time states.

The row time states make up the address sub-cycle or "row time" of each memory access. External memory interface 302 enters these states whenever a new page access begins. It is during these states that the type of memory being addressed is determined. A minimum of 4 row states will occur for every row access. They are defined as follows.

The beginning state for all memory accesses is r1 state 370. During the r1 state 370 transfer controller 80 outputs row address A[31:0] and cycle type STATUS[4:0] and drives all control signals to their inactive state.

The next state, which is common to all memory accesses, is r2 state 371. During state 371 transfer controller 80 asserts RL high and drives DDIN according to the data transfer direction. During the r2 state 371 transfer controller 80 samples address shift selection AS[2:0], bus size selection BS[1:0], column timing selection CT[1:0], page size selection PS[2:0], and UTIME inputs.

External memory interface 302 enters the r3 state 372 for reads and writes including block write and load color register. During the r3 state 373 transfer controller 80 drives DBEN, DSF1, DSF2, TRG, and WE to their active row time levels and samples FAULT, READY, and RETRY inputs.

External memory interface 302 enters the rf3 state 373 for refreshes only. During state 373 transfer controller 80 activates all CAS[7:0] strobes and samples FAULT, READY, and RETRY inputs.

External memory interface 302 enters the tr3 state 374 for shift register transfer cycles only. The tr3 state 374 is identical externally to the r3 state 372.

External memory interface 302 enters the r4 state 375 only during 3 cycle/column accesses when column timing selection CT[1:0]="11". No signal transitions occur. Transfer controller 80 samples the $\overline{\text{RETRY}}$ input.

The r5 state 376 is common to 2 and 3 cycle/column accesses when column timing selection CT[1]="1". During the r5 state 376 transfer controller 80 drives the $\overline{\text{RAS}}$ output low and samples the $\overline{\text{RETRY}}$ input.

External memory interface 302 enters the r6 state 377 for all accesses except refresh. During the r6 state 377 transfer controller 80 drives $\overline{\text{RAS}}$ low if not already low and drives $\overline{\text{DBEN}}$, DSF1, DSF2, $\overline{\text{TRG}}$, and $\overline{\text{WE}}$ to their appropriate column time levels. Transfer controller 80 also samples the READY and $\overline{\text{RETRY}}$ inputs. State 377 can be repeated multiple times.

External memory interface 302 enters the rf6 state 378 for refresh cycles only. During the rf6 state 378 transfer controller 80 drives $\overline{\text{RAS}}$ output low and samples $\overline{\text{RETRY}}$ input.

The rf7 state 379 is common to 2 and 3 cycle/column refreshes when column timing selection CT[1]="1". During the rf7 state 379 transfer controller 80 outputs the processor activity code on STATUS[4:0] and samples $\overline{\text{RETRY}}$ input.

External memory interface 302 enters the rf8 state 380 only for 3 cycle/column refreshes when column timing selection CT[1:0]="11". No signal transitions occur. Transfer controller 80 samples the $\overline{\text{RETRY}}$ input.

The rf9 state 381 is the final state for all refreshes. During the rf9 state 381 transfer controller 80 outputs the processor activity code on STATUS[4:0] and samples the $\overline{\text{RETRY}}$ input.

The rhiz state 382 is a high impedance state. External memory interface 302 enters state 382 during external bus host requests. External memory interface 302 repeats state 382 until return of image system bus via bus release.

The column time states comprise the data sub-cycle or "column time" of each memory access. All data transfers occur during these states. External memory interface 302 enters two basic sequences of column states: those for 1 cycle/column accesses pipelined and non-pipelined; and those for 2 and 3 cycle/column accesses. During page-mode operation, multiple column accesses may occur so external memory interface 302 may repeat these state sequences many times during the course of a single page-mode access.

The c1,2 state 383 is the first column state for 2 cycle/column accesses when column timing selection CT[1:0]= "10". During the c1,2 state 383 transfer controller 80 outputs the column address on address bus A[31:0] and the processor activity code on STATUS[4:0]. Transfer controller 80 drives data the data outputs if this is a write cycle and asserts appropriate $\overline{\text{CAS}}$[7:0] strobes.

The c1,3 state 384 is the first column state for 3 cycle/column accesses when column timing selection CT[1:0]= "11". During the c1,3 state 384 transfer controller 80 outputs the column address on address bus A[31:0] and the processor activity code on STATUS[4:0] and drives the data outputs if this is a write cycle.

The c2,3 state 385 is the second column state for 3 cycle/column accesses when column timing selection CT[1:0]="11". During the c2,3 state 385 transfer controller 80 asserts appropriate $\overline{\text{CAS}}$[7:0] strobes.

The c3 state 386 is the final column state for 2 and 3 cycle/column accesses when column timing selection CT[1] ="1". During the c3 state 386 transfer controller 80 samples the READY input and latches input data if the current cycle is a read cycle.

The cs1 state 387 is the starting column state for 1 cycle/column reads when column timing selection CT[1]= "0". During the cs1 state 387 transfer controller 80 outputs the column address on address bus A[31:0], the processor activity code on STATUS[4:0]and asserts all $\overline{\text{CAS}}$[7:0] strobes. Transfer processor 80 does not latch input data.

The cs2 state 388 is the second starting column state. External memory interface 302 always inserts cs2 state 388 following cs1 state 387 for pipelined 1 cycle/column reads only when column timing selection CT[1:0]="00". During the cs2 state 388 transfer controller 80 outputs column address and processor activity code of the next column access. Transfer controller 80 does not latch input data during state 388.

The cp state 389 is the principle column state for all 1 cycle/column accesses when column timing selection CT[1] ="0". External memory interface 302 repeats state 389 for each page-mode column access after completion of required starting states. During the cp state 389 transfer controller 80 outputs the column address on address bus A[31:0] and the processor activity code on STATUS[4:0] and asserts appropriate $\overline{\text{CAS}}$[7:0] strobes. Transfer controller 80 also drives out for writes or latches in for reads of valid data.

The cdr state 390 is the read drain state for 1 cycle/column accesses when column timing selection CT[1]="0". External memory interface 302 has cdr state 390 after final cp state 389 or cs1 state 387 if no other column accesses are pending because of a page change or pipeline bubble or because the interface has become idle. During the cdr state 390 transfer controller 80 does not assert $\overline{\text{CAS}}$[7:0] strobes but latches input data addressed by preceding cp state 389 or cs1 state 387.

External memory interface 302 enters the cdw state 391 for pipelined 1 cycle/column write drain cycles when column timing selection CT[1:0]="00". External memory interface 302 enters the cdw state 391 just before return to the r1 state 370 at start of a new page. During the cdw state 391 transfer controller 80 asserts all $\overline{\text{CAS}}$[7:0] strobes to update pipelined memory array with the last data written.

The ci state 392 is an idle column state. External memory interface 302 enters ci state 392 when no more column accesses are pending after any required drain states. This could be due to pipeline bubbles or because no more cycles are being requested but the interface remains in page mode because no page change has occurred.

The state transition indicators illustrated in FIG. 10 determine what condition or event cause the transition to another state. In some cases, multiple conditions must be met in order for transitions to certain states to occur. A list of these state transition conditions and events follows:

CT="XX"—A state change occurs for the indicated column timing selection CT[1:0] value as latched during the r3 state 372;

r, read—A read cycle occurs;

w, write—A write cycle occurs;

rt—A read transfer cycle occurs;

wt—A write transfer cycle occurs;

fault—The $\overline{\text{FAULT}}$ input sampled low during the r3 state 372 indicates a memory access fault;

retry—The $\overline{\text{RETRY}}$ input sampled low during the r3 state 372 requests a row-time retry;

wait—The READY input sampled low during the r3 state 372, r6 state 377, or c3 state 386 request repeat of the current state;

spin—This is an internally generated request to add an additional r6 state 377 to allow the transfer controller 80 pipeline to load. External memory interface 302 enters state 377 once during each 2 cycle/column writes, twice during each 1 cycle/column write, and once during 1 cycle/column accesses when the bus size has changed from the previous page access;

new col—The current memory cycle is a next column access of the same memory page;

drain—The current memory cycle is a 1 cycle/column read cycles. No column access is pending following the current read state;

idle—No column access is pending after current state. All drain states have been completed; and new page—The next memory access requires a page change and a new row access.

Transfer controller 80 contains pipelines in both internal memory interface 301 and external memory interface 302. These pipelines can queue up the memory accesses required by transfer controller 80, when the current access has not yet completed. For example, if a packet request is transferring data from on-chip to off-chip memory, the destination may require 2 cycles per access. Since data may be extracted from packet transfer FIFO buffer 311 at one cycle per access assuming the required data is in packet transfer FIFO buffer 311, another destination cycle may be placed in the pipeline before the first cycle is completed.

These pipelines are normally completely transparent to the user. Its effect on operation can only be seen when pipeline is "drained". In order for a cycle to be loaded into the external memory pipeline of external memory interface 302, it must be located within the same memory page as any other cycles already contained by the pipeline. Once a cycle has been placed in the pipeline it can not be removed; the cycle must occur. Thus when an access to a new memory page is requested, the cycles in the pipeline must first be completed. If transfer controller 80 is performing a packet transfer to external memory and frame controller 90 issues a memory request, any column cycles currently in the pipeline must be completed before frame controller 90 requested cycle can occur even though the frame controller cycle has higher priority. Pipeline draining can also occur: prior to cache and external memory accesses, host accesses, and urgent refreshes; during packet transfer suspension; and after "column time" retries. Pipeline draining is given highest priority when an urgent request is pending.

During external memory accesses, there may be cycles of inactivity during which no active column access occurs. These periods are a result of "bubbles" within transfer controller 80's internal pipeline. Bubbles occur when transfer controller 80 has no operation to perform during the cycle. This can occur: as a result of crossbar contention; because transfer controller 80 does not have enough data to perform the next access for write cycles; because packet transfer FIFO buffer 311 is full and no more data can be loaded read cycles; or simply because there is no activity requested. If none of these conditions occurs, no bubbles will occur.

An example of a bubble is when transfer controller 80 is servicing a packet transfer with an internal source and external destination. If the packet transfer is set up such that transfer controller 80 can only access source data 1 byte at a time and can write destination data 8 bytes at a time, then transfer controller 80 will only be able to perform 1 destination access every 8 internal cycles. This would result in transfer controller 80 inserting bubbles into the external memory destination cycles while it waits to have enough data 8 bytes to perform the next column access. The number of bubble cycles inserted depends on the timing of the external memory cycles.

In order to support a wide range of memory types and organizations, and peripherals, multiprocessor integrated circuit 100 provides a variety of methods for extending, retrying, and terminating external memory cycles. Each of these is described in more detail in the following sections.

Once transfer controller 80 has completed all the column accesses pending in its pipeline, it is ready to terminate the 5 memory access. Termination will not occur, however, until a new row access is required. The external memory signals will remain active in the ci state 392 until the next memory access. This allows DRAM devices to remain in a page-mode state. If the next address falls within the same memory page as the previous memory access and is the same direction then no row access cycle is needed. If the next memory access requires a row access, then the current page-mode access will terminate and the new row access begin. Even if there is little other external bus activity, most memory cycles will be terminated soon after completion of their last column access by the occurrence of trickle refresh cycles which require a new row access to occur.

Multiprocessor integrated circuit 100 supports the insertion of wait states to extend memory cycle times. This is done through the use of the READY input. The READY input is sampled at appropriate times on the falling edge of CLKOUT. If READY is sampled high, the cycle continues in the normal fashion. If READY is sampled low, the current machine state is repeated and READY is sampled again on the next CLKOUT falling edge. The memory cycle will continue to stall on, that is repeat, the current state until transfer controller 80 samples READY high.

Transfer controller 80 has no time-out or abort mechanism with which to terminate a memory access that is being held up by a large number of wait states. Memory accesses that cannot be completed in a reasonable time should be faulted or retried to prevent locking out high priority external memory accesses that may be waiting to be serviced.

Wait states may be added during row time for any type of memory cycle. Wait states may also be inserted at column time for both two and three cycle per column accesses. Wait states may be inserted at two locations during row time, before and after the fall of RAS. Transfer controller 80 first samples he READY signal at the start of the r3 state 372, or the rf3 state 373 or the tr3 state 374. This allows time to decode the row address and/or cycle type and determine if the addressed device needs additional access time prior to the fall of $\overline{RAS}$. The r3 state 372 will be repeated until transfer controller 80 samples READY high. Although the r3 state 372 is repeated when READY is sampled low, the $\overline{FAULT}$ and $\overline{RETRY}$ inputs are not resampled. An access must be faulted or retried during the first r3 state 372 cycle before any wait states have been inserted. The READY input is again sampled during the r6 state 377. This occurs after the fall of $\overline{RAS}$ allowing the creation of addition $\overline{RAS}$ access time for devices which may need it. If READY is sampled low, the r6 state 377 will be repeated until READY is again sampled high.

Transfer controller 80 automatically inserts additional r6 states 377 during 2 and 3 cycle/column writes and 1 cycle/column accesses which change the bus size. Transfer controller 80 samples the READY in the normal manner during each of these r6 states 377. Thus any extra r6 states 377 resulting from READY being sampled low will be in addition to those already inserted by transfer controller 80.

Column time wait states are not supported for single cycle per column accesses so READY is not sampled beyond the r6 state 377 for these cycles. For 2 and 3 cycle per column accesses, transfer controller 80 samples the READY pin during the c3 state 386. This occurs after the column address and fall of $\overline{CAS}$ and thus allows for extended CAS access time for devices which require it. If READY is sampled high, the c3 state 386 completes the column access. Otherwise the c3 state 386 is repeated and transfer controller 80 samples READY on each subsequent CLKOUT falling edge until it is sampled high.

Multiprocessor integrated circuit 100 supports two types of retry mechanisms; "row time" retries and "column time" retries. The type of retry that occurs depends on what point in the memory access that the $\overline{\text{RETRY}}$ input of multiprocessor integrated circuit 100 is driven active low.

Row time retry provides a method by which external logic may inform multiprocessor integrated circuit 100 that the current access may not be completed and needs to be retried. Row time retries are generated by driving the $\overline{\text{RETRY}}$ input low when first sampled at the beginning of the r3 state 372. If $\overline{\text{RETRY}}$ is sampled low, transfer controller 80 will terminate the current access at the end of the r3 state 372. The retried access will then restart immediately with a new r1 state 370 unless a higher priority request is pending. In this case, the retried cycle won't be restarted until after the higher priority request has been serviced.

If a row time retry occurs during a packet transfer cycle and a packet transfer request of equal or higher priority is pending then the packet transfer in which the retry occurred will be suspended assuming that the interval defined by PTMIN has expired. Transfer controller 80 will not retry this suspended packet transfer until the packet transfer is resumed when it again reaches its turn in the priority/round robin chain.

Column time retries are not really retries in the traditional sense at all. Instead, they can be thought of as "row access requests". If a column retry occurs, transfer controller 80 completes all column accesses pending in its pipeline and then begins the next access with a row access. Thus a number of column accesses may occur after the retry has been requested. These column access will not be repeated after the row access is restarted. Column time retries occur any time that the $\overline{\text{RETRY}}$ input is sampled low after the r3 state 372. Transfer controller 80 samples $\overline{\text{RETRY}}$ at the end of each state following r3 state 372 on each CLKOUT falling edge and must be at a valid high or low level during each sample period. If transfer controller 80 samples $\overline{\text{RETRY}}$ low then the current page-mode will terminate as soon as all column accesses currently in transfer controller 80 pipeline have completed. Once the retry has been requested, the value input on the $\overline{\text{RETRY}}$ input has no further effect. However, transfer controller will continue to sample $\overline{\text{RETRY}}$ during each of the remaining column accesses and thus $\overline{\text{RETRY}}$ must be maintained at a valid high or low level during each sample period. Normal operation would be for the system to drive $\overline{\text{RETRY}}$ low and maintain it at the low level until the end of the current row access.

Because of the method in which external memory interface 302 pipeline is loaded, asserting $\overline{\text{RETRY}}$ in r4 state 375 or r5 state 376 during read cycles has no effect. The $\overline{\text{RETRY}}$ input is still sampled and must be at a valid high or low level. For this reason, if a column-time retry is desired then $\overline{\text{RETRY}}$ should be asserted low until the end of the row access. Frame controller 90 VRAM access cycles and refresh cycles are not affected by column time retries because, by nature, a new row access will always follow their single column access.

If a system is unable to complete a memory access because of a system error, it may inform multiprocessor integrated circuit 100 by faulting the memory cycle. This allows the master processor 60 to correct the error before the memory access is retried. Memory faults can only be generated at row time and are initiated by driving the $\overline{\text{FAULT}}$ input low at the start of the r3 state 372. Transfer controller 80 does not sample $\overline{\text{FAULT}}$ during any other part of the memory cycle. The faulting mechanism varies somewhat depending on the type of access that caused the fault. This is described in further detail below. The memory faults for the different types of cycle requests are supported as follows:

Frame controller 90 cycles—Faulting is not supported during frame controller 90 cycles and the $\overline{\text{FAULT}}$ pin is ignored;

Refresh cycles—Faulting is not supported during refresh cycles and the $\overline{\text{FAULT}}$ pin is ignored;

Digital image/graphics processor cache and direct memory access requests—Faulting is supported during these cycles. The requesting processor will not see its request completed until the fault is cleared. Requests from other digital image/graphics processors 71, 72, 73 and 74 will continue to be serviced;

Master processor instruction or data cache requests—Faulting supported is supported during these cycles. The faulted cache request is immediately canceled and master processor 60 interrupted. The other cache may still have its pending request serviced;

Master processor 60 direct memory access requests—Faulting is supported during these cycles. The direct external access request is immediately canceled and master processor 60 is interrupted; and Packet transfers—Faulting is supported during packet transfers. The packet transfer is suspended and its state is saved to the parameter memory of the requesting processor. Packet transfer requests from other processors may still be serviced. The internal packet transfer state of transfer controller 80 is included in the saved parameters. If the packet transfer was from external-to-external memory, the state of the external-to-external transfer buffer is also saved. The buffer itself is not modified. The packet transfer status bits in the saved packet transfer options field will be set to show whether the fault occurred on the source or destination transfer.

Once the parameters have been saved, transfer controller 80 sets the appropriate bit in the FLTSTS register of master processor 60 indicating the processor whose packet transfer was faulted. The encoding of the FLTSTS register is shown below in Table 13. Setting the processor bit in the FLTSTS register also generates a packet transfer fault interrupt to master processor 60. Master processor 60 can read the FLTSTS register to find out which processor requested the faulted packet transfer. Once the processor is identified, master processor 60 can examine the suspended packet transfer parameters to determine the memory access that caused the fault.

A digital image/graphics processor 71, 72, 73 or 74 will not know that a fault occurred during its packet transfer. It will only know that its packet transfer has not yet completed. It is the responsibility of master processor 60 to correct the fault or to ask the requesting digital image/graphics processor 71, 72, 73 or 74 to cancel its packet transfer request.

If master processor 60 is able to correct the fault, it can clear the bit in the FLTSTS register and the packet transfer request will be automatically re-submitted. Once the faulted packet transfer receives its turn in the round robin priority scheme, its internal state will be restored from the saved parameters in the parameter memory and transfer controller 80 will continue the packet transfer at the faulted access.

If a fault occurs during a digital image/graphics processor requested cache service or direct external access request, the address at which the fault occurred is saved in the cache fault address location of the parameter memory of the requesting processor. The appropriate bit in the FLTSTS register of master processor 60 is set causing an interrupt to be sent to master processor 60. Master processor 60 can then examine the parameter memory to determine the faulted address. If master processor 60 can correct the fault, it can then clear the bit in the FLTSTS register and the request will be rescheduled. If the fault can not be corrected and master processor 60 needs the requesting digital image/graphics processor to abort the cache-miss or direct external access request, it should send the digital image/graphics processor a reset request. This will cause the task to be aborted.

A digital image/graphics processor 71, 72, 73 or 74 will not know that a fault occurred during a cache or direct external access request. It will only know that its request has not yet been completed. It is the responsibility of master processor 60 to correct the fault or to reset the requesting digital image/graphics processor.

If an master processor 60 requested cache fill or direct external access cycle faults, then the request is immediately canceled and master processor 60 is sent a memory fault interrupt. This memory fault interrupt indicates whether the fault was a data cache fault or an instruction cache fault. If a data cache fault occurred, the address is saved and the data is saved.

Certain accesses to on-chip addresses can cause faults independent of the $\overline{FAULT}$ input. These occur when an illegal on-chip access is attempted. The normal fault mechanism for the cycle being attempted applies. The on-chip faults are:

A digital image/graphics processor packet transfer to/from any address under Hex "02000000", which is not a data memory or a digital image/graphics processor parameter memory;

A digital image/graphics processor cache service or master processor 60 cache service or direct external access to/from any address under Hex "02000000", which is not a data memory or a digital image/graphics processor parameter memory; and A master processor 60 packet transfer to/from any address under Hex "02000000", which is not a data memory or a digital image/graphics processor parameter memory.

The $\overline{UTIME}$ input is provided to assist users needing to generate memory timings that are different from those provided by multiprocessor integrated circuit 100. If $\overline{UTIME}$ is sampled low at row time then the timings of the $\overline{RAS}$ and $\overline{CAS}[7:0]$ outputs are modified for the rest of the current page. The $\overline{RAS}$ signal is modified to indicate when column accesses are begun. User-timed $\overline{CAS}$ signals can thus be triggered by $\overline{RAS}$ falling. $\overline{RAS}$ will only be asserted active low for only machine state when an actual column access is begun so any bubbles in transfer controller 80 pipeline may be comprehended. The column address strobes $\overline{CAS}[7:0]$ are output at the same time as the column address. This allows them to be used to indicate which bytes are being accessed, making external $\overline{CAS}$ generation easier. Since the timing of $\overline{RAS}$ is modified, external logic must generate its own $\overline{RAS}$ timings if required. The externally generated $\overline{RAS}$ may be triggered by the falling edge of $\overline{RL}$. Note that the status code output at the beginning of the cycle provides all the information necessary to generate the memory timings for $\overline{TRG}$, $\overline{WE}$, etc. for the current cycle. The timing of these outputs is not modified during user timed accesses.

Internal memory interface 301 of transfer controller 80 provides access to on-chip memory via crossbar 50. A 64 bit internal data bus can transfer 0–8 bytes per cycle. External memory interface 302 provides access to all off-chip memory and peripherals. External memory interface 302 generates the cycles and control signals necessary to interface to a variety of memory and peripheral device types. The 64 bit external data bus can transfer 0–8 bytes per cycle and provide dynamic bus size support for devices connected to image system bus having data widths of 8, 16, 32, and 64 bits.

External memory interface 302 includes a simple handshake mechanism that allows transfer controller 80 to share the bus with an external device. The handshake mechanism makes use of four synchronous signals: host request input $\overline{HREQ}$; host acknowledge output $\overline{HACK}$; and internal request outputs REQ[1:0].

The host request input $\overline{HREQ}$ signals multiprocessor integrated circuit 100 when an external device desires control of image system bus. An external device drives the host request input $\overline{HREQ}$ low when it wishes to take bus ownership. This is the highest priority request that transfer controller 80 can receive and transfer controller 80 will cease driving the bus at the earliest possible moment. Transfer controller 80 bus ownership will terminate when the current operation has ceased and transfer controller 80 pipeline has emptied. The external device should continue to drive $\overline{HREQ}$ active low for as long as it desires the bus. Whenever $\overline{HREQ}$ is inactive high, transfer controller 80 will own and drive the bus. The $\overline{HREQ}$ input is internally synchronized to multiprocessor integrated circuit 100 internal clock.

The host acknowledge output $\overline{HACK}$ signals when transfer controller 80 is ready to yield control of image systems bus. Transfer controller 80 will drive $\overline{HACK}$ low, following an active $\overline{HREQ}$, to indicate that it has driven its signals to high impedance and is relinquishing the bus. While $\overline{HACK}$ is active low, all external memory interface 302 bus outputs except CLKOUT are placed in high impedance. The internal request outputs REQ[1:0], $\overline{HACK}$ and frame controller 90 outputs will continue to be driven. An external device may then drive the image system bus as required. Transfer controller will drive $\overline{HACK}$ inactive high asynchronously following detection that $\overline{HREQ}$ is inactive, and then resume driving the bus.

Internal request outputs REQ[1:0] form a two bit encoding of the highest priority internal request being received by transfer controller 80. The request codes and their associated cycles are shown in Table 10.

TABLE 10

| REQ[1:0] | | Associated Internal Request |
|---|---|---|
| 0 | 0 | low priority packet transfer |
| | | tickle refresh |
| | | idle |
| 0 | 1 | high priority packet transfer |
| 1 | 0 | instruction cache service |
| | | data cache service |
| | | MP urgent packet transfer |
| 1 | 1 | frame controller access |
| | | urgent refresh |

External logic can monitor internal request outputs REQ [1:0] to determine when to relinquish the bus back to transfer controller 80. Since host requests are given highest priority by transfer controller 80, the system designer can determine the level at which the external device will operate by deciding which REQ[1:0] values will cause the host to relinquish bus ownership back to transfer controller 80.

Transfer controller 80 contains a programmable refresh controller to automatically generate DRAM refresh cycles as required by the external memory system. Parameters for this refresh are stored in cache, VRAM and refresh controller 310. Cache control logic generates the addresses necessary to perform the cache fills and write-backs as requested by master processor 60 and digital image/graphics processors 71, 72, 73 and 74. Frame controller 90 requests are handled by the VRAM control logic.

Transfer controller 80 has two independent controllers to handle packet transfers. The source machine 320 consisting of source registers 321 and source controller 322 generates the addresses necessary to fetch the data from the source memory. When a packet transfer request is submitted to transfer controller 80, it contains a number of parameters specifying how the source data is to be accessed. These parameters are loaded into source registers 322 and used by source control logic 323 to generate the source addresses. A similar set of parameters are loaded into destination registers 341 and used by destination control logic 342 to generate the addresses needed to write the packet data into the destination memory area. The combination of destination registers 341 and destination control logic 342 forms destination machine 340. Source machine 320 and destination machine 340 can each address both on-chip memories 10 and 20 and off-chip memory.

Figure 11:
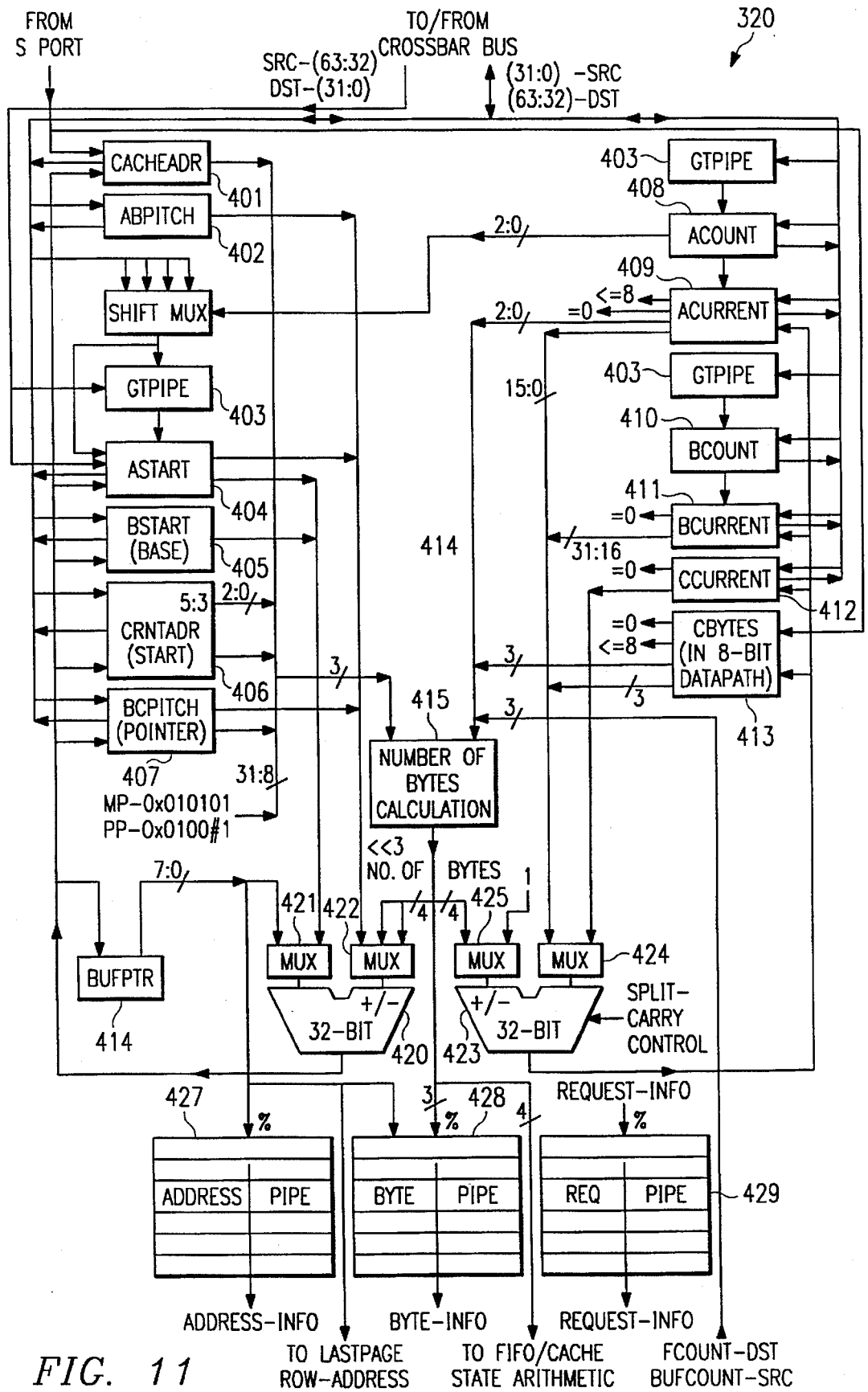
FIG. 11 illustrates the source machine structure.

FIG. 11 illustrates the construction of source machine 320. The internal structure of source machine 320 and destination machine 340 are identical. Only some of the connections to the rest of transfer controller 80 differ.

Source machine 320 includes the following registers. The CACHEADR register 401 contains either the internal or external address according to the direction of transfer. It is loaded from the internal S port of transfer controller 80 with an address of the cache sub-block. A multiplexer may be employed to generate the upper-bits of on-chip addresses.

The ABPITCH register 402 contains the pitch to be added to (or subtracted from) the starting address in order to generate the start address for the next line.

The GTPIPE register 403 is actually split into three pieces. The first part is a 32-bit address is destined for ASTART. The second part is a 16-bit line-count destined for BCOUNT. The third part is a 16-bit byte-count destined for ACOUNT. This serves a temporary register during guide table operations when the fetched guide table cannot be immediately stored in the associated register.

The ASTART register 404 stores a record of the start address of the current line. The ASTART register 404 also doubles for the guide table address/offset entry when performing guided transfers.

The BSTART register 405 stores a record of the start address of the current patch. The BSTART register 405 instead contains the base address for offset-guided transfers, and the last patch start address for delta-guided transfers.

The CRNTADR register 406 stores the current address of a packet service. This is the address at which the next access will be performed. To this value is added (or subtracted) the number of bytes being transferred to generate the next address. If the line or patch is being completed, then the CRNTADR register 406 is instead loaded with the start address of the next line or patch.

The BCPITCH register 407 stores the pitch to be added to (or subtracted from) the start address of the current patch in order to generate the start address for the next patch. When performing guided-transfers, the BCPITCH register 407 is used as the guide table pointer.

The ACOUNT register 408 stores the number of bytes in a line. This is either a constant, or is loaded from guide table entries for variable patch guided transfers.

The ACURRENT register 409 stores the current number of bytes remaining in the line.

The BCOUNT register 410 stores the number of lines less one in a patch. This is either a constant, or is loaded from guide table entries for variable-patch guided transfers.

The BCURRENT register 411 stores the current number of lines less one remaining in the patch.

The CCURRENT register 412 stores the current number of patches less one remaining in the packet. When performing guided transfers this instead indicates the number of entries remaining in the guide table.

The CBYTES register 413 stores the current number of bytes remaining to be transferred by a direct memory access or cache service.

The BUFPTR register 414 is a register shared by source machine 320 and destination machine 340. The BUFPTR register 414 points into the portion of parameter memory uses as a buffer during external-to-external packet transfers. A multiplexer may be employed to generate the upper-bits of on-chip addresses.

The FCOUNT register 431 (illustrated in FIG. 12) stores a 5 bit value (16–0 only) indicating how many bytes will be in packet transfer FIFO buffer 311 after all instructions currently in the pipeline have completed.

The BUFCOUNT register 441 (illustrated in FIG. 13) stored an 8 bit value (128–0 only) indicating how many spare bytes remain in the external-to-external buffer.

Central to source machine 320 is the calculation hardware and method to determine the number of bytes that the machine wishes to transfer. This takes place in number of bytes calculation circuit 415. This is dependent upon the number of bytes remaining in the dimension, the address alignment, the bus size and whether the dimension is being addressed forwards or backwards. The endian is not important for this calculation. Assuming for the moment that the number of bytes remaining in the dimension is 8 or more, then Table 11 shows the number of bytes that the machine wishes to transfer for different alignments, bus size and direction (forward or backward) of addressing.

TABLE 11

| 3 LSB Addr bits | | | 64 bit bus | | 32 bit bus | | 16 bit bus | | 8 bit bus | |
|---|---|---|---|---|---|---|---|---|---|---|
| | | | fore | back | fore | back | fore | back | fore | back |
| 0 | 0 | 0 | 8 | 1 | 4 | 1 | 2 | 1 | 1 | 1 |
| 0 | 0 | 1 | 7 | 2 | 3 | 2 | 1 | 2 | 1 | 1 |
| 0 | 1 | 0 | 6 | 3 | 2 | 3 | 2 | 1 | 1 | 1 |
| 0 | 1 | 1 | 5 | 4 | 1 | 4 | 1 | 2 | 1 | 1 |
| 1 | 0 | 0 | 4 | 5 | 4 | 1 | 2 | 1 | 1 | 1 |
| 1 | 0 | 1 | 3 | 6 | 3 | 2 | 1 | 2 | 1 | 1 |
| 1 | 1 | 0 | 2 | 7 | 2 | 3 | 2 | 1 | 1 | 1 |
| 1 | 1 | 1 | 1 | 8 | 1 | 4 | 1 | 2 | 1 | 1 |

If the bus is 64-bits wide and the addressing is forwards, then the above values are deduced by taking the two's complement of the 3 least significant address bits. The fourth address bit is the carry out. If the dimension is being addressed backwards then the number of bytes is calculated by simply adding 1 to the value of the 3 least significant address bits. If the bus is 32-bits wide and the addressing is forwards, then the above values are deduced by taking the two's complement of the 2 least significant address bits. Carry-out becomes the third bit. If the dimension is being addressed backwards, then the number of bytes is calculated by simply adding 1 to the value of the 2 least significant address bits. In these cases the effects of the next most significant bit which is usually included in the calculation must be annulled. If the bus is 16-bits wide and the addressing is forwards, then the above values are deduced by taking the two's complement of the least significant address bit only. Carry-out becomes the second bit. If the dimension is being addressed backwards, then the number of bytes is calculated by simply adding 1 to the value of the least significant bit. In these cases the effects of the next two most significant bits which are usually included in the calculation must be annulled.

The above descriptions describe the number-of-bytes which the machine wishes to transfer in order to align itself to the current bus size. After this operation occurs successive transfers would automatically be the maximum number of bytes permitted by the current bus size. If this bus size were to change this too is automatically handled.

The address register is then incremented (or decremented) by the number-of-bytes to be transferred, so that it points to the start of the next data. The current dimension count is also decremented by the same number to indicate the new number of bytes remaining. This process continues until the number of bytes the machine wishes to transfer becomes larger than the number of bytes remaining in the dimension, at which point the number of bytes actually transferred must be the lower value, and the dimension transfer is completed. This condition is detected by subtracting the number of bytes that remain from the number of bytes wishing to be transferred and if a borrow doesn't occur then the last transfer of the dimension has been reached, and the byte count is used for the number-of-bytes to transfer. A multiplexer is used to select between these two values based on the borrow condition.

If the transfer is the last in the dimension and a packet request is being performed then the next dimension parameters are calculated instead of doing the normal first-dimension calculations. According to whether the value in the BCURRENT register 411 is zero, either the BCURRENT register 411 or the CCURRENT register 412 is decremented. In either case the lower-dimension's xCURRENT counts are loaded from their xCOUNT registers and the next first dimension begun.

The address for the next dimension is also calculated by either adding (or subtracting) the value stored in the ABPITCH register 402 to the ASTART register 404 or the value stored in the BCPITCH register 407 to the BSTART register 405, according to whether or not the value of the BCURRENT register 411 is zero. The calculated value is written into CRNTADR register 406 and ASTART register 404, and if the value in the BCURRENT register 411 was zero, into BSTART register 405 as well.

When the last transfer of the first dimension is performed and the value in the BCURRENT register 411 and the CCURRENT register 412 are both zero, then source machine 320 has completed the packet service. When both source machine 320 and destination machine 340 reach this state the entire packet service is complete. Depending upon the source and destination update modes of the packet transfer options field, at this stage an extra dimensional calculation may be performed, and the date stored in the CRNTADR register 406 saved to the original packet request location. This allows later resubmission of the packet transfer at the point where it left off.

These address calculations take place in two 32 bit adders 420 and 423. Multiplexers 421 and 422 select the inputs to adder 420. Likewise, multiplexers 424 and 425 select the inputs to adder 423. Adder 420 services CACHEADR register 401, ABPITCH register 402, ASTART register 404, BSTART register 405, CRNTADR register 406 and BCPITCH register 407. Adder 423 services ACURRENT register 409, BCURRENT register 411, CCURRENT register 412 and CBYTES register 413.

Note that although the above description refers chiefly to packet transfers, similar procedures apply to cache services and buffer manipulations. In the case of cache services there is not a byte counter, since the address always begins on an aligned boundary, and the service finishes when the address reaches the end of the cache sub-block. This differs depending on whether source machine 320 is servicing a digital image/graphics processor instruction cache or a master processor 60 data or instruction cache.

The above descriptions suggest that the calculated number-of-bytes to transfer can always be performed. This isn't true because packet transfer FIFO buffer 311 can become too full or empty for the machine to transfer that number of bytes. This therefore requires further calculation before the operations may be loaded into the pipeline.

If source machine 320 wishes to transfer more bytes than there is room left in packet transfer FIFO buffer 311, then it must wait. If destination machine 340 wishes to transfer more bytes than there are in packet transfer FIFO buffer 311 then it must wait. If source machine 320 is about to load enough bytes into packet transfer FIFO buffer 311 for destination machine 340 to read, then both transfers can continue.

Figure 12:
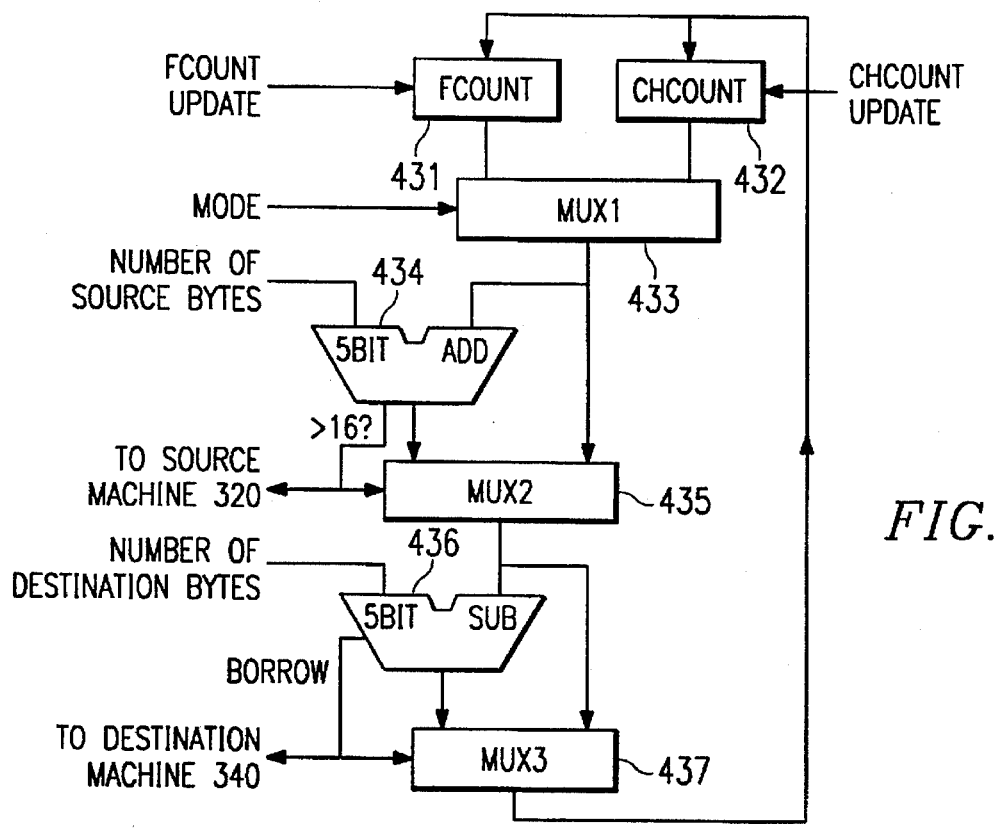
FIG. 12 illustrates examples of packet transfer FIFO buffer and cache buffer arithmetic operations and blocks.

These calculations are performed by the logic shown in FIG. 12. The FCOUNT register 431 records the number of bytes of data that there will be in packet transfer FIFO buffer 311 once the operations already in the pipeline have completed. Adder 434 adds this value to the number of bytes that source machine 320 wishes to transfer to packet transfer FIFO buffer 311. If the sum exceeds 16, then source machine 320 cannot proceed, but must wait for destination machine 340 to empty some data. Adder 434 generates a greater than 16 output which is supplied to source machine 320 to cause it to stall. The new number of bytes within packet transfer FIFO buffer 311, which is either the current value or the result of the addition as selected by the greater than 16 output of adder 343, passes via multiplexer 435 to subtracter 436. Subtracter 436 subtracts the new number of bytes in packet transfer FIFO buffer 311 from the number of bytes destination machine 340 wishes to transfer. If subtracter 436 doesn't generate a borrow, then destination machine 340 can proceed. If subtracter 436 generates a borrow, then the borrow signal stalls destination machine 340. The borrow signals controls multiplexer 437 to select the difference or the value before the subtraction to save in FCOUNT register 431.

A similar set of computations is required when using cache buffer 312 for cache service. A mode signal to multiplexer 433 selects whether FCOUNT register 431 serves as the source of the computations, or the similar CHCOUNT register 432, which stores the number of bytes stored in cache buffer 312.

When performing external-to-external transfers, transfer processor 80 uses a portion of the parameter memory of the requesting processor as a buffer. The state of this external-to-external buffer and its contents need to be managed. A buffer pointer BUFPTR register 414 is shared by source machine 240 and destination machine 340, since only one may access this buffer at a time. The BUFPTR register 414 is incremented by the number of bytes transferred to or from the buffer using the normal logic of source machine 320 and destination machine 340. The BUFPTR register 414 need only be 8 bits in length. The most significant bits of the address are fixed for each processor and are supplied from a constant multiplexer based upon the requesting processor. The number of bytes transferred is calculated using the normal alignment/space-left logic. Source machine 320, which empties the external-to-external buffer, uses BUFCOUNT register 441 to store the its bytes remaining value.

Destination machine 340, which fills the external-to-external buffer, uses FCOUNT register 431 to store its byte remaining value.

Figure 13:
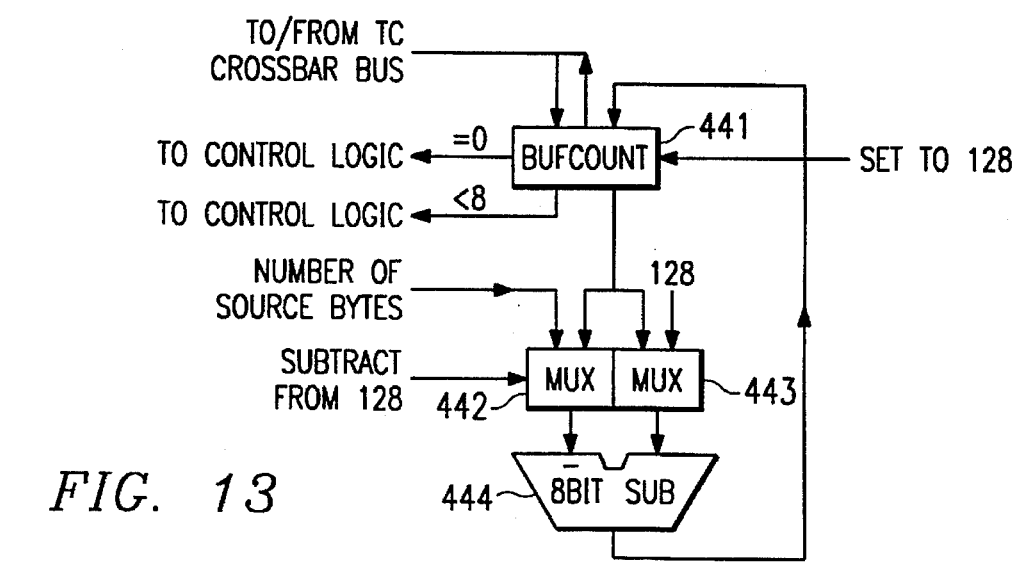
FIG. 13 illustrates examples of buffer count arithmetic operations and blocks.

FIG. 13 illustrates the buffer-count arithmetic. The BUFCOUNT register 441 is an 8-bit count of the number of spare bytes in the external-to-external buffer or the number of data bytes remaining to be emptied depending on the direction of transfer. Source machine 320 decrements BUFCOUNT register 441 by the number of bytes that it loads that it loads into packet transfer FIFO buffer 311 when filling the external-to-external buffer. When BUFCOUNT register 441 reaches less than 8, source machine 320 stops, and destination machine 340 continues until packet transfer FIFO buffer 311 is emptied into the external-to-external buffer. Source machine 320 cannot therefore fetch more data than will fit in the external-to-external buffer. The external-to-external buffer will be filled with at least 120 bytes.

Between filling and emptying the external-to-external buffer, BUFCOUNT register 441 must be subtracted from 128, to turn it into the number of data bytes remaining in the external-to-external buffer. When emptying the external-to-external buffer source machine 320 will decrement BUFCOUNT register 441 until it reaches zero. Destination machine 340 will continue to empty packet transfer FIFO buffer 311, then the direction is reversed again. The BUFCOUNT register 441 is reset to 128 before the external-to-external buffer filling commences. Multiplexers 442 and 443 and full adder 444 accomplish this needed arithmetic.

The BUFCOUNT register 441 and BUFPTR register 414 are saved with the other packet parameters when a packet transfer is suspended. A bit indicating the current direction emptying or filling the external-to-external buffer is also saved so that operation can correctly recommence upon restoration.

Figure 14A:
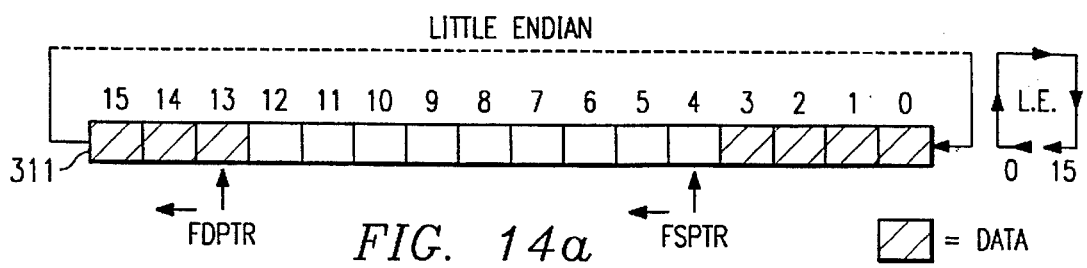
FIG. 14a illustrates a little endian packet transfer FIFO buffer example and method.
Figure 14B:
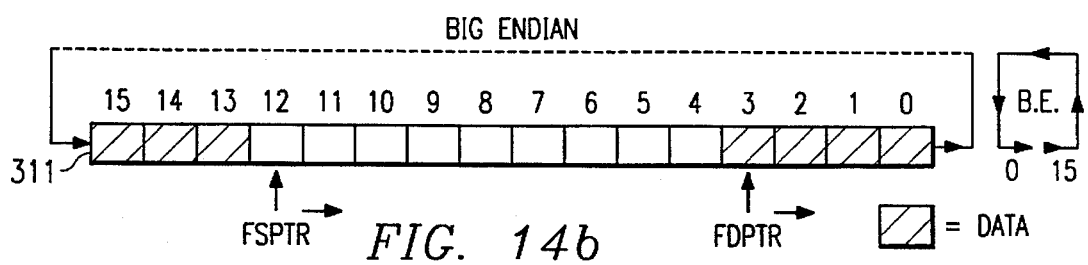
FIG. 14b illustrates a big endian packet transfer FIFO buffer example and method.

FIGS. 14a and 14b illustrate the relationship of packet transfer FIFO buffer 311 and the pointers FDPTR and FSPTR for the little endian and big endian cases, respectively. As packet requests allow the shape of source and destination to be virtually arbitrary and independent, it is not always possible to align to destination. In FIG. 8, both source machine 320 can be storing and destination machine 340 can be fetching between 0 and 8 bytes every cycle, with alignment of source and destination constantly changing with respect to each other. Thus packet transfer FIFO buffer 311 ia a byte-wide FIFO of 16 bytes that can be simultaneously loaded with 0–8 bytes from the source and emptied with 0–8 bytes to the destination. Source multiplexer and alignment logic 330 extracts the appropriate bytes from the source, and stores them into packet transfer FIFO buffer 311 at a position that maintains contiguous FIFO data. Destination multiplexer and alignment logic 350 extracts the "oldest" bytes from the packet transfer FIFO buffer 311 and aligns them to the correct position in the 8 byte word before being written to the destination. Source multiplexer and alignment logic 330 and destination multiplexer and alignment logic 350 will each align their transfers to 64-bit double-word boundaries as soon as they can and stay aligned for as long as they can. Thus Source multiplexer and alignment logic 330 and destination multiplexer and alignment logic 350 support the fluctuating alignment.

Packet transfer FIFO buffer 311 treats the 16 bytes as a circular buffer. The start point for the data can be at any byte position. The point from which destination multiplexer and alignment logic 350 will extract its data is indicated by the 4-bit FDPTR register. The FDPTR register is modified in the same cycle as the data are extracted moving the pointer to the new start of data. Destination multiplexer and alignment logic 350 then takes the extracted bytes and aligns then to the correct position in the destination double-word. The extraction from packet transfer FIFO buffer 311 and the alignment suitably occurs in one step using a 16 position byte rotator consisting of 8 parallel 16 bit barrel shifters in destination multiplexer and alignment logic 350. Gunned-data manipulation may then be performed to swap the bytes around, then perform another rotation. Destination multiplexer and alignment logic 350 also manipulates byte strobes in a similar fashion so that only the appropriate bytes are written to the destination.

Loading packet transfer FIFO buffer 311 from source multiplexer and alignment logic 330 is virtually an identical operation. Source multiplexer and alignment logic 330 writes its data at the first vacant location, which is markedly the 4-bit FSPTR register, and then updates the FSPTR register with the new first vacant location. Note that when packet transfer FIFO buffer 311 is full, the FSPTR register will actually point to the first location that will become vacant, once destination multiplexer and alignment logic 350 has extracted some data.

Destination machine 340 extracts its data on the slave phase of the clock cycle. Source machine 320 loads its data on the following master phase of the clock cycle.

Data rotation needs to be in either direction in order to support big and little endian operating modes. The data rotation is clockwise for little endian, and counter clockwise for big endian if viewed from outside packet transfer FIFO buffer 311 so that the continuity of data will always be correct. Source multiplexer and alignment logic 330, destination multiplexer and alignment logic 350, pointers FSPTR and FDPTR and registers of packet transfer FIFO buffer 311 must therefore be designed to cope with both endians.

The FCOUNT register 431 of FIG. 12 stores an indication of how many bytes are held in packet transfer FIFO buffer 311. The FCOUNT register 431 may never contain a value greater than 16. This register is manipulated by source machine 320 and destination machine 340 before loading the pipelines, so that the value stored in FCOUNT register 431 indicates how many bytes there will be in packet transfer FIFO buffer 311 after all the instructions currently in the pipeline have completed. This makes sure that operations cannot be loaded into the pipeline which would cause a blockage at packet transfer FIFO buffer 311. Thus destination machine 340 will always have enough bytes, and source machine 320 will always have enough room. It is a consequence of this that there is no danger of FDPTR or FSPTR over-taking one another. Beginning a new packet request resets FDPTR and FSPTR to zero so that they both point to the same place, and resets FCOUNT register 431 to zero. This ensures correct initialization of packet transfer FIFO buffer 311.

When a packet transfer is suspended FDPTR, FSPTR and FCOUNT register 341, as well as packet transfer FIFO buffer 311 registers themselves, are saved. This retains the entire state of packet transfer FIFO buffer 311, so that it can be restored upon re-commencement of the packet transfer.

Fill-with-value packet transfers load the fill value into the least significant double-word of packet transfer FIFO buffer 311, set FCOUNT register 431 to 16, and set FDPTR to the correct data start point for the endian. This is byte 0 for little endian and byte 7 for big endian. The value of FCOUNT register 431 will not be altered during fill-with-value packet transfers. Thus destination machine 340 always sees a full packet transfer FIFO buffer 311 and thus fetches and aligns the fill value. Source machine 320 also always sees a full packet transfer FIFO buffer 311 and thus stalls as required.

When suspending or restoring fill-with-value packet transfers the packet transfer FIFO buffer 311 state is simply saved and restored as for any other form of suspension. No special considerations are needed therefore for suspending fill-with-value packet transfers.

Source machine 320 includes two pipelines and shares another pipeline with destination machine 340. The pipelines interface with internal memory interface 301 and external memory interface 302 to allow four directions of data transfer: on-chip to on-chip; off-chip to on-chip; on-chip to off-chip; and off-chip to off-chip. The address pipeline 427 and byte pipeline 428 of source machine 320 are separate from those of destination machine 340, but are interlocked to provide common pipeline advance. This permits independent action on internal memory interface 310 and external memory interface 302 while remaining in step. A discontinuity in one interface also causes the other interface to stall. Address pipeline 427 stores the addresses to be accessed by source machine 320. Byte pipeline 428 stores the byte strobe and alignment information. This information indicates which bytes are relevant and how they are loaded into and removed from packet transfer FIFO buffer 311 or cache buffer 312. In transfer controller 80 register transfers, byte pipeline 428 stores the register number. Serviced information also passes down byte pipeline to indicate when operations are completed.

Source machine 320 and destination machine 340 share request pipeline 429. Request pipeline 429 stores status information, such as the type of operation being performed, i.e. low priority packet transfer, direct external access etc., and an indication of the requesting processor. Request pipeline 429 also stores parallel control information indicating when status events are to occur.

There will sometimes be bubbles in the internal pipeline as one or more access may stall. Transfer controller 80 uses these bubbles for fetching guide table values during guided transfers. This makes more efficient use of the transfer bandwidth of transfer controller 80. If the destination register is not free, then this fetches guide-table value is stored in the associated section of the GTPIPE register 403.

Transfer controller 80 can provide data alignment during packet transfers only in the from of byte alignment. Because source machine 320 and destination machine 340 are independent, they can each be fetching or storing between 0 and 8 bytes every cycle. This means that the alignment of the source and destination addresses with respect to each other can be changing constantly. To support the fluctuating alignment, transfer controller 80 contains a packet transfer first-in-first-out FIFO buffer 311, source alignment logic 332 and destination alignment logic 352. Packet transfer FIFO buffer 311 is a 16-byte FIFO which can be simultaneously loaded with 0-8 bytes from the source and emptied with 0-8 bytes to the destination. Source multiplexer 331 and source alignment logic 332 extracts the appropriate bytes from the source and stores them in packet transfer FIFO buffer 311 contiguous to the previous source bytes. The destination alignment logic 352 and destination multiplexer 351 then extracts the "oldest" bytes from packet transfer FIFO buffer 311 and aligns them to the correct position in currently addressed destination 8-byte double-word. Packet transfer alignment and FIFO operation is automatic and transparent to the programmer in the contemplated embodiment.

Cache buffer 312 is an 8-byte buffer similar in operation to packet transfer FIFO buffer 311 and is used during cache and direct external access operations. Transfers into and out of the caches are always 8-bytes wide. Cache buffer 312 helps align the data in the cases where the external memory bus is less than 64 bits wide. Providing cache buffer 312 separately from packet transfer FIFO buffer 311 allows higher-priority cache and direct external access requests to be serviced in the middle of a packet transfer without having to first empty the packet data currently in packet transfer FIFO buffer 311.

Transfer controller 80 has four user accessible registers which are mapped into on-chip memory. These are accessible by master processor 60 via load and store instructions. The registers are not accessible to the digital image/graphics processors 71, 72, 73 and 74. Table 12 lists these registers.

TABLE 12

| Address | TC Register |
|---------|-------------|
| 0x1820000 | REFCNTL |
| 0x1820004 | PTMIN |
| 0x1820008 | PTMAX |
| 0x182000C | FLTSTS |

The REFCNTL register contains two 16 bit values that are used to control system DRAM refresh cycles. The 16 bit REFRATE field (bits 15–0) determines the interval at which DRAM refresh cycle requests will be generated. The value in REFRATE represents the number of clock cycles of multiprocessor integrated circuit 100 that occur between each refresh request. Values of less than 32 (Hex "0020") in REFRATE cause DRAM refreshes to be disabled. The REFRATE field is set to 32 (Hex "0020") at reset. During DRAM refreshes, a 16 bit pseudo-address is output on the external address bus for use with refresh bank decoding or $\overline{RAS}$ only refresh. The 16 bit RPARLD field (bits 31–16) contains the maximum value that will be output during refresh cycles. A refresh address counter is used to keep track of the current refresh address. Each time that a refresh cycle occurs, the counter is decremented. When the counter reaches zero, it is reloaded with the value in RPARLD. The RPARLD field is set to Hex "0FFFF" at reset.

The packet transfer minimum register PTMIN 511 and the packet transfer maximum register PTMAX 512 control time of operation of packet transfers. These registers are illustrated in FIG. 31 and further described below. The packet transfer minimum register PTMIN 511 stores the minimum number of clock cycles for which a packet transfer must be serviced by transfer controller 80 before it can interrupted by a higher priority packet transfer. Only the 24 least significant bits of the packet transfer minimum register PTMIN 511 are implemented in the preferred embodiment. Reading from the higher order bits always returns "0" and writing to these bits has no effect. Packet transfer minimum register PTMIN 511 is loaded with Hex "10000" (64K cycles) at reset. The packet transfer maximum register PTMAX 512 determines the maximum amount of time that a packet transfer can continue following the time specified by packet transfer minimum register PTMIN 511 before time-out. In this contemplated embodiment packet transfer maximum register PTMAX 512 implements the 24 least significant bits. Reading from the higher order bits returns "0" and writing to these bits has no effect. Thus a packet transfer may be interrupted by a higher priority packet transfer following PTMIN cycles and can be suspended for execution of another packet transfer of the same priority following PTMIN+PTMAX cycles. The value stored in the packet transfer maximum register PTMAX 512 does not affect when a packet transfer can be suspended for a higher priority packet transfer. At reset, the value Hex "10000" (64K cycles) is loaded into PTMAX.

The FLTSTS register contains status bits that indicate that a fault has occurred during a packet transfer or digital image/graphics processors 71, 72, 73 and 74 instruction cache fill or direct external access cycle. Table 13 shows the meanings of particular bits on the FLTSTS register.

TABLE 13

| FLTSTS bit | Name | Function |
| --- | --- | --- |
| 31 | DIGPC7 | reserved |
| 30 | DIGPC6 | reserved |
| 29 | DIGPC5 | reserved |
| 28 | DIGPC4 | reserved |
| 27 | DIGPC3 | DIGP3 cache/DEA fault |
| 26 | DIGPC2 | DIGP2 cache/DEA fault |
| 25 | DIGPC1 | DIGP1 cache/DEA fault |
| 24 | DIGPC0 | DIGP0 cache/DEA fault |
| 23 | DIGP7 | reserved |
| 22 | DIGP6 | reserved |
| 21 | DIGP5 | reserved |
| 20 | DIGP4 | reserved |
| 19 | DIGP3 | DIGP3 packet transfer fault |
| 18 | DIGP2 | DIGP2 packet transfer fault |
| 17 | DIGP1 | DIGP1 packet transfer fault |
| 16 | DIGP0 | DIGP0 packet transfer fault |
| 0 | M | MP packet transfer fault |

Transfer controller 80 sets individual bits of the FLTSTS register based upon detection of certain memory faults. The M bit (bit 0) is set to 1 when a fault occurs during a master processor 60 requested packet transfer. Bits 19–16 are used to indicate packet transfer faults requested by digital image/graphics processors 71, 72, 73 and 74. The DIGP3 (bit indicates a digital image/graphics processor 74 packet transfer fault. The DIGP2 (bit 18) indicates a digital image/graphics processor 73 packet transfer fault. The DIGP1 (bit 17) indicates a digital image/graphics processor 72 packet transfer fault. The DIGP0 (bit 16) indicates a digital image/graphics processor 71 packet transfer fault. Bits 23–20 are reserved for reporting packet transfer faults in an embodiment including eight digital image/graphics processors. Each of these bits is set to 1 when a fault occurs during a packet transfer requested by the corresponding digital image/graphics processor.

The DIGPC3 bit (bit 27) is set to 1 when a fault occurs during a cache fill or direct external access operation requested by digital image/graphics processor 74. Similarly, a "1" in the DIGPC2 bit (bit 26) indicates a fault during a cache fill or direct external access operation requested by digital image/graphics processor 73. A "1" in the DIGPC1 bit (bit 25) indicates a fault during a cache fill or direct external access operation requested by digital image/graphics processor 72. A "1" in the DIGPC0 bit (bit 24) indicates a fault during a cache fill or direct external access operation requested by digital image/graphics processor 71. Bits 31–28 are reserved to indicate cache fill or direct external access operations requested by additional digital image/graphics processors in an embodiment employing eight digital image/graphics processors.

The setting of any one of the M, DIGP3-0, or DIGPC3-0 bits interrupts master processor 60. Clearing a FLTSTS bit that has been set causes the associated packet transfer, cache fill or direct external access to be rescheduled. FLTSTS bits are cleared by writing a "1" to the appropriate bit. Writing "0" to a bit has no effect.

Because master processor 60 registers are score boarded, faulted direct external access requests do not necessarily stall this processor's instruction pipeline. Master processor 60 will stall because of a direct external access store fault only if another attempt to access data is made. Faulted direct external access loads will cause master processor 60 to stall under the same conditions or if an attempt is made to use the registers being loaded by the direct external access. Faulted direct external accesses requested by digital image/graphics processor 71, 72, 73 or 74 will always stall the requesting processor until their requested direct external access has completed.

Figure 7:
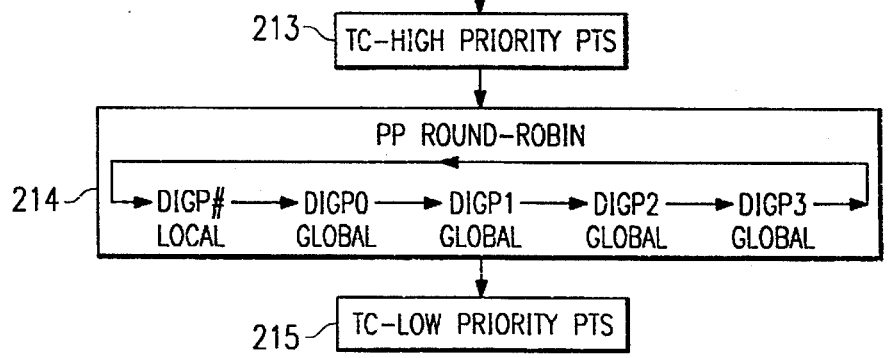
FIG. 7 illustrates crossbar priorities and method of operation within the multiprocessor integrated circuit.

A packet transfer is a transfer of blocks of data between two areas of memory. Data is transferred by transfer controller 80 from a source (Src) memory area to a destination (Dst) memory area. The source and destination areas may be either on-chip or off-chip memory. Packet transfers are initiated by the master processor 60 or one of digital image/graphics processors 71, 72, 73 and 74 as requests to transfer controller 80. Transfer controller 80 services the requests using the fixed and round robin prioritizations as illustrated in FIGS. 6 and 7 via request queuing and prioritization logic 303. Once a processor has submitted a request it may continue program execution. The packet transfer will be completed by transfer controller 80 without the need of additional processor cycles. Because packet transfers can be submitted on different priority levels, higher priority transfers can interrupt lower priority transfers. When this occurs, the lower priority transfer is suspended by transfer controller 80 and the current position in the transfer is saved. When the higher priority transfer is complete, the suspend transfer resumes automatically at the point where it was interrupted.

To facilitate the understanding of packet transfers, a brief definition of terms used to discuss packet transfers is in order. A line is a number of contiguous bytes in memory. A patch is a group of lines whose starting addresses are an equal distance apart. A packet is a collection of patches. Pitch is the difference in addresses between the start of two lines or between the start of two patches. A parameter table is an 8 double-word long collection of parameters which describe a packet of data and how it is to be moved from the source to the destination. A linked-list is a collection of parameter tables, each pointing to the next table in the list. A guide table is a table of parameters describing individual patches within a packet transfer. A source transfer is the transfer of data from the source memory locations. A destination transfer is the transfer of data to the destination memory locations.

Each processor has an associated parameter memory. A number of locations within the associated parameter memory are set aside for use by transfer controller 80 when servicing packet transfer requests from that processor. These areas are shown in FIG. 15. Parameter memories areas used by transfer controller 80 are not restricted to transfer controller 80 use only. However, the programmer must be aware that data placed in these locations may be overwritten by transfer controller 80 during packet transfer operation. These locations must never be written to when a packet transfer request is active as this will corrupt the packet transfer or its data.

An example of the process, method or sequence for a processor to initialize a packet transfer is as follows. Create the packet transfer parameter tables in the corresponding parameter memory. If necessary, generate the packet transfer's guide table in on-chip memory. The nature of a guide table will be further explained below. Set the linked-list start address in the parameter memory to point to the beginning of the first parameter table. Note that FIG. 15 illustrates the location within the corresponding parameter memory where this linked-list starting address must be stored. For master processor 60 this linked-list start address must be stored at address Hex "010100FC" to Hex "010100FF". For digital image/graphics processors 71, 72, 73 and 74 this linked-list start address must be stored at address Hex "0100#0FC" to Hex "0100#0FF", where # is the number of the digital image/graphics processor. Next set the appropriate packet transfer priority bits and the P bit to submit the request to transfer controller 80. These bits are located in the PKTREQ control register for master processor 60 and in the COMM register of the digital image/graphics processors 71, 72, 73 and 74. Transfer controller 80 detects the status of these registers and then services the packet transfer request according to the priorities illustrated in FIGS. 6 and 7.

Packet transfer requests are submitted as linked-list structures. Linked-lists are simply a collection of packet transfer parameter tables where each packet transfer includes a pointer to the entry point of the next entry on the list. Although packet transfers can operate on on-chip or off-chip memory, the linked-lists of parameter tables themselves must be stored in on-chip memory. Each processor can have a number of linked-lists stored in memory but only one of them may be active at a time. The start of the active linked-list is stored in the dedicated linked-list start address location in the parameter memory of the requesting processor. Each entry parameter table in the linked-list contains a pointer to the location of the next entry on the list. The final entry in the list can point to anywhere because the list-end is marked by a stop bit in the packet transfer parameter table's packet transfer options field.

Figure 16:
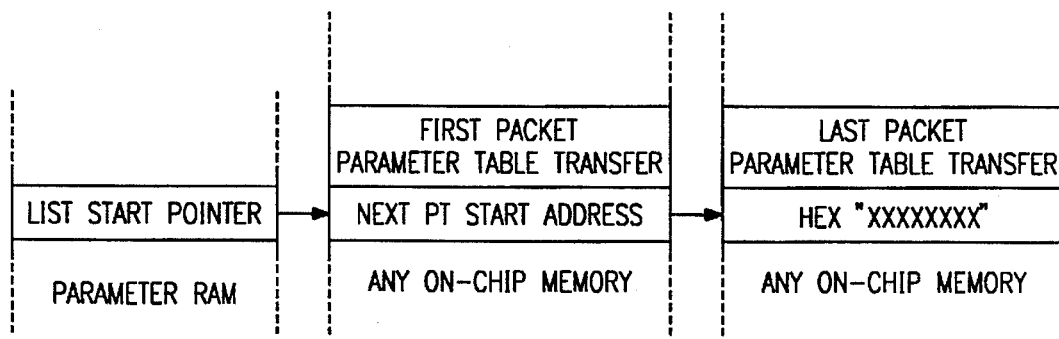
FIG. 16 illustrates a linked-list packet transfer method example.

FIG. 16 illustrates a simple linked-list structure. This list contains two packet transfer parameter tables. The list start pointer stores the address of the beginning of the first packet transfer parameter table. The first data within the first packet transfer parameter table in the address of the second, and in this case last, packet transfer parameter table. Though this example includes only two packet transfer parameter tables a linked-list can be as long as can fit in on-chip memory.

Once a processor has submitted a packet transfer by setting its P bit, transfer controller 80 will respond by setting the Q bit of the corresponding processor. This indicates that linked-list of that processor has been queued within transfer controller 80. When the round robin token appropriate to the packet transfer priority level reaches the requesting processor, transfer controller 80 will begin to actively service the request. Transfer controller 80 reads the starting location of the linked-list from the linked-list start address location in the parameter memory of the requesting processor. Transfer controller 80 reads the first packet transfer parameter table into registers within its source machine 320 and destination machine 340. Transfer controller 80 then uses source machine 320 and destination machine 340 to transfer the data as indicated within the parameter table. Once the packet transfer is complete, transfer controller 80 updates the linked-list start address in parameter memory with the next address in the linked-list. This is read from the first entry of the just completed packet transfer parameter table. Transfer controller 80 then repeats the procedure until it reaches the last entry on the linked-list.

Packet transfer devices, processes and methods described herein provide a number of different formats and options to allow maximum flexibility in the movement of data. When considering these formats it is important to remember that the packet transfer's source transfer and destination transfer are independent of one another. This allows packet data to be written using a completely different format from that in which it was read, enabling any number of spreading or merging functions to be achieved automatically. The two basic packet transfer formats are "dimensioned" and "guided". These formats may determine how data is read or how it is written depending on whether they describe the source transfer or the destination transfer. Note it is possible to specify a different format for source and destination transfers.

Dimensioned transfers are the simplest type but are also the most rigid. Dimensioned transfers describe sources or destinations that may be a simple contiguous linear sequence of data bytes, or may consist of a number of such regions. The addressing mechanism allows an array of up to 3 dimensions to be specified. This allows a number of 2-dimensional patches to be transferred by a single packet transfer. Data along the first or A dimension is always one byte apart. The spacing along the second or B dimension and third or C dimension is arbitrary but fixed for the entire packet. The transfer completes when the destination dimensions are completed.

Figure 17:
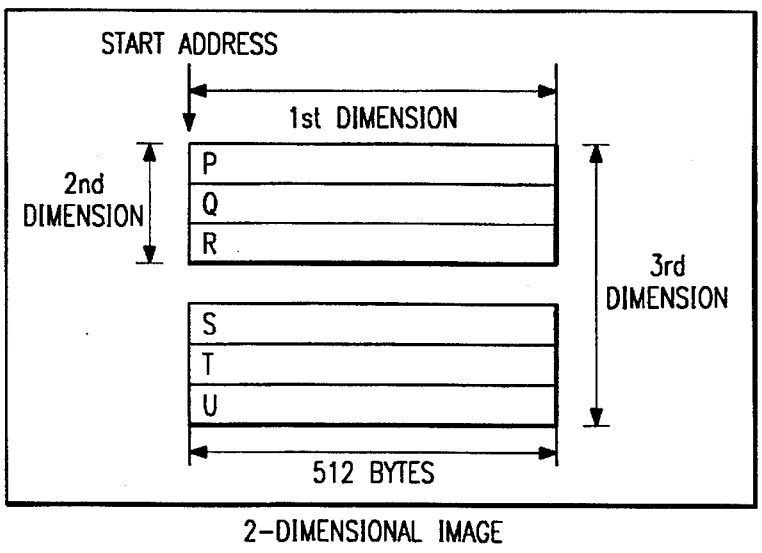
FIG. 17 illustrates a dimensioned packet transfer method example.

FIG. 17 illustrates an example of how a dimensioned transfer accesses the source or destination memory. It shows a packet consisting of 2 patches of 3 lines, each consisting of 512 adjacent 8 bit pixels. This might be needed, for example, if 2 digital image/graphics processors 71, 72, 73 and 74 were going to perform a 3 by 3 convolution, each working on one of the patches of lines. The first patch ("PQR") might represent data to be transferred into data memory 22 associated with to digital image/graphics processor 71 and the second patch ("STU") data to be transferred into data memory 27 associated with digital image/graphics processor 72. This example would represent a source transfer since it specifies how transfer controller 80 is to read data from the source memory area. The data packet is specified in terms of the following parameters: A count; B count; C count; start address; B pitch; and C pitch. The A count is the number of contiguous data bytes in the first dimension. In the example of FIG. 17 this is 512. The B count is the number of steps to form a patch or the number of lines less one. FIG. 17 illustrates a B count of 2. The C count is the number of patch-steps to form a packet less one. FIG. 17 illustrates a C count of 1. The start address is the linear address of the start of the packet. This is the address of the byte indicated as "P". The B pitch is the linear pitch of the second dimension, that is the difference of the addresses of bytes "P" and "Q", or "Q" and "R". The C pitch is the linear pitch of the third dimension, the difference of the addresses of bytes "P" and "S". Both source and destination transfers can be defined in this manner, but the parameters are independent so that the shape of the source and destination can be quite different.

Not all dimensions of a dimensioned transfer are required to be active. By setting the B Count and/or the C Count to 0, transfers can be limited to individual bytes, pixels multiple bytes, lines, or patches. An A Count value of zero will result in no data being transferred and may cause an error to occur.

Guided transfers are those in which the sequence of dimension addresses is guided from a table in on-chip memory rather than calculated solely from values within the packet transfer parameters. While their operation is more complicated than that of dimensioned transfers, they are much more flexible. There are two classes of guided transfers: fixed-patch; and variable-patch. Fixed-patch guided transfers have the first and second dimension described within the packet transfer parameters as with dimensioned transfers, but the third dimension is guided from entries in an on-chip guide table. In variable-patch guided transfers the guide table also determines the size of the A and B dimensions for each patch. In either form, the first two dimensions are active in a way similar to dimensioned transfers. Each guided table entry can, therefore, move an individual byte, an individual pixel of multiple bytes, a line, or a two-dimensional patch, according to the sizes of the first two dimensions. This allows a number of irregular operations to be performed, such as are encountered in line draws or processing data via look-up tables.

Unless otherwise noted, the information in the following descriptions of guided transfers applies equally to both source and destination transfers.

A guide table is simply a block of entries which may be either 32 bit or 64 bit depending on the transfer type. The guide table must be located in on-chip memory. For fixed-patch transfers, the guide table must be aligned to a 32 bit word address. For variable-patch transfers, guide tables must be aligned to a 64 bit double word address. The starting address of the guide table and the number of entries it contains are indicated within the corresponding packet transfer parameter table. Each guide table entry corresponds to one two-dimensional patch within the packet transfer. As transfer controller 80 services the packet transfer, it will fetch the guide table entries one by one, as needed to process the next patch in the packet transfer. Additional details on the guide table entries are noted below in the detailed guided transfer descriptions below.

Fixed-patch guided transfers use an on-chip guide table containing 32 bit entries. The table must be word aligned and thus the least significant two bits of the table's entry address must be "00". Each entry contains information used to calculate the addresses for the third dimension of the transfer. Fixed-patch transfers come in three types; fixed-patch delta-guided; fixed-patch offset-guided; and fixed-patch offset-guided look-up table. These types will be explained in more detail below.

For fixed-patch delta-guided transfers, the guide table contains 32 bit "delta" values to be added to the starting address of the previous two-dimensional patch to form the starting address of the current patch. The patch size is fixed and defined by the A Count and B Count packet transfer parameters.

Figure 18:
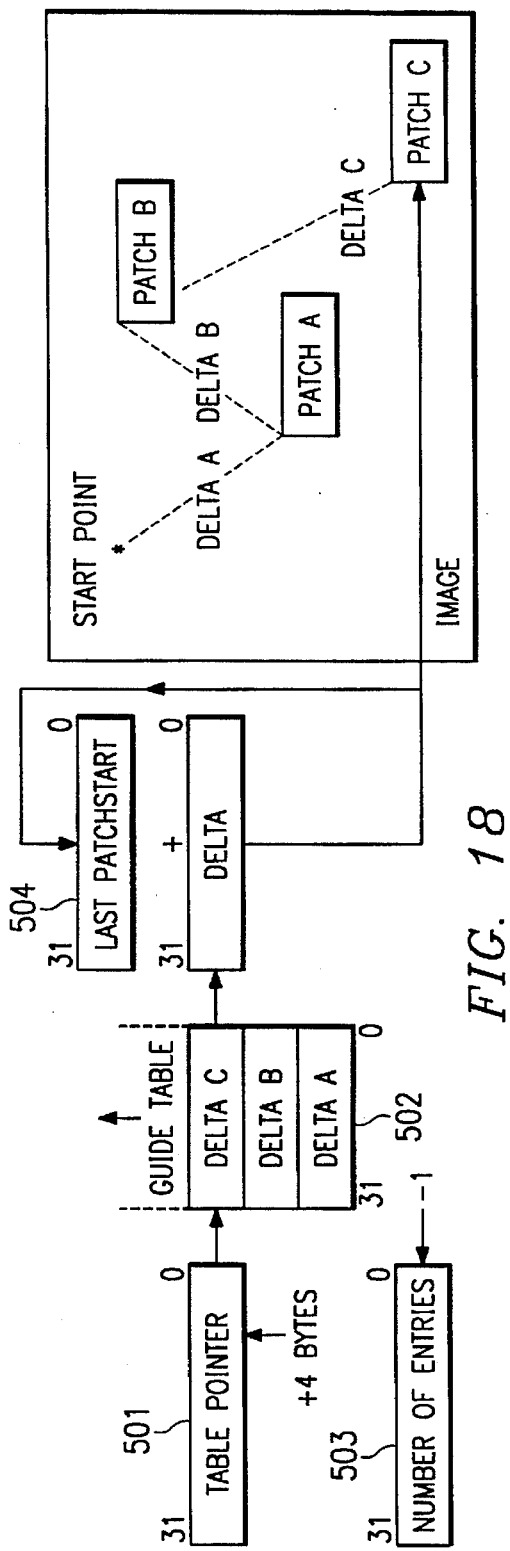
FIG. 18 illustrates a fixed-patch delta-guided packet transfer method example.

An example of a fixed-patch delta-guided packet transfer process and method is shown in FIG. 18. Here the value delta A is added to the starting address given in the packet transfer parameters to form the start address of the first patch, patch A. This start address is stored in last patch start register 504. Delta B is then added to the start address of patch A stored in last patch start 504 to form the start address of patch B, and so on. Note that the sum is always stored in last patch start register 504 to form the basis for the next patch start address. As FIG. 18 shows, table pointer 501 is incremented by 4 bytes after each patch to point to the next entry in guide table 502. A number of entries counter 503 is initially loaded with the number of entries value from the packet transfer parameter table. Number of entries counter 503 is decremented by one after each patch. The packet transfer terminates when number of entries counter 503 reaches zero.

Fixed-patch offset-guided packet transfers use guide table 502 that contains 32 bit values to be added to a base address given in the packet transfer parameters to form the starting address of each patch. The patch size is fixed and defined by the A count and c Count packet transfer parameters.

Figure 19:
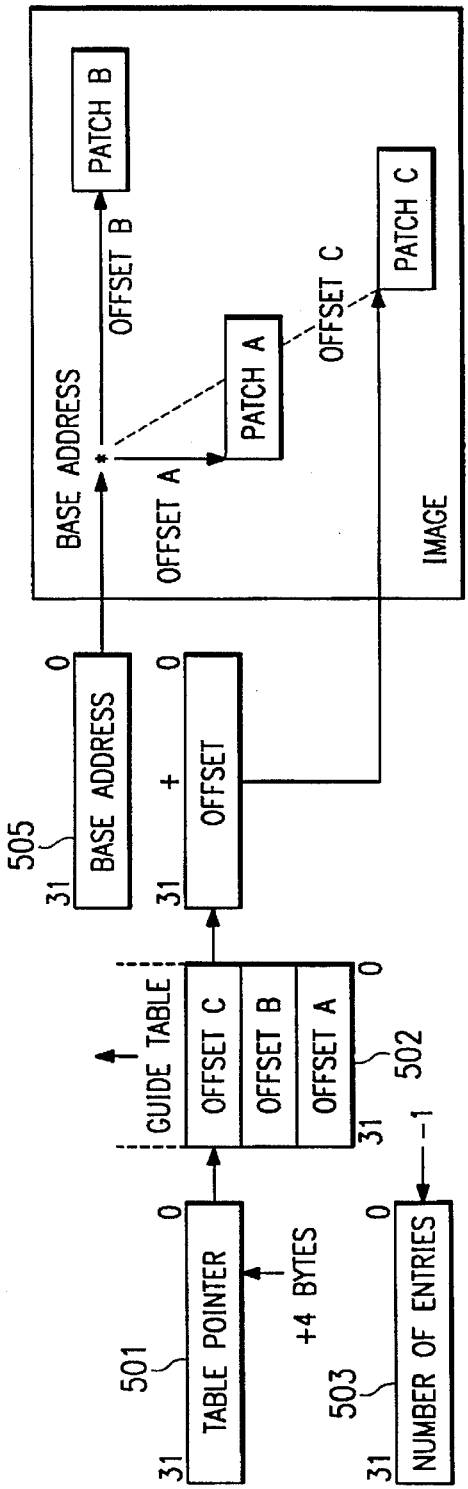
FIG. 19 illustrates a fixed-patch offset-guided packet transfer method example.

FIG. 19 shows the addressing mechanism process and method for fixed-patch offset-guided packet transfers. The value delta A from the first entry in guide table 502 is added to a base address specified in the packet transfer parameter table and stored in base address register 505 to form the start address of patch A. Delta B is then added to the address stored in base address register 505 to form the start address of patch B, and so on until the last entry in guide table 502. Note that if the base address specified in the packet transfer parameter table is zero, guide table 502 will specify absolute addresses. As in the delta-guided transfer, table pointer 501 points to the current guide table entry and number of entries counter 503 tracks the number of patches performed.

For fixed-patch offset-guided look-up table packet transfers, guide table 502 contains 32 bit offset values that are to be left-shifted with zero fill by zero, one, two, or three bits in offset register 506 and then added to the address stored in a base address register 505. The base address stored in base address register 505 is given in the packet transfer parameters. This allows the transfer to be used for look-up table operations, independent of the look-up table's data-size. The fixed-patch offset-guide look-up table format may only be used for source transfers. The shift amount is indicated by the position of the left-most one in bits 1–3 of the A Count field of the packet transfer parameters. A "1" in bit 3 indicates a left-shift three places; bit 2, two places; bit 1, one place. No "1" in bits 1–3 indicates a zero shift. This left shift allows support of 8, 16, 32 and 64 bit data-sized look-up tables. The patch size for look-up table transfers is fixed, one dimensional and set to 1, 2, 4, or 8 bytes.

Figure 20:
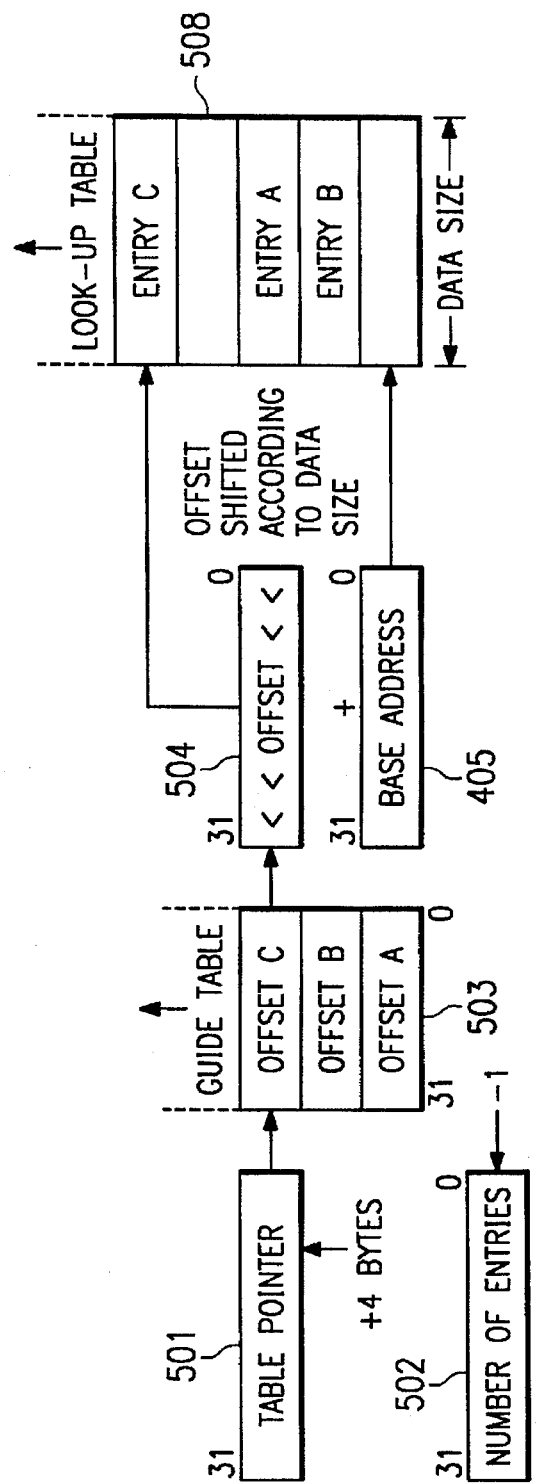
FIG. 20 illustrates a fixed-patch offset-guided look-up table packet transfer method example.

FIG. 20 illustrates an example of the address computation for a fixed-patch offset-guided look-up table packet transfer. Here, offset A is shifted left by 0, 1, 2, or 3 bits according to the look-up table data size as indicated by the value in the A Count field. This shifted address in offset register 507 is added to the base address stored in base address register 508 to form the start address of patch A. The offset B value is then shifted and added to the base address in base address register 508 to form the patch B start address, and so on. The shifting occurs as the offset value is being loaded from guide table 502. As described in previous examples, table pointer 501 and number of entries register 503 keep track of the current position in guide table 502 and the number of patches.

Figure 21:
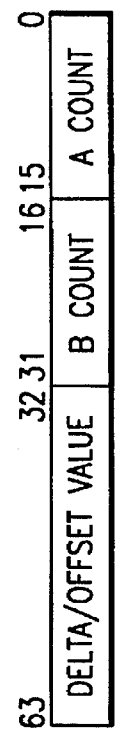
FIG. 21 illustrates a little-endian variable-patch guide table format.
Figure 22:
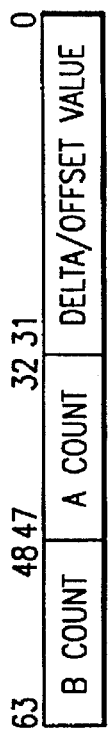
FIG. 22 illustrates a big-endian variable-patch guide table format.

Variable-patch guided transfers specify all patch size information within the guide table rather than in the packet transfer parameters. This allows each patch within the packet transfer to have different dimensions. Transfers can be either delta or offset guided. For variable-patch guided transfers the guide table consists of 64 bit double-word entries. The little-endian format for the guide table is shown in FIG. 21. The lower half of the double word contains the A and B count values for the first two dimensions. The upper 32 bits contain the value used to calculate the address of the third dimension. FIG. 22 shows the big-endian guide table format, where the upper 32 bits includes the A and B count values and the lower 32 bits includes the offset or delta.

Software is suitably provided to create guide tables independent of the endian format by using 32 bit writes. The A and B counts appear at word 1 addresses and the offset/delta address appear at word 0 addresses, where word 1 is at the address 4 bytes greater than word 0. Transfer controller 80 accesses both 32 bit words at one time during 64 bit accesses and adjusts the word order as necessary for correct internal operation according to the currently selected endian mode. Guide table entries for variable-patch transfers must be double word aligned, that is the three least significant bits of the byte address must be "000".

Figure 23:
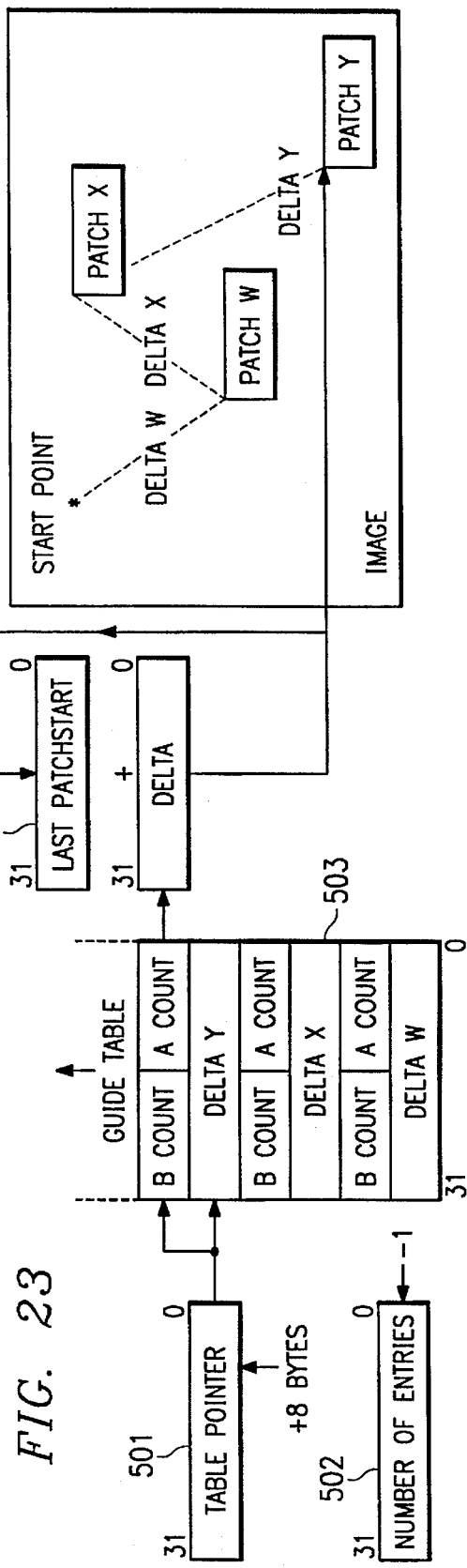
FIG. 23 illustrates a variable-patch delta-guided packet transfer method example.

FIG. 23 shows an example of a variable-patch delta-guided packet transfer. For a variable-patch delta-guided packet transfer, the first word of a guide table entry contains the 32 bit delta amount to be added to the start address of the previous patch stored in last patch start register 504. The starting address for the first patch is given in the packet transfer parameters. The patch size is variable and specified in the second word of each guide table entry. Here delta W is added to the starting address specified in the packet transfer parameters to form the start address of patch W. The A count determines the length in number of bytes of the first dimension and the B count the size of the second dimension, which is the number of lines–1. Delta X is then added to the patch W starting address stored in last patch start register 504 to generate the patch X start address, etc. As previously described in the case of fixed-patch transfers, table pointer 501 and number of entries counter 503 keep track of the position in guide table 502. Note that table pointer 501 is incremented to point to an address 8 bytes higher because each guide table entry is 64 bits or 8 bytes.

Figure 24:
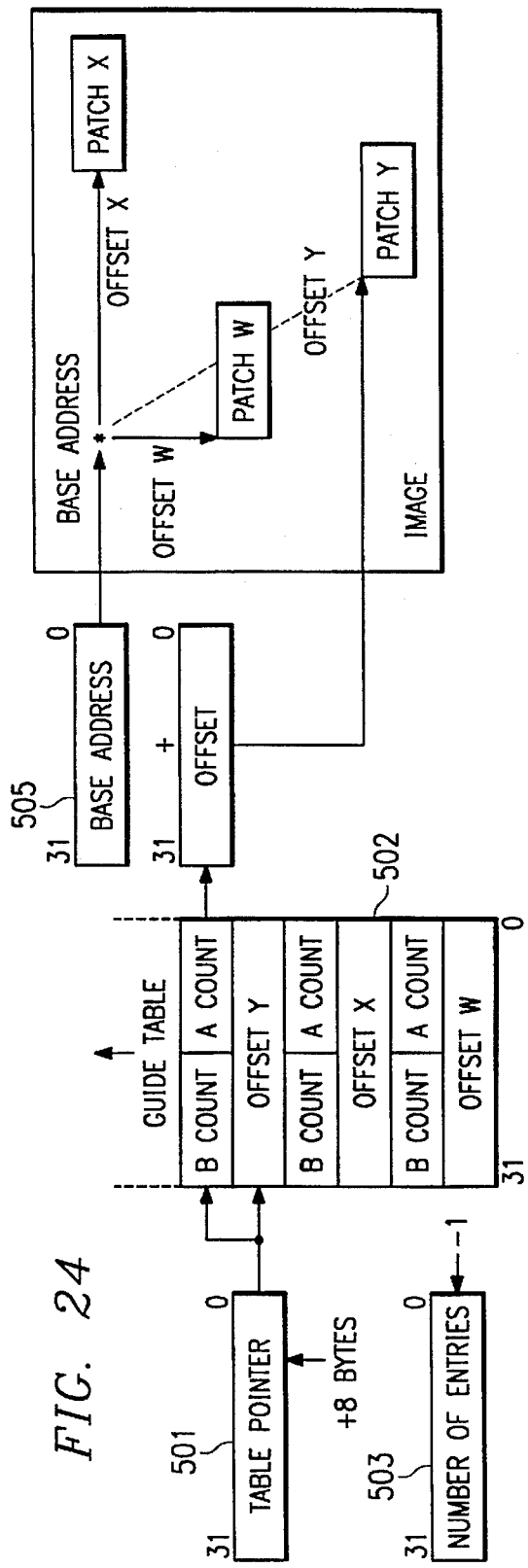
FIG. 24 illustrates a variable-patch offset-guided packet transfer method example.

An example of a variable-patch offset-guided packet transfer is shown in FIG. 24. One word of each guide table entry for variable-patch offset-guided packet transfers contains a 32 bit offset value. This 32 bit offset value is added to a base address stored in base address register 505 to calculate the start address of each patch. The base address is specified in the packet transfer parameters. The patch size is variable and specified in the other half of each guide table entry. The offset W value is added to the base address stored in base address register 505 to generate the start address of patch W. The A count and the B count values determine the size of the patch. Offset X is then added to the original base address stored in base address register 505 to get the start address for patch X, and so on. Table pointer 501 and number of entries counter 503 keep track of the position in guide table 502, with table pointer 501 is incremented by 8.

The fill-with-value packet transfer like the look-up table packet transfer may only be specified for source transfers. Fill-with-value packet transfers do not actually transfer data from source memory but instead specify the source value within the packet transfer parameters. Two 32 bit fields, the most significant fill value word and the least significant fill value word, specify the 64 bit value that will be used to fill the destination memory. If the fill pattern is less than 64 bits, then the pattern must be replicated throughout the least significant and most significant fill value words. No alignment operations are performed on the fill value, the bytes written to the destination double-word are the corresponding bytes from the fill value double-word. No source start address or source dimension counts are specified for fill-with-value packet transfers. The size of the packet transfer is determined by the destination transfer parameters.

The large variety of transfer formats results in a large number of possible combinations of source and destination transfers. In order to specify these combinations, the format of the parameters in the packet transfer parameter table will vary depending on the type of source and destination transfer being requested. To aid in the discussion of the parameter table contents, FIGS. 25 through 29 are shown as examples of range of possible parameters.

Packet transfer parameter tables are preferably located in on-chip memory: master processor 60 parameter memory 15; digital image/graphics processors 71, 72, 73 and 74 parameter memories 25, 30, 35 or 40; or digital image/graphics processors 71, 72, 73 and 74 data memories 22, 23, 24, 27, 28, 29, 32, 33, 34, 37, 38 π 39. Packet transfer parameter tables must be 64 byte aligned, that is the 6 least significant address bits are "00000". There is no restriction as to which memory contains the table. Thus master processor 60 may use a parameter table located in parameter memory 25 corresponding to digital image/graphics processor 71, and etc. The requesting processor simply places the appropriate starting address in the linked-list start address location in it's own parameter memory before submitting the packet transfer request.

In conjunction with FIGS. 25 to 28 the following sections describe the various fields in the packet transfer parameters. The address of each field relative to the address of the start of the packet transfer parameters represented by "PT" is given as well as the transfer types for which the field is valid. In many cases there are two identical fields, one for source transfers and one for destination transfers. In these cases the field description will be given in a singular context. Depending on the transfer type, certain fields are unused. In these cases, the field may be left unprogrammed. Table 14 lists all the permitted options. These will be described in detail below.

TABLE 14

| Operations | Source | Destination |
| --- | --- | --- |
| Dimensioned | yes | yes |
| Fixed-patch delta-guided | yes | yes |
| Fixed-patch offset-guided | yes | yes |
| Fixed-patch offset-guided LUT | yes | no |
| Variable-patch delta-guided | yes | yes |
| Variable-patch offset-guided | yes | yes |
| Fill-with-value | yes | no |
| Transparent dimensioned | yes | no |
| Transparent fixed-patch delta-guided | yes | no |
| Transparent fixed-patch offset-guided | yes | no |
| Transparent variable-patch delta-guided | yes | no |
| Transparent variable-patch offset-guided | yes | no |
| Block write | no | yes |

The first data word in the packet transfer parameters is the next packet transfer start address of the next parameter table. This word is present in all packet transfer types. This is a 32 bit pointer to the start of the next entry on the packet transfer linked-list. This points to a 64 byte aligned on-chip address, thus the 6 least significant bits of this address must be "000000". The last entry of a linked-list needs no special next address entry, because the stop bit in the packet transfer options field is used to terminate the linked-list. Whenever a packet transfer completes successfully, the value in next packet transfer entry address word is written to the linked-list start address location in the parameter memory of the requesting processor. This automatically advances the pointer to the next packet transfer. The pointer is also updated after the final packet on the linked-list has been completed so that, if the stop bit is being used to "pause" linked-list execution, the pointer will be pointing to the next packet transfer on the linked-list when the linked list is re-enabled.

The second word is the packet transfer options field. This is located at PT+4. The packet transfer options field is used in all packet transfer types to specify various options in the way that data is transferred. This packet transfer options field will be discussed in detail below.

The third and fourth data words used in dimensioned and delta-guided packet transfers are source and destination starting addresses. The source start address is located at PT+8 and the destination address is located at PT+12. These fields are used in dimensioned and delta-guided packet transfers. For dimensioned packet transfers each is a 32 bit word indicating the starting byte address for source or destination. For delta-guided transfers each represents the starting address to which the first delta offset is added for the source or destination transfer.

The third and fourth data words used in offset-guided packet transfers are source and destination offsets. The source start address is located at PT+8 and the destination address is located at PT+12. These fields are 32 bit offset values that take the place of the source and destination start addresses when offset-guided transfer modes are used.

The fifth and sixth data words are source and destination A and B counts. The fifth data word at PT+16 bytes has the A count for the source at bits 15–0 and the B count for the source at bits 31–16. Similarly, the sixth data word at PT+20 has the A count for the destination at bits 15–0 and the B count for the destination at bits 31–16. The A count 16 bit fields specify the number of bytes to be transferred in the corresponding first dimensions of the source or destination for dimensioned or fixed-patch transfers. The A count field is unused for variable-patch guided transfers. In addition, source A count is unused for fill-with value packet transfers. The B count 16 bit fields specifies the number of "steps" that should occur in the corresponding second dimensions of the source or destination for dimensioned or fixed-patch transfers. This is equal to the number of lines–1. A value of 0, therefore, disables the second dimension and results in the transfer of only one line per patch. The B count field is unused during variable-patch transfers. The source B count is unused during fill-with-value packet transfers.

The seventh and eight data words located at PT+24 and PT+28 in dimensioned packet transfers are the source and destination C counts, respectively. These 32 bit fields specify the number of "patch-steps" in the third dimensions of the source or destination. These values equal the number of patches–1. A values of 0, therefore, disables the third dimension and results in only one patch being transferred. The source C count field is unused for fill transfers.

The seventh and eight data words in delta or offset guided packet transfers are the number of entries. The value in these 32 bit field specifies the number of entries in the guide table for the source and destination, respectively. These fields thus indicate the number of patches of information that will be transferred. A zero value results in no data transfer.

The ninth and tenth data words are located at PT+32 and at PT+36, respectively. In dimensioned fixed-patch packet transfers these 32 bit fields specify the pitch of the second dimensions of the source and destination. This pitch value is added to the start address of a source or destination line to obtain the start address of the next line. If the value in the corresponding B count field is 0, then this field may be left unprogrammed.

The eleventh and twelveth data words are located at PT+40 and PT+44, respectively. In dimensioned packet transfers these 32 bit fields specify the pitch of the third dimensions of the source or destination. This pitch value is added to the start address of a source or destination patch to obtain the start address of the next patch. If the value in the corresponding C count field is 0, then this field may be left unprogrammed.

In delta or offset guided packet transfers the eleventh and twelveth data words are guide table addresses. These fields are loaded with an aligned address which points to the first entry in the respective guide-table. The value of these data words are auto-incremented by 4 for fixed-patch transfers or by 8 for variable-patch transfers each time that an entry is taken from the guide table. These guide table start addresses must be aligned to a 32 bit word address for the case of fixed-patch packet transfers or 64 bit double-word address for variable-patch packet transfers. The guide tables must be in on-chip memory. An illegal address error interrupt will occur if either condition is not true.

The ninth and eleventh data words have a special use in fill-with-value packet transfers. These two 32 bit fields together they define a 64 bit fill pattern. The bytes written to the destination double-word are taken from corresponding bytes within the fill value double-word. Data values should therefore be repeated within these two data words if the fill pattern is less than 64 bits. Note that for fill-with-value packet transfers the fill value is the only source permitted, while the destination may be dimensioned, fixed or variable patch, delta or offset guided.

The thirteenth and fourteenth data words hold the transparency value if the packet transfer employs source transparency. This 64 bit double word begins at PT+48. This 64 bit field is used to indicate the value that is to be compared to when transparency is selected. The packet access mode field of the packet transfer options field indicates the transparency size or the number of values contained within this field. The bytes about to be written to the destination double-word are compared against the corresponding bytes within the transparency value, and the byte strobes are driven inactive if a match is found. Data values should be replicated if the pixel size is less than 64 bits. This field is unused for all non-transparency transfers except block write. The source transparency value is used by transfer controller 80 exactly as written to memory, regardless of the endian-mode and thus no word-swap occurs. This is illustrated in FIG. 25. Confusion can be avoided by always writing the value as a double-word write to address 48 bytes following the packet transfer parameter table starting address.

The thirteenth and fourteenth data words hold the color register data if the packet transfer employs the block write mode. The 64 bit color register field contains the value used to load the color registers of video random access memories (VRAMs) in preparation for block write cycles. It is also used when performing simulated block writes. Transfer controller 80 uses the color register value exactly as written regardless of the endian in the same manner as described above regarding the transparency value. This is illustrated in FIG. 29. Use of this field is described in detail below.

The fifteenth and sixteenth data words starting at PT+56, which form the last double-word of the packet transfer parameters, are currently unused for all transfer modes and may be left unprogrammed. These data words may be used in future versions of multiprocessor integrated circuit 100.

FIGS. 25 through 29 illustrate a small number of the possible formats of the packet transfer parameter tables. FIG. 25 illustrates an example of the parameter table for a source and destination dimensioned packet transfer with source transparency. Note that transparency word 0 is stored at PT+48 and transparency word 1 is stored at PT+52. FIG. 26 illustrates an example parameter table for a destination dimensioned packet transfer with fill-with-value. The most significant bits of the fill value are stored at PT+40. The least significant bits of the fill value are stores at PT+32. FIG. 27 illustrates an example of the parameter table for a dimensioned source and fixed patch guided destination packet transfer. Note that the data word at PT+12 stores the base address, the data word at PT+28 stores the number of entries in the guide table and the data word at PT+44 stores the start address of guide table. FIG. 28 illustrates an example of the parameter table for a dimensioned source and variable patch guided destination packet. The destination A and B counts normally stored at PT+20 are not programmed because these counts are part of the destination guide table. FIG. 29 illustrates an example of the parameter table for a dimensioned block write packet transfer. Note that the double data word starting at PT+48 includes color register words 0 and 1.

The packet transfer options field selects what form of transfer will be used for the source and destination transfers and determines if the current packet will end the linked-list. It also enables selection of a number of additional features such as special transfer modes, performing additional address calculations at the completion of a packet transfer, changing the direction of dimensional address calculations, or reversing the source and destination transfers. The format of the packet transfer options field is shown in FIG. 30. Note that loading the options field with all zeros gives a default packet transfer that uses dimensioned transfers on source and destination with no special addressing modes.

Bits 1–0 of the packet transfer options field form the destination update mode field. These two bits indicate how the destination start address in the original packet transfer parameter table is updated once the packet transfer has completed. If these bits are non-zero, an extra address calculation is performed after the packet transfer completes. This value is then written over the original destination start address specified in the packet transfer parameter table. This allows the packet transfer to be submitted again, possibly continuing from where it left off. This is especially useful for ping-ponging between two memory areas.

The destination update modes are listed in Table 15. Note that if one of the destination reverse addressing bits reverse destination C or reverse destination B described below are set, a subtraction is performed rather than an addition.

TABLE 15

| Bit | | Destination Update Operation |
|---|---|---|
| 1 | 0 | |
| 0 | 0 | Don't update |
| 0 | 1 | Add (subtract) B pitch to (from) the start address of the last line in destination transfer and write result to destination |
| 1 | 0 | Add (subtract) C pitch to (from) the start address of the last patch in destination transfer and write result to destination |
| 1 | 1 | Add (subtract) C pitch to (from) the start address of the last patch in destination transfer and write result to destination and start address in PT parameter table; then toggle "Reverse destination C addressing" bit in PT Options field |

The destination update mode might be used to perform one extra step of the largest dimension in use, however, other useful operations can also be performed. Mode "10" could be used to add a C pitch even though the transfer may have been only two-dimensional. This would allow the next two-dimensional packet to be positioned relative to the last. Mode "11" is especially useful for re-submitting packet transfers that ping-pong between two one-dimensional or two-dimensional patches, such as on-chip data memory. Since the direction of addressing the third dimension is reversed each time that the packet transfer parameters are updated upon completion, it will alternate between the memory areas.

This functionality is intended primarily for use with dimensioned transfers. Although it may be specified with guided transfers, caution should be used. Remember that for guided transfers, the destination C pitch is replaced by the destination guide table pointer.

Bits 6–4 of the packet transfer options field form the destination transfer mode field. These three bits indicate which form of transfer is to be used for destination addressing. The codings are shown in Table 16. Note that source specific modes look-up table and fill-with-value are not defined (reserved) for destination addressing.

TABLE 16

| Bit | | | |
|---|---|---|---|
| 6 | 5 | 4 | Destination Transfer Mode |
| 0 | 0 | 0 | Dimensioned |
| 0 | 0 | 1 | Reserved |
| 0 | 1 | 0 | Reserved |
| 0 | 1 | 1 | Reserved |
| 1 | 0 | 0 | Variable-Patch Delta-Guided |
| 1 | 0 | 1 | Variable-Patch Offset-Guided |
| 1 | 1 | 0 | Fixed-Patch Delta-Guided |
| 1 | 1 | 1 | Fixed-Patch Offset-Guided |

Bits 9–8 of the packet transfer options field form the source update mode field. The source update modes are shown in Table 17. Note that if the appropriate source reverse addressing bit reverse source C or reverse source B is set, a subtraction is performed rather than an addition.

TABLE 17

| Bit | | Source Update Operation |
|---|---|---|
| 9 | 8 | |
| 0 | 0 | Don't update |
| 0 | 1 | Add (subtract) B pitch to (from) the start address of the last line in source transfer and write result to source |
| 1 | 0 | Add (subtract) C pitch to (from) the start address of the last patch in source transfer and write result to source |
| 1 | 1 | Add (subtract) C pitch to (from) the start address of the last patch in source transfer and write result to source and start address in PT parameter table; then toggle "Reverse source C addressing" bit in PT Options field |

These two bits indicate with what value the source start address in the original packet transfer parameters should be updated once the packet transfer completes. If these bits are non-zero, an extra source address calculation is performed after the packet transfer completes. This value is then written over the original source start address specified in the packet transfer parameters. This allows the packet transfer to be submitted again, possibly continuing from where it left off the previous time. This is especially useful for ping-ponging between two memory areas. These modes have the same use in the source address generation as previously described in destination address generation.

Bits 14–12 of the packet transfer options field form the source transfer mode field. These three bits indicate which form of transfer is to be used for source addressing. The codings are shown in Table 18.

TABLE 18

| Bit | | | |
|---|---|---|---|
| 14 | 13 | 12 | Source Transfer Mode |
| 0 | 0 | 0 | Dimensioned |
| 0 | 0 | 1 | Fill-with-value |
| 0 | 1 | 0 | Reserved |
| 0 | 1 | 1 | Fixed-Patch Offset-Guided LUT |
| 1 | 0 | 0 | Variable-Patch Delta-Guided |
| 1 | 0 | 1 | Variable-Patch Offset-Guided |
| 1 | 1 | 0 | Fixed-Patch Delta-Guided |
| 1 | 1 | 1 | Fixed-Patch Offset-Guided |

Bits 18–16 of the packet transfer options field form the packet transfer access mode field. These three bits are used to encode special access modes as shown in Table 19. These modes modify the way in which the source data is written to the destination. For on-chip memory destination, only normal transfers in mode "000" are allowed.

TABLE 19

| Bit | | | |
|---|---|---|---|
| 18 | 17 | 16 | Packet Transfer Access Mode |
| 0 | 0 | 0 | Normal Page-Mode |
| 0 | 0 | 1 | Peripheral Device Transfer |
| 0 | 1 | 0 | Block-Write |
| 0 | 1 | 1 | Serial-Register Transfer |
| 1 | 0 | 0 | 8 bit source Transparency |
| 1 | 0 | 1 | 16 bit source Transparency |
| 1 | 1 | 0 | 32 bit source Transparency |
| 1 | 1 | 1 | 64 bit source Transparency |

A coding of "000" enables the normal access mode or page-mode accesses for external memory. No special addressing modes are used on the source or destination. Data is transferred from source to destination without alteration.

A coding of "001" enables the peripheral device transfer mode. The peripheral device mode allows another device to read or write memory external to multiprocessor integrated circuit 100 using transfer controller 80 as a memory controller. Device reads of memory are achieved by programming the source. Device writes to memory are achieved by programming the destination. In either case, transfer controller 80 will drive memory address and control lines normally with address generated according to the transfer parameters but will place the data bus in high impedance mode so that the peripheral device can read or drive data. The peripheral device mode may be used with any form of source or destination transfer except fill-with-value.

A coding of "010" allows the packet transfer to make use VRAM block writes. It causes transfer controller 80 to load the VRAM color register and then perform destination writes to external memory using VRAM block write mode. In this mode, the source data represents block write address mask bits which specify which locations in the VRAM will be written with the VRAM color register data. These bits are fetched from the source using normal addressing and subsequently written to the destination VRAM using block write mode. The value loaded in the VRAM color registers is specified as the color register value of the packet transfer parameter.

Block-write operation is supported for off-chip destinations only. Attempting block-write to an on-chip destination address will cause the packet transfer to suspend with an error condition.

A coding of "011" enables the serial-register transfer mode. The serial-register transfer mode is typically used to do bulk initialization of VRAMs. The source address is used to copy a VRAM row into the VRAM serial shift register. The destination addresses are then used to copy the shift register into a number of VRAM memory rows. Normal operation would be to load the source A count with a value of 1 byte, and the destination with an A count of 1 and a B count of n−1 where n is the number of rows to be written. Note that with this mode no transfer of data over the data bus or crossbar 50 takes place, all data transfer takes place with the VRAM. All source and destination accesses will be in non-page mode. Serial-register transfer operation is supported for off-chip source and destinations only.

Codings in the form of "1XX" enable transparency. Source and destination dimensioned or guided transfers are performed normally. Before the destination data is written however, it is compared to the transparency value given in the packet transfer parameters. This transparency comparison takes place in transparency and byte write circuit 353. The two least significant bits of packet access mode indicate the size of the transparency data. Thus one 64 bit, two 32 bit, four 16 bit, or eight 8 bit comparisons are made. If any of the comparisons are true, then transparency and byte write circuit 353 disables the corresponding byte-strobes so that the destination bytes are not written. Attempting transparency with an on-chip source or destination address will cause the packet transfer to suspend with an error condition.

Bit 19 of the packet transfer options field is the exchange source and destination parameters bit. Setting bit 19 allows the direction of a packet transfer to be reversed without manually swapping the source and destination parameters. This is useful when returning data to its original location. When the exchange bit is set, transfer controller 80 will swap all the source and destination values start addresses, pitches, counts, guide table pointers, and fill values when it loads the packet transfer parameters. Table 20 shows the 32 bit swaps that occur if this bit is set. Note that "PT" represents the address of the packet transfer parameter table's next entry address.

TABLE 20

| Byte Address | | Byte Address |
|---|---|---|
| Src Start Address PT+08 | <= => | PT+12 Dst Start Address |
| Src A/B Counts PT+16 | <= => | PT+20 Dst A/B Counts |
| Src C Count PT+24 | <= => | PT+28 Dst C Count |
| Src B Pitch PT+32 | <= => | PT+36 Dst B Pitch |
| Src C Pitch PT+40 | <= => | PT+44 Dst C Pitch |

Notice that the next entry address data at PT and the packet transfer options field at PT+04 remain in their prior locations since these values are not source or destination related. Also note that PT+48 and PT+52, which store the transparency data or color register data, are not swapped. This allows the 64 bit transparency or color register parameter to maintain its value.

In addition to swapping the source and destination related parameter words, transfer controller 80 also swaps the source and destination related bits within the packet transfer options field. This is shown in Table 21.

TABLE 21

| | Bit Number | | Bit Number | |
|---|---|---|---|---|
| Dst Update Mode | 0 <= | => 8 | | |
| | 1 <= | => 9 | | Src Update Mode |
| | 4 <= | => 12 | | |
| Dst Transfer Mode | 5 <= | => 13 | | Src Transfer Mode |
| | 6 <= | => 14 | | |

TABLE 21-continued

| | Bit Number | | Bit Number | |
|---|---|---|---|---|
| Dst Reverse B Addressing | 24 | <= => | 21 | Src Reverse B Addressing |
| Dst Reverse C Addressing | 25 | <= => | 22 | Src Reverse C Addressing |

If any of the swaps result in an unsupported function then the packet transfer will suspend with an error condition. The exchange of source and destination parameters is performed whenever the packet transfer parameters are loaded. If the packet transfer is suspended, then the current parameters will be swapped back to their original positions before being saved to the parameter memory of the requesting processor. If the suspended packet transfer is then restored, the parameters will again be swapped as they are loaded by transfer controller 80.

If one of the update modes is specified in the packet transfer options field, then the operation will occur as normal when the packet transfer completes. If, for example, a source update operation is selected, the source start address in the original packet transfer parameters will be updated even though it was actually used as the destination start address during the packet transfer. Likewise, specifying "toggle reverse source C addressing" bit as the update mode causes bit 22 of the original packet transfer options field to be toggled which would actually cause the destination C addressing to be reversed if the packet transfer is resubmitted.

As the above example indicates care should be taken when using the X bit. If specified for a fill-with-value source to dimensioned destination packet transfer, for example, the packet transfer will be suspended with an error because fill-with-value can not be specified as a destination operation. Even if the error did not occur, the destination start address and counts would be loaded with source values that are typically unprogrammed. Similarly the fill value words would be loaded with destination pitches. This could result in a very nonsensical packet transfer.

Bit 21 of the packet transfer options field is the reverse source B addressing bit. Setting this bit to "1" causes the second dimension of the source to be addressed backwards. The B pitch is subtracted from the previous line start address rather than added. If this bit is "0", then the packet transfer source addressing occurs normally.

Bit 22 of the packet transfer options field is the reverse source C addressing bit. Setting this bit to "1" causes the third dimension of the source to be addressed backwards. The C pitch is subtracted from the previous patch start address instead of added. If this bit is "0", then the packet transfer source addressing occurs normally. Note that this bit has no meaning for guided transfers, which specify the C addressing via a guide table.

Bit 23 of the packet transfer options field is the reverse A addressing bit. Setting this bit to "1" causes the first dimensions of the source and destination to be addressed backwards. Double-word addresses are decremented instead of incremented. This means that the value to which the B pitch is added (or subtracted) is the highest address in the first dimension. Note that the byte addressing within the double-word is not reversed, only the double-word addressing.

Bit 24 of the packet transfer options field is the reverse destination B addressing bit. Setting this bit to "1" causes the second dimension of the destination to be addressed backwards. The B pitch is subtracted from the previous line start address rather than added. If this bit is "0", then the packet transfer source addressing occurs normally.

Bit 25 is the reverse destination C addressing bit. Setting this bit to "1" causes the third dimension of the destination to be addressed backwards. The C pitch is subtracted from the previous patch start address instead of added. If this bit is "0", then the packet transfer source addressing occurs normally. Note that this bit has no meaning for guided transfers, which specify the C addressing via a guide table.

Bit 28 of the packet transfer options field is the interrupt when finished bit. Setting this bit to "1" will cause a "normal" interrupt to be sent to the processor that initiated the packet transfer, as soon as this entry on the linked-list has finished. The linked-list may contain further entries. This allows the requesting processor to be flagged when a particular point in the linked-list has been reached. If this bit is "0", then no interrupt is sent to the processor upon completion of the corresponding packet entry in the linked-list. Thus no interrupt issues until either an entry with this bit set is encountered and completed, or the packet transfer at the end of the linked-list is completed. If an error occurs at any time, however, transfer controller 80 will immediately send an error-interrupt to the requesting processor.

Bits 30–29 of the packet transfer options field form a packet transfer status field. The packet transfer status field reflects the state of a packet transfer request. These bits should always be set to "00" when a processor submits a request. If any packet transfer within the linked-list gets suspended, transfer controller 80 will set the appropriate packet transfer status bits in the packet transfer options field that it saves to the suspended packet parameters area.

This is necessary because a suspended packet transfer contains more parameters than a fresh packet transfer, and is therefore saved and restored differently. If either of these bits is encountered as a "1" by transfer controller 80 when it is loading packet transfer parameters, it realizes that the packet transfer was suspended, and will therefore restore all the extra parameters. This field is encoded as listed in Table 22.

TABLE 22

| Bit | | Packet Transfer Status |
|---|---|---|
| 30 | 29 | |
| 0 | 0 | Not suspended |
| 0 | 1 | Suspended, but not faulted |
| 1 | 0 | Suspended, and faulted on source |
| 1 | 1 | Suspended, and faulted on destination |

Transfer controller 80 will write "01" to these bits when the packet transfer has been suspended because one of the following conditions has occurred: a higher priority packet transfer request has been received by transfer controller 80; the packet transfer is large and has timed-out; the processor that requested the packet transfer has asked for it to be suspended; or an error condition has occurred. Bit 30 actually indicates that the packet transfer was suspended because a fault occurred. Bit 29 then indicates whether the fault was on the source or the destination. This information is needed by master processor 60 in order to resolve a fault condition. It is irrelevant to transfer controller 80 when it reloads the parameters of a faulted packet transfer because the suspension and restoration process is the same for all types of suspended packet transfers.

If the exchange source and destination parameters bit (bit 19) is "1" in the suspended packet transfer options field then the meaning of Bit 29 for a faulted packet transfer is reversed. Thus "10" indicates fault on destination, and "11"

indicates fault on source. Master processor 60 software should therefore examine both bits 29 and 19 when determining the faulted address location.

Transfer controller 80 takes several actions if a fault does occur during a packet transfer. Transfer controller 80 sets bits 29 and 30 appropriately. Transfer controller 80 sets the appropriate bit in the FLTSTS register. Transfer controller 80 issues a fault interrupt to master processor 60. If one of digital image/graphics processors 71, 72, 73 or 74 issued the packet transfer, this processor it will be unaware that the fault has occurred. Master processor 60 should clear the fault condition and clear the fault flag in the FLTSTS register. Upon clearing the corresponding fault flag in the FLTSTS register, transfer controller 80 will automatically resubmit the packet transfer.

Bit 31 of the packet transfer options field is the stop bit. This bit is used to mark the "end" of a linked-list. Upon encountering a packet transfer where this bit is "1", the packet transfer is completed and the linked-list will be terminated. Before termination, the next entry address field is copied into the linked-list start address location in the parameter memory of the requesting processor. Thus, if the linked-list is re-enabled, execution will begin at the next entry in the linked list. This allows the creation of circular linked-lists, which are particularly useful for repeated operations such as ping-ponging. Stop bits can also be used to break linked-lists at desired locations.

Once transfer controller 80 has read the packet transfer parameters from the parameter table, it is ready to begin transferring data. To do this, transfer controller 80 must generate either crossbar or external memory accesses or both. There are four basic source to destination data flow possibilities: on-chip to on-chip; on-chip to off-chip; off-chip to on-chip; and off-chip to off-chip. The first three are handled "normally" while the latter is a special case.

During the normal packet data transfer flow, source machine 320 generates source addresses based upon the transfer parameters and uses these to fetch data from the appropriate on-chip or off-chip memory. Once data has been received from the crossbar or external memory bus, the required bytes are extracted and aligned by source alignment logic 332, and then placed in the packet transfer FIFO buffer 311. At the same time, destination machine 340 is also generating addresses for the destination memory. Once packet transfer FIFO buffer 311 contains the number of bytes required for the next destination memory access, destination machine 340 generates the required crossbar or external memory cycle.

Packet transfer FIFO buffer 311 serves to control the data flow and keep source machine 320 in synchronization with destination machine 340. If at any time packet transfer FIFO buffer 311 does not contain enough source bytes for the next destination access, destination machine 340 stalls until the data becomes available. In the same manner, if packet transfer FIFO buffer 311 is full, source machine 320 stalls until destination machine 340 has drained enough bytes for the next source access to complete. This prevents the source transfer from overrunning the destination transfer. For special packet transfer access modes, this data flow may be somewhat modified.

Because crossbar 50 and external memory interfaces are independent, source transfers can occur on the external bus and destination transfers can occur on the crossbar or vice-versa in parallel. For on-chip to on-chip transfers, the source and destination will share the crossbar interface and interleave cycles as necessary.

Cache service requests, direct external access requests, frame controller 90 requests, urgent refreshes, and host requests do not cause packet transfer suspension. These requests may stall one or both of source machine 320 and destination machine 340, but only if the request has a higher priority than the packet transfer. Frame controller 90 and urgent refresh cycles use only the external memory interface. Thus packet transfer crossbar accesses can continue to occur. If either source machine 320 or destination machine 340 is using the external memory interface, then packet transfer FIFO buffer 311 will eventually become either full or empty. Thus the controller using the crossbar will have to stall until the external memory interface becomes available again. If the transfer is on-chip to on-chip then both source machine 320 and destination machine 340 can continue unimpeded. Cache and direct external access servicing use both crossbar and external interfaces so they will typically stall any packet transfer for the number of cycles that they require.

Off-chip source to off-chip destination packet transfers are handled differently than the other three cases of packet transfers. In order to take advantage of page mode on DRAMs and VRAMs, transfer controller 80 performs a page mode burst of column accesses from the off-chip source to on-chip and then another page mode burst from on-chip to the off-chip destination. This requires the use of an on-chip buffer. Each processor has a 128-byte area in its corresponding parameter memory reserved for this purpose as illustrated in FIG. 15. As shown in FIG. 15, off-chip to off-chip packet transfers requested by master processor 60 employ addresses Hex "01010100" to Hex "0101017F". Off-chip to off-chip packet transfers requested by one of digital image/ graphics processors 71, 72, 73 or 74 employ addresses Hex "0100#100" to Hex "0100#17F", where # corresponds to the digital image/graphics processor number as listed in Table 3. The transfer of data into and out of this parameter memory buffer is handled by transfer controller 80 hardware and is transparent to the user.

The combination of packet transfer parameters can allow the specification of very large transfers which would take a very long time to complete. It is also possible that higher priority packet transfer requests could continually interrupt a packet transfer preventing it from ever getting much past the load of its parameters. In order to help prevent either of these situations from occurring, transfer controller 80 includes a timer including two 24 bit registers packet transfer minimum register PTMIN 511 and packet transfer maximum register PTMAX 512, illustrated in FIG. 31. These registers specify the minimum and maximum length of a packet transfer. Packet transfer counter PTCOUNT 513 indicates the number of clock cycles that a packet transfer has been executing.

The packet transfer minimum register PTMIN 511 is used to indicate the minimum number of clock cycles for which a packet transfer must execute before it can be interrupted by a higher priority packet transfer request. When a packet transfer begins after the parameters have been loaded, timer sequencer 515 loads the value stored in packet transfer minimum register PTMIN 511 into packet transfer counter PTCOUNT 513. Packet transfer counter PTCOUNT 513 decrements by one for each clock cycle that the packet transfer is being actively serviced by transfer controller 80. Packet transfer counter PTCOUNT 513 does not decrement during cache-service, frame controller 90, host, or refresh cycles that may occur during the course of the packet transfer, but it does decrement during retries or wait states that occur during active packet transfer service. It will, however, decrement during frame controller 90, host, or refresh activity on the external bus if crossbar packet transfer accesses are still occurring. The packet transfer cannot be interrupted by a higher priority packet transfer request until zero detector 514 signals timer sequencer 515 that PTCOUNT has reached zero. It can, however, be suspended by the requesting processor. It may also be suspended by an error or fault condition. The packet transfer minimum register PTMIN 511 is loaded with Hex "10000" (65,536 cycles) at reset.

One important use of packet transfer minimum register PTMIN 511 is to create an "unstoppable" packet transfer for transferring the parameters of an already suspended packet transfer to another memory area. Since another suspension would overwrite the parameter memory area from which data is being transferred, packet transfer minimum register PTMIN 511 is used to ensure that the packet transfer can be completed. It is important that such a transfer not fault since this would also cause the parameter memory area to be overwritten. This feature prevents higher priority memory accesses from aborting the packet transfer before a minimum amount of time, and consequently a minimum number of data transfers, take place.

The packet transfer maximum register PTMAX 512 is used to prevent one packet transfer from monopolizing the transfer of data. Once the PTMIN time has elapsed and packet transfer counter PTCOUNT 513 has decremented to zero as detected by zero detector 514, timer sequencer 515 loads the values stored in packet transfer maximum register PTMAX 512 into packet transfer counter PTCOUNT 513. This defines the remaining period of time that the transfer can proceed before it is timed out. Thus the maximum duration for an uninterrupted packet transfer is PTMIN+PTMAX clock cycles. Packet transfer counter PTCOUNT 513 is decremented for every cycle that the packet transfer continues to be active excluding non-packet transfer cycles such as refresh. If zero detector 514 detects that the value in packet transfer counter PTCOUNT 513 reaches zero before the packet transfer completes, the packet transfer is considered to have timed out. Timer sequencer 515 suspends the packet transfer and transfer controller 80 moves on to the next request of the same priority in the round robin. If no other requests of the same priority are pending, the packet transfer can continue with a PTCOUNT of zero until such a same priority request or a higher priority request occurs, or until the transfer completes. Note that if a higher priority packet transfer request is received after the number of cycles specified in the packet transfer minimum register PTMIN 511 have elapsed, the active packet transfer will be suspended regardless of whether or not PTMAX has been reached. The packet transfer maximum register PTMAX 512 is loaded with Hex "10000" (65,536 cycles) at reset.

The PTMIN and PTMAX values are applied whenever a packet transfer is loaded. Thus they apply to each packet transfer within a linked-list. If a packet transfer gets suspended, the entire linked-list is suspended. The round robin token advances to the next processor with a pending request not to the next packet transfer within the linked-list. When a packet transfer times out, the state of the suspended transfer is saved to the parameter memory of the requesting processor. Transfer controller 80 will automatically resubmit this request for continuation when the round robin priority is returned to that processor. Whenever a suspended packet transfer resumes, the full PTMIN and PTMAX values will be in effect.

In the preferred embodiment of packet transfer minimum register PTMIN 511 and packet transfer maximum register PTMAX 512 include only 24 bits. Thus maximum time that a packet transfer service can continue without time-out is approximately 0.67 seconds at the target operating frequency of 50 MHz.

Packet transfer linked-lists are managed by transfer controller 80 as follows. If a refresh, frame controller 90, host interface, or cache service request is received during a packet transfer other than urgent priority, the state of the packet transfer parameters is retained in internal registers of transfer controller 80 and, if required, the source and/or destination transfer will be stalled. When the higher priority requests have been serviced, the packet transfer is resumed.

If a packet transfer is interrupted by a higher priority packet transfer request, a time-out, a suspend request from the requesting processor, a fault, or an error, then the packet transfer is suspended. The linked-list start address in the parameter memory of the requesting processor is changed to point to the saved packet transfer parameters. If this interruption was by a higher priority packet transfer, then the round robin token stays with the interrupted packet transfer so that its service is resumed when the lower priority level is resumed. If the higher priority request occurs while the packet transfer parameters are being loaded, the loading will be halted. No suspension occurs. The packet transfer parameters will be loaded from the original parameter list when the higher priority packet transfer completes. If a packet transfer is suspended because of time-out, fault, error, or a suspension request, then the round robin token is advanced placing the interrupted packet transfer at the end of the prioritization chain.

When a packet transfer completes and the interrupt bit of the packet transfer options field is "1", then transfer controller 80 issues an "end of packet" interrupt to the requesting processor. When the last packet transfer having the stop bit of the packet transfer options field of "1" in a linked-list completes, transfer controller 80 issues an "end of packet" interrupt to the requesting processor. When a packet transfer completes, the next-address field from the packet transfer parameters is written to the linked-list start address location in the parameter memory of the requesting processor even if the packet transfer options field stop bit of that packet transfer is set.

When the packet transfer parameters are loaded, transfer controller 80 checks the packet transfer status bits of the packet transfer options field. If these bits indicate that the packet transfer was suspended, then the additional state information of the suspended transfer is loaded. These will be further described below.

If a packet transfer experiences an error condition, transfer controller 80 immediately stops transferring data and perform a suspension. Transfer controller 80 sets the PTERROR flag of the requesting processor. Transfer controller 80 also sets the Q bit of the COMM register 120 of the requesting processor to indicate that the linked-list terminated. The requesting processor may be programmed to determine the cause of the error from the saved parameters.

Any of a number of conditions will cause an error during packet transfer. An attempted VRAM access mode such as a block write destination transfer or a serial register transfer with a source or destination within on-chip memory will cause an error. An attempted on-chip destination access using transparency will cause an error. An error will occur when the length in total number of bytes of a packet transfer request's destination transfer is larger than the length of its source transfer except in the case of a fill-with-value, shift register transfer or peripheral device transfer. An error will occur upon attempt of a look-up table destination operation. This may result from an "exchange source and destination parameters" operation. An error will occur when the linked-list start address or next entry of the linked-list points to an address off-chip. An error will occur when the packet transfer parameter table and the linked-list start address is not aligned to a 64-byte boundary. An error occurs upon an attempted packer request when source or destination guide table pointer points to off-chip memory or is not properly aligned. No status bits are saved to indicate the actual error condition, this must be deduced from the state of the suspend parameters.

An error caused by a linked-list start address or next entry of the linked-list address off-chip, a misaligned packet transfer parameter table or a guide table pointer to off-chip memory or misaligned will not save the packet transfer parameters to the suspend area of the parameter memory of the requesting processor. This is because the packet transfer aborts before transferring any data and never actually begins. When attempting to diagnose the cause of an error, therefore, the validity of the linked-list address should be checked to ensure that the suspended parameters are valid.

Transfer controller 80 will suspend a packet transfer under a number of conditions. Upon receipt of a higher priority packet transfer request transfer controller 80 will suspend a packet transfer if the number of cycles specified in PTMIN for the current packet transfer has expired. Transfer controller 80 will suspend a packet transfer if the number of cycles exceeds PTMIN+PTMAX and times-out and a packet transfer request of equal priority from another processor is pending. Transfer controller 80 will suspend a packet transfer if the requesting processor call for it to be suspended via the S bit of its COMM register 120. Transfer controller 80 will suspend a packet transfer if a memory fault occurs during source addressing or during destination addressing. Transfer controller 80 will suspend a packet transfer if an error condition is detected. Transfer controller 80 will suspend a packet transfer if a retry occurs during an external memory access, a packet transfer request of equal priority from another processor is waiting and the number of cycles specified in PTMIN for the current packet transfer has expired.

The suspension mechanism in each of these cases is identical. Transfer controller 80 saves of the current packet transfer parameters, and the internal state of transfer controller 80. This information allows the packet transfer to be continued at a future time. The parameters are saved to the suspension area of the parameter memory of the requesting processor. As illustrated in FIG. 15, this area is Hex "01010000" to Hex "0101007F" if master processor 60 requested the packet transfer. The suspended packet parameters area for packet transfers requested by one of digital image/graphics processors 71, 72, 73 or 74 employ addresses Hex "0100#000" to Hex "0100#07F", where # corresponds to the digital image/graphics processor number as listed in Table 3. The format for these parameters is shown in FIGS. 32 and 33. Note that double-words marked by "%" in FIG. 32 are not adjusted for the current endian.

Suspension begins immediately after a suspend condition arises and any pending external memory column accesses have completed. The external-to-external buffer on the parameter memory of the requesting processor is not emptied, but the current state of packet transfer FIFO buffer 311 is saved. This scheme allows packet transfers to be suspended in a consistent manner, regardless of the cause. It is also guaranteed to be rapid, since no emptying of packet transfer FIFO buffer 311 occurs. Thus an urgent priority packet transfer request can be rapidly serviced, without waiting for a potentially sluggish packet transfer to empty packet transfer FIFO buffer 311.

Suspension into the parameter memory is performed at transfer controller 80 crossbar priority level of the higher priority pending request, if that was the cause of the suspension. The digital image/graphics processors 71, 72, 73 or 74, or master processor 60 may therefore experience temporary contention until the suspension has been completed. When suspension is due to a time-out, a fault, an error, or a suspend request from the requesting processor, it will be performed at the original transfer controller 80 crossbar priority of the packet transfer.

The suspended packet transfer parameters may be copied elsewhere and resubmitted from their new location, provided that the linked-list start address pointer is modified to point to the new address. Since the packet transfer status bits of the packet transfer options field indicate that the packet transfer was suspended, the entire set of suspended parameters will be loaded upon resubmission no matter where they are located. The new starting address of the suspended parameters must be aligned on a even 128 byte boundary and thus the 7 least significant address bits must be "0000000" for the suspended packet transfer to be resubmitted.

The first eight 64 bit double-words saved to the packet transfer suspend area represent the "normal" packet transfer parameters. These are the same parameters as programmed by the user with a few exceptions. The first 32 bit word contains the original entry address of the packet transfer that was suspended rather than the address of the next entry on the linked list. The C count fields will contain the current C counts for dimensioned transfers. For guided transfers the C count fields will contain the guide counts and the guide table pointer fields which contain the current value of the guide table pointer. In addition, the packet transfer options field has its packet transfer status field modified to reflect the fact that the parameters represent a suspended packet transfer.

In addition to the "normal", user programmed packet transfer parameters, the suspend area will also contain 8 reserved "internal state" double words. These are fields that are automatically loaded when a suspended packet transfer is restarted. They contain information about the intradimensional state of the packet transfer when suspended. These values are saved so that the suspended packet transfer may begin exactly where it left off when it is resubmitted. The data word at the address ending in Hex "040" stores the current source A and B counts. These are 16 bit quantities from the ACURRENT and BCURRENT registers of the source machine 320. The B count is stored in bits 31–16 and the A count is in bits 15–0. The data word at the address ending in Hex "044" stores the current destination A and B counts. These are 16 bit quantities from the ACURRENT and BCURRENT registers of the destination machine 340. The B count is stored in bits 31–16 and the A count is in bits 15–0. The data word at the address ending in Hex "048" is the current source A start address or the current guide table address. A corresponding P bit in the suspended packet service parameters indicates which data is stored here. Note that guided table fetches do not occur until the original B counts reach zero, thus even guided packet transfers may store the source A start address here. The data word at the address ending in Hex "04C" is the current destination A start address or the current guide table fetched values, the identity determined by the corresponding P bit of the suspended packet service parameters. The data words at addresses ending in Hex "050" and "056" are the current destination B start addresses, respectively, or the corresponding guide table fetched values.

The 64 bit double-word starting at the address ending in Hex "058" stores the suspended packet service parameters.

The format of suspended packet service parameters is illustrated in FIGS. 32 and 33. Bits 31-30 of the upper data word are the P bits. A "1" in bit 31 indicates that suspended packet transfer parameters store ASTART register and BSTART register values of source machine 320 fetched from a guide table. Otherwise, these registers store values from dimensioned transfers. Likewise, a "1" in bit 30 indicates that the suspended packet transfer parameters store ASTART register and BSTART register values of source machine 320 fetched from a guide table, a "0" indicates these value are from dimensioned transfers. Note that these bits only have meaning if the packet transfer options field indicates that the suspended packet transfer included guided source or destination addressing. Otherwise, the data is assumed to be from dimensioned transfers.

The E bit (bit 29 of the upper data word) indicates whether the suspended packet transfer is an off-chip to off-chip packet transfer. Such off-chip to off-chip packet transfers employ a buffer within the parameter memory of the requesting processor. If this E bit is "1", then the suspended packet transfer was an off-chip to off-chip packet transfer. If this E bit is "0", the suspended packet transfer was one of the three other types and the parameter memory of the requesting processor does not store any external-to-external buffered data.

The S bit (bit 28 of the upper data word) indicates whether the parameter memory external-to-external buffer was being accessed by the source machine 320 or the destination machine 340. This S bit is meaningful only if the E bit is "1" indicating storage of external-to-external buffered data in the parameter memory of the requesting processor. If the S bit is "1", then the source machine 320 was accessing the external-to-external buffer when the packet transfer was suspended. If the S bit is "0", then the destination controller was accessing the external-to-external buffer.

Bits 20-16 of the upper data word store the BUFPTR register 414 value. The BUFPTR register 414 is the pointer into the parameter memory external-to-external buffer. Storing this pointer permits resumption of external-to-external packet transfers by recovering the status of the parameter memory external-to-external buffer. Of course this field only has meaning if the suspended packet transfer was an external-to-external packet transfer.

Bits 14-8 of the upper data word store the BUFCOUNT register 441. The BUFCOUNT register 441 value is interpreted based upon the status of the S bit. If the S bit is "1" indicating suspending source accessing of the parameter memory external-to-external buffer, then BUFCOUNT register 441 indicates the number of bytes left in the buffer. If the S bit is "0" indicating suspended destination accessing of the parameter memory external-to-external buffer, then BUFCOUNT register 441 indicates the number of bytes stored in the buffer. This field is meaningful only for suspended external-to-external packet transfers.

Bits 3-0 of the upper data word is the FCOUNT. This is the number of bytes of data currently held in packet transfer FIFO buffer 311.

The lower data word of the suspended packet service parameters holds two FIFO pointers. Bits 11-8 of the lower data word stores FDPTR the destination pointer. Bits 3-0 of the lower data word stores FSPTR the source pointer. These pointers permit resumption of the suspended packet transfer at the point of suspension.

The four data words starting at the address ending in Hex "060" store the contents of packet transfer FIFO buffer 311. By storing this data rather than requiring emptying of packet transfer FIFO buffer 311, the higher priority packet transfer may start earlier. Note that the four data words starting at the address ending in Hex "070" are reserved to support storing the contents of a larger packet transfer FIFO buffer 311 should such a larger buffer be employed in the future.

Transfer controller 80 supports a number of non-standard packet transfer access modes. These are include block-writes, serial register transfers, transparency and peripheral device transfers. These non-standard packet transfer access modes are enabled via the packet transfer options field of the packet transfer parameters.

When the packet access mode of the packet transfer parameters equals "010", it enables a block-write packet access mode. Transfer controller 80 supports three different block-write mechanisms: "8×", "4×", and "simulated". The system hardware determines the block-write mechanism at the time that the block-write begins. This allows software to use block-write without regard to what type of block-write the system uses or whether or not the addressed memory supports it. However, each of the block-write modes is only supported for a 64 bit bus size and 8 bit values (a 1 to 8 expand). Destination start addresses for block-writes must be off-chip and 64 bit aligned, that is the 6 least significant address bits must be "000000".

The block-write mode used by transfer controller 80 is selected by the value input on the BS[1:0] pins of multi-processor integrated circuit 100 by external circuitry. In the preferred embodiment block-write is supported only for a 64 bit data bus, thus these bus size inputs are used as block-write selects during block-write and load color register cycles. Table 23 shows the block-write modes selected by BS[1:0].

TABLE 23

| BS[1:0] | | Block-Write Mode |
|---|---|---|
| 0 | 0 | Simulated |
| 0 | 1 | Reserved |
| 1 | 0 | 4× |
| 1 | 1 | 8× |

Because of various VRAM sizes and architectures, a number of different block-write methods exist. The following notation is used to express the various block-write methods: C×L×R; where C is the number of column locations per color register, L is the length of the color registers in bits, and R in the number of color registers. For example, most 1 Mbit VRAMs have a 256 Kbit×4 bit data array and support a 4×4×1 block-write. They have one 4 bit color register and each block-write cycle controls the writing of the color register to 4 adjacent column locations on each of the 4 memory array planes.

The 8× block-write mode is intended to be used with VRAMs that can write 8 column locations per access (i.e. 8×8×1 or 8×8×2 at 8 bits per location. Each bit of source data is output to one bit on the data bus D[63:0] and enables or disables writing of the 8 bit VRAM color register to one of the 64 columns accessed by the cycle. Each column represents a column location on each of the 8 memory array planes within each VRAM. Thus up to 64 bytes of color register data may be written in a single access.

Video RAMs that support 8× block-writes ignore the three least significant column addresses during block-write cycles. Thus since the data bus is 64 bits (8 bytes) wide, block-write cycles always begin on 64 byte boundaries. For destination addresses that are not 64-byte aligned, transfer controller 80 aligns the source bits and provides the "missing zeros" for the locations within the 64-byte access that are not being written to. Transfer controller 80 then remaps the bits so that they address the proper column locations within each of the VRAMs on the data bus.

FIG. 34 shows a data remapping process for an 8× block-write in little endian mode. The first eight source bits control the first eight bytes of the destination. These bytes are actually the least significant column location in each of the eight 8-plane VRAM arrays being accessed. Since the least significant byte is controlled by the D0 inputs (D0 and D8 inputs for 16 bit VRAMs) of the VRAM during block-writes, source bits 0–7 get mapped to bits 0, 8, 16, 24, 32, 40, 48, and 56 of the data bus, respectively, which represent the D0 inputs (and D8 inputs for 16 bit devices) of the accessed VRAMs. The rest of the source bits are mapped in a similar manner. Transfer controller 80 makes a similar mapping for big endian 8× block-writes. Note that in big endian mode, the least significant bit of the source image is the left most bit and the most significant bit is the right most bit. Since the mapping mechanism is the same as used for little endian, source bits 0–7 are mapped to bits 63, 55, 47, 39, 31, 23, 15, and 7 respectively. These bits represent the least significant column locations being accessed in the VRAM arrays. Since these bytes are controlled by the D0 inputs (D0 and D8 inputs for 16 bit devices) of the VRAMs, the data bus must be connected to the VRAMs in reverse order for block-writes to work correctly.

Connecting the data bus in reverse order does not affect normal reads and writes since the data will be both written and read in reverse order. The user should recognize that the bits shifted out of or into the serial port of the VRAMs will also be in reverse order. This may require reversal of the serial data bus order when connecting to an output or input device, to assure proper operation.

The 4× block-write mode is designed for use with VRAMs that can write 4 column locations per access i.e. 4×4×1, 4×4×4, 4×8×1, 4×8×2 at either 4 or 8 bits per location. In the case of 4×4 block-writes, each bit of source data is output to two bits on the data bus D[63:0] and enables or disables the writing two of the 4 bit VRAM color registers to two of the 64 columns accessed by the cycle. Each column represents a column location on 4 planes of the array. Since each color register is only 4 bits wide, it takes two registers to represent an 8 bit pixel. Thus each source bit must control the two color registers which write to adjacent nibbles in order for an 8 bit write to occur. This allows up to 32 bytes of color register data to be written in a single access.

Video RAMs that support 4× block-writes ignore the two least significant column addresses during block-write cycles. Thus block-writes always begin on 32-byte boundaries. As with 8× block-writes, transfer controller 80 aligns the source data to the specified by the destination start address double-word within the 32-byte block and fills in the "missing zeros" for double-words that are not being written.

FIG. 35 shows a data remapping process for a 4× block-write in little endian mode. The first eight source bits control the first eight bytes of the destination. However, since in 4×4 block-writes each data input causes only four bits to be written, each source bit must be mapped to two data bus pins to cause a full byte to be written. Thus source bits 0–7 are mapped to bits 0 and 4, 8 and 12, 16 and 20, 24 and 28, 32 and 36, 40 and 44, 48 and 52, and 56 and 60, respectively.

In the case of 4×8×1 or 4×8×2 block-writes, the VRAM color registers are 8 bits wide. However, only four of the VRAM's 8 data inputs are used to select the bytes to be written. Thus half of the data bus is unused and only 32 bytes may be written in a single access. Note, however, that the data actually output on D[63:0] is identical; the VRAMs simply ignore every other nibble. In big endian mode, the source bits 0–7 are mapped to bits 63 and 59, 55 and 51, 47 and 43, 39 and 35, 31 and 27, 23 and 19, 15 and 11, and 7 and 3 of the external data bus respectively. As with 8× big endian block-write, the data bus must be connected to the VRAMs in reverse order to assure correct operation.

For memory devices which don't support block-write transfer controller 80 provides a simulated block-write mode. In this mode, the 64 bit color register value contained in the packet transfer parameters is output on the data bus and each source data bit functions as a byte select by controlling the $\overline{CAS}$ column address strobe pins to enable or disable one of the 8 bytes addressed during the cycle. Thus, block-writes are in essence converted to fill-with-value type transfers where the color register value becomes the fill value. The destination accesses then become normal, page-mode, 64 bit write cycles where writes to some bytes are disabled as specified by the source data.

Before 4× and 8× block-write cycles can be performed, the VRAMs' color registers must be loaded with the correct values. Transfer controller 80 does this by performing a load color register LCR cycle using the color register value contained in the packet transfer parameters. Since a block-write packet transfer can be interrupted by higher priority requests, such as a host access or another block-write packet transfer that may change the VRAM color registers, an load color register cycle must also be performed whenever a block-write packet transfer resumes. Thus a load color register cycle occurs whenever: a 4× or 8× block-write packet transfer begins; a block-write packet transfer resumes from suspension; or a block-write packet transfer continues after the host has used and returned the image system bus. A load color register cycle will not be performed if the memory being accessed requires simulated block-writes.

Once the color latches have been loaded, another load color register cycle will not be performed unless one of the above conditions occurs. If, for example, the block-write begins in 8× mode, and then alternates between simulated and 8× modes, the load color register will not be repeated each time the 8× mode is entered.

The sequence of events for block-write packet transfers is as follows. Transfer controller 80 outputs the load color register status code and address of the first block write to be performed. Next transfer controller 80 reads the value input on the BS[1:0] pins. If BS[1:0] equals "10" or "11", then the load color register cycle is completed using the 64 bit color register value contained in the packet transfer parameters. Following this 4× or 8× block-write cycles are generated to complete the packet transfer. On the other hand, if BS[1:0] equals "00", then the load color register cycle becomes a normal, page-mode write using the 64 bit color register value contained in the packet transfer parameters as data and the source data bits as byte selects. If a new row access is begun because of a page change or interruption from a higher priority cycle, then the step of outputting the load color register status code and the address of the next block write to be performed is repeated for the next destination address.

Once a load color register cycle has been performed, the sequence continues as follows. Transfer controller 80 outputs the block-write status code and the address of the next block-write to be performed. If BS[1:0]="10" or "11", then the block-write page-mode cycle is completed using the source data bits. If a new row access is begun, then the step of outputting the block-write status code and the address of the next block-write to be preformed is repeated. If, on the other hand, BS[1:0] equals "00", then the block-write cycle becomes a normal page-mode write using the 64 bit color register value contained in the packet transfer as data and the source data bits as byte selects. Again, if a new row access is begun, then the step of outputting the block-write status code and the address of the next block-write to be preformed is repeated for the next destination address.

Transfer controller 80 will always attempt to perform "real" 4× or 8× block writes. Thus the normal write cycles that occur during simulated block-write mode will always have either the load color register or block-write status codes.

If the packet access mode in the packet transfer options field is "011" selecting a serial register transfer mode, then the data transfer mode of transfer controller 80 is disabled. Transfer controller 80 will only output addresses and $\overline{CAS}$. It will also drive the $\overline{TRG}$, $\overline{W}$ and DSF[1:0] pins at row time to select either "read transfer" or "write transfer" VRAM modes. When performing either of these operations the D[63:0] pins will output the mask value of Hex "FFFFFFFFFFFFFFFF" at row time, to disable VRAM transfer masks.

The source parameters are used to generate addresses to perform read transfers, which are memory to register transfers, and the destination parameters are used to perform write transfers, which are register to memory transfers. Each access performed by both source and destination is a single row access. Since no data is transferred through transfer controller 80 all the source accesses will be performed before the destination accesses. Each source access will cause a VRAM row to be transferred into the VRAM shift register. In practice, the source parameters will usually be setup with an aligned address, an A count of 1, a B count of 0 and a C count of 0. Thus only one transfer is performed. Since all $\overline{CAS}$ lines are active for read transfers, setting the A count equal to or less than the source bus size will result in a single transfer. Thus a source A Count of 1 is ideal for most situations.

Each destination access causes the VRAM shift register to be transferred into a VRAM memory array row. Normally, each destination access is an aligned transfer to the next sequential row address. This is achieved by setting up the destination parameters with an aligned start address, an A count of 1, a B count of (number of rows)−1, and a B pitch equal to the VRAM row address pitch. Again, all $\overline{CAS}$ lines are activated during the write transfers so setting A count less than or equal to the destination bus size will result in a single transfer per line. Thus a destination A count of 1 is ideal for most situations.

Since a shift register transfer packet transfer may be interrupted by a higher priority request that might change the VRAM shift register contents, it is necessary to perform the read transfer cycle whenever the VRAM shift register may have been corrupted. Thus a shift register transfer packet transfer source operation, the read transfer, will be performed whenever: a shift register transfer packet transfer begins; a shift register transfer packet transfer resumes after being suspended; and a shift register transfer packet transfer continues after the host has used and returned image system bus.

Figure 36:
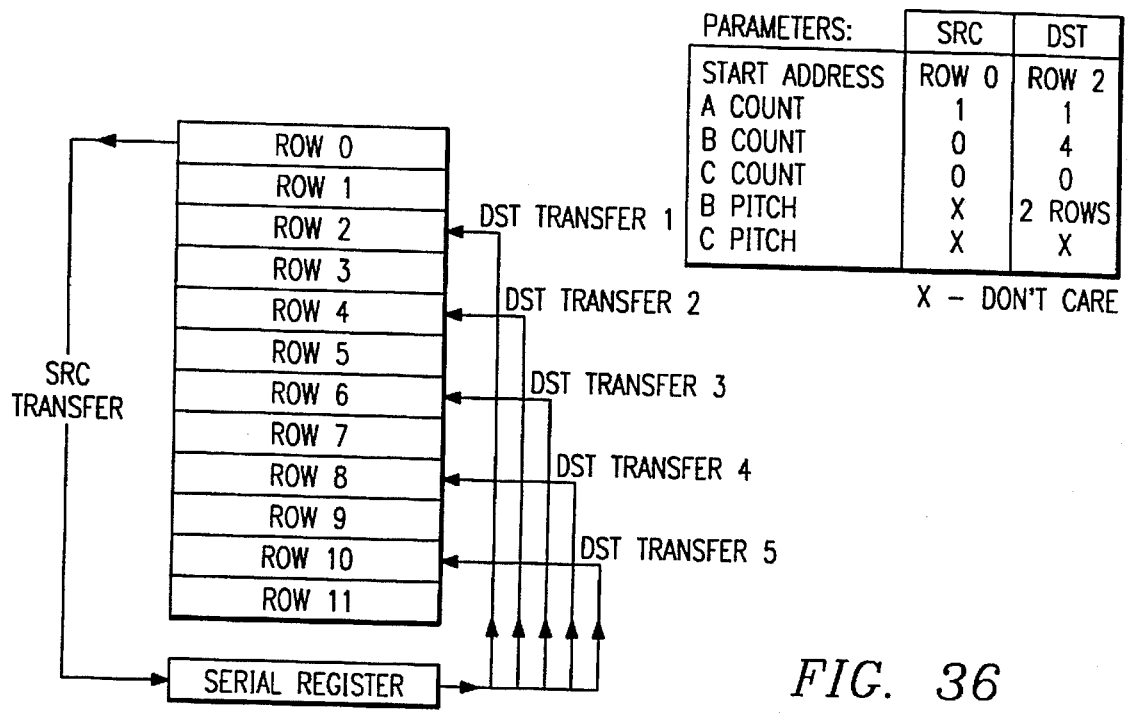
FIG. 36 illustrates a serial register transfer method example.

A simple example of an serial register transfer packet transfer is shown in FIG. 36. Row 0 is assumed to have been set to a desired pattern. The packet transfer then copies this pattern to rows 2, 4, 6, 8 and 10 to produce a striped effect.

The transparency modes are enabled by setting the packet transfer access mode bits in the packet transfer options field to "1XX". Specifying one of the transparency options enables a "transparency on source" operation. The source data is compared to the 64 bit transparency value specified in the packet transfer parameters. Transparency can be specified as an 8, 16, 32, or 64 bit data size. Thus one 64 bit, two 32 bit, four 16 bit, or eight 8 bit comparisons are made. If any of the comparisons are true, transparency and byte write circuit 353 (illustrated in FIG. 38) will disable the corresponding byte-strobes to prevent the destination bytes from being written. Transparency is supported for off-chip destinations only. Specifying transparency for an on-chip destination will cause the packet transfer to suspend with an error condition.

Transparency detection is applied by transparency and byte write circuit 353 (illustrated in FIG. 38) after the source data has been aligned to the destination and external bus size. All 8 bytes of data are then compared with the corresponding 8 bytes of the transparency value even if the bus size is less than 64 bits. The 8 comparisons are grouped according to the transparency data size. If all the compared bytes within a group match, then the byte strobes $\overline{CAS}$ signals associated with that group are disabled, preventing writes to any of the bytes within that group.

Figure 37A:
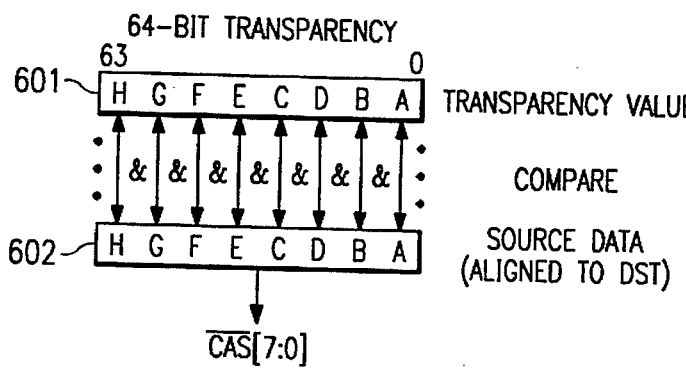
FIGS. 37a to 37d illustrate a transparency operation.
Figure 37B:
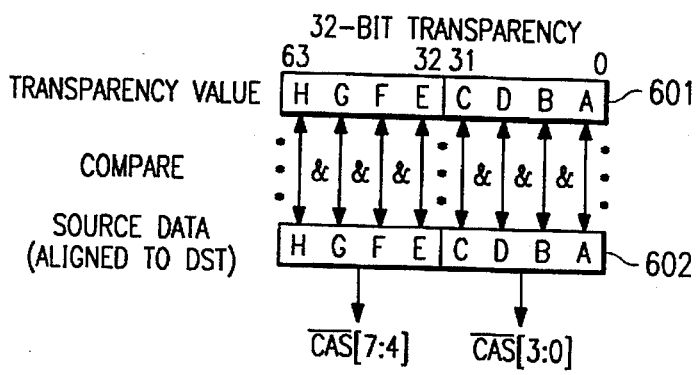
Figure 37C:
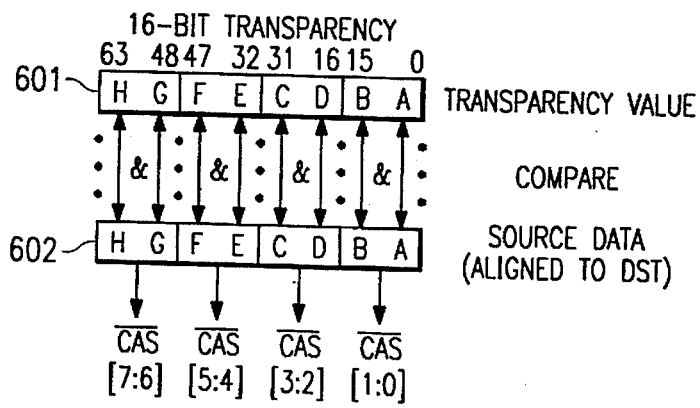
Figure 37D:
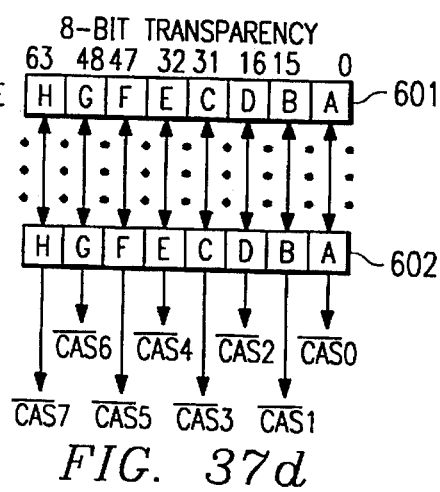

FIGS. 37a, 37b, 37c and 37d shows how comparisons are made for 64 bit, 32 bit, 16 bit, and 8 bit transparency data sizes, respectively. The "&" symbols show which byte comparisons are ANDed together to form a group. As FIG. 37a shows, a 64 bit transparency size causes one 64 bit comparison to be made. If the source data and the transparency value are equal, all the $\overline{CAS}$ strobes will be disabled. Otherwise all 8 bytes will be written. FIG. 37b shows that in a 32 bit transparency size, two 32 bit comparisons are made controlling $\overline{CAS}$[7:4] and $\overline{CAS}$[3:0], respectively. FIG. 37c shows that in a 16 bit transparency size, four 16 bit comparisons are made controlling $\overline{CAS}$[7:6], $\overline{CAS}$[5:4], $\overline{CAS}$[3:2] and $\overline{CAS}$[1:0], respectively. FIG. 37d shows that in an 8 bit transparency size, eight 8 bit comparisons are made separately controlling $\overline{CAS}$[7], $\overline{CAS}$[6], $\overline{CAS}$[5], $\overline{CAS}$[4], $\overline{CAS}$[3], $\overline{CAS}$[2], $\overline{CAS}$[3:2] and $\overline{CAS}$[1:0], respectively. Note that the $\overline{CAS}$[7:0] strobes are always identified with the same bits on the data bus regardless of the endian of operation. Thus FIG. 37 applies to both big and little endian formats.

Transparency comparisons take place after alignment to the external bus. Thus if the external bus size is 32 bits, data will always be compared to bits 31–0 (bits 63–32 in big-endian) of the transparency value even if 64 bit transparency mode is selected. The transparency mechanism is designed to work with a current bus size that can be divided into an integral number of comparison groups. Thus the bus size should always be equal to or larger than the transparency size.

Figure 38:
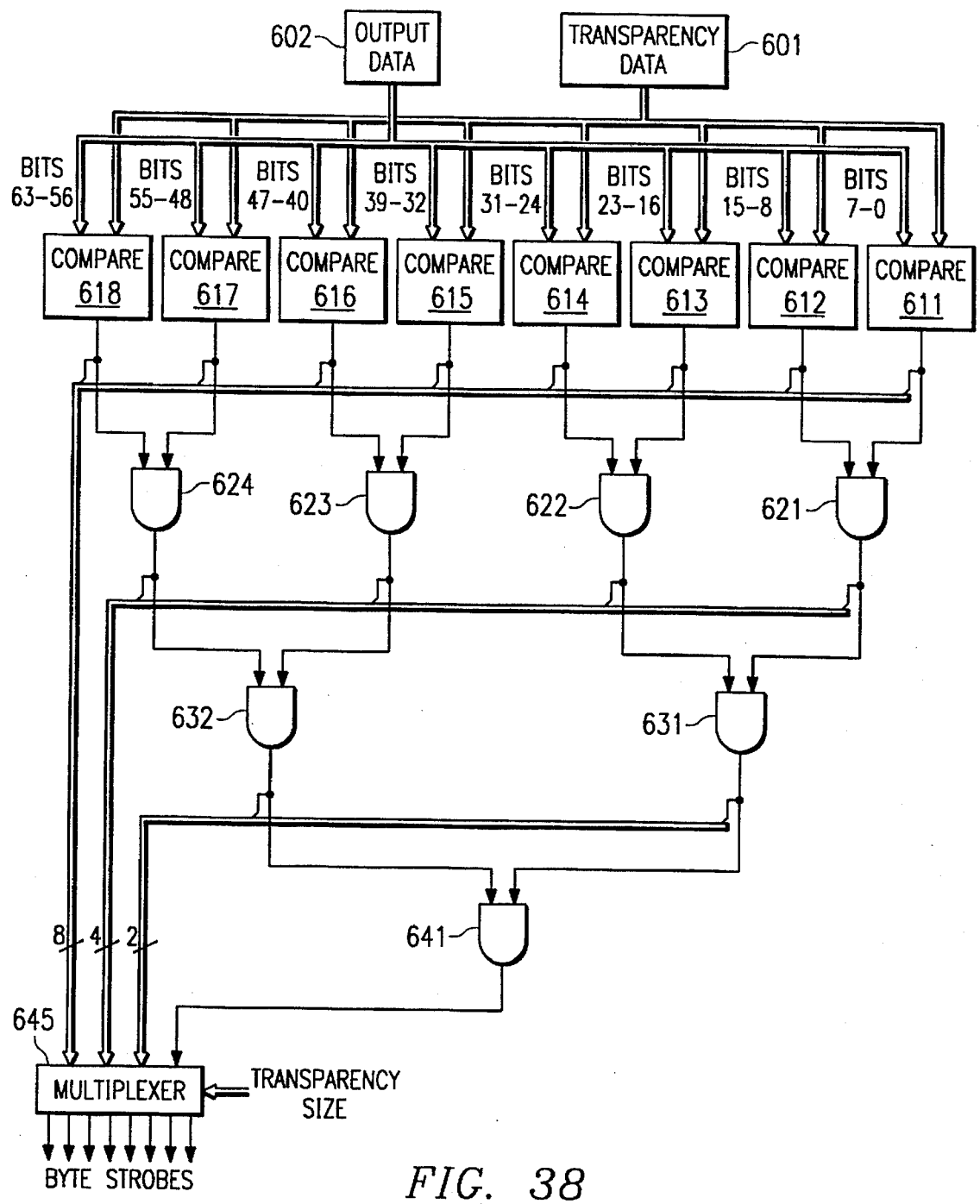
FIG. 38 illustrates a transparency and byte write logic circuit embodiment.

FIG. 38 illustrates the structure of transparency and byte write logic 353, which is a part of destination multiplexer and alignment logic 350. Transparency register 601 stores the 64 bit transparency value from the packet transfer parameters. A series of 8 bit comparators 611, 612, 613, 614, 615, 616, 617 and 618 compare individual bits of bytes of the transparency value stored in transparency register 601 with the corresponding bits of the bytes of the aligned destination data from destination multiplexer 351. Each comparator 611, 612, 613, 614, 615, 616, 617 and 618 generates a byte equal signal indicating whether the corresponding bits are the same. A set of half word AND gates 621, 622, 623 and 624 form corresponding half word equal signals for bytes 0 and 1, bytes 2 and 3, bytes 4 and 5 and bytes 6 and 7, respectively. Two word AND gates 631 and 632 are connected to the half word AND gates 621, 622, 623 and 624 and form corresponding word equal signals for bytes 0 to 3, and bytes 4 to 7, respectively. Lastly, double word AND gate 641 is connected to word AND gates 631 and 632 and forms a double word equal signal for all 64 bits.

Multiplexer 645 receives the eight byte equal signals, the four half word equal signals, the two word equal signals and the double word equal signal. Multiplexer 645 also receives an indication of the selected transparency size according to bits 17–16 of the packet transfer access mode field of the packet transfer options field. These bits are encoded as shown in Table 19. Multiplexer 645 output byte write strobe signals actually the $\overline{CAS}$ signals based upon the respective inputs and the transparency size. If a transparency size of 8 bits is selected, then the byte equal signals control respective byte write strobes. An indication of equality of the transparency color value and corresponding data byte inhibits the byte write strobe. Thus the data is not written into the memory. On selection of a transparency size of 16 bits, each half word equal signal controls two corresponding byte write strobes, thus each half word equal signal controls two byte write strobes. On selection of a transparency size of 32 bits, each word equal signal controls four corresponding byte write strobes. Upon selection of a 64 bit transparency size, all eight byte write strobes are controlled by the double word equal signal. Thus based upon the selected transparency size, equality of a portion of data equal to the transparency size with the transparency color value aborts writing that data into the destination. This function is very useful in many graphics applications.

Peripheral device transfers are performed when peripheral device mode is selected when packet access mode of the packet transfer options field equals "001". This mode is designed to allow a peripheral device to make use of the memory controller of transfer controller 80 to read or write to memory external to multiprocessor integrated circuit 100. When a peripheral device transfer occurs, transfer controller 80 drives memory address and control lines normally but does not read in or drive out data. This allows a peripheral device such as a host system 1 connected to image system bus to write or read data. The read or write direction of the peripheral transfer is determined by the way in which the packet transfer parameters are programmed.

Peripheral read transfers, which read from memory into the peripheral, are generated by programming the source parameters of the packet transfer to access the memory data needed by the peripheral. The source access mode can be either dimensioned or guided but not fill-with-value. The destination transfer should be disabled by setting the destination transfer mode to "000" field and setting the destination A count to 0.

Peripheral write transfers, which write from peripheral into memory, are generated by programming the destination parameters to access the memory area to which the peripheral needs to write. The destination access mode can be either dimensioned or guided. The source transfer should be disabled by setting the source transfer mode to "000" and the source A count to 0. A packet transfer error will not occur in this case even though the destination number of bytes exceeds the source number of bytes.

A peripheral device packet transfer request can be submitted by any processor at any priority and will be serviced using the normal prioritization scheme. Normal operation, however, would be to have the peripheral initiate the transfer when it desires to read or write data. This can be achieved through use of the external interrupts. When a peripheral device requires servicing, it can interrupt master processor 60 via one of the multiprocessor integrated circuit 100 external interrupt inputs. Master processor 60 can then submit the peripheral device packet transfer as part of the interrupt service routine. Note that if interrupts are disabled within the service routine, the transfer can be prioritized above digital image/graphics processors 71, 72, 73 and 74 cache requests by submitting it with an 'urgent' priority.

Once a peripheral has interrupted master processor 60, it must wait until transfer controller 80 begins the packet transfer before it can read or write data. The beginning of the peripheral device transfer is signaled by a special cycle type code output on STATUS[4:0] at row time. The value "00100" is used for reads, and the value "00101" is used for writes. The start and end of a peripheral device transfer always invalidate LASTPAGE register 360, forcing a row access. The peripheral device must monitor the STATUS [4:0] pins to determine when to begin the data transfer. The type of memory cycles bus size, column timing, etc generated by transfer controller 80 will correspond to whatever is selected with the memory identification inputs bus size selection BS[1:0], column timing selection CT[1:0], etc at the beginning of the cycle. The peripheral device can then synchronize its data transfer to the subsequent column accesses using $\overline{CAS}$[7:0], CLKOUT, etc.

Because memory addressing is generated by the packet transfer parameters, the transferring peripheral must be ready to send or receive data in the order accessed by transfer controller 80. The peripheral must also be able to meet the transfer rate of transfer controller 80 or be able to insert wait states to slow the transfers.

Since the peripheral uses the image system bus for the transfer, it must not drive the bus until the peripheral transfer begins. This can be achieved by placing transceivers between the peripheral and multiprocessor integrated circuit 100 data busses and only enabling them during peripheral transfers. Multiprocessor integrated circuit 100 will place its data bus in high impedance during the transfers and will also drive $\overline{DBEN}$ inactive high to disable its external transceivers if present.

Transfer controller 80 can access data in either big endian or little endian formats. The endian mode selects the way in which bytes are addressed. In little endian, byte 0 is the right-most byte in a word and successive bytes are numbered leftwards. In big endian, byte 0 is the left-most byte in a word and successive bytes are numbered rightwards.

The 3 least significant bits of the address and the number of bytes to be transferred determine the positions of valid data bytes. Tables 24a and 24b show the byte positions for 64 bit bus transfers in little endian mode. In Tables 24a and 24b V's represent the valid byte positions and 0's the invalid bytes. Dashes indicate that the operation cannot be performed.

TABLE 24a

| 3 LSB Addr bits | | | Number of bytes | | | |
|---|---|---|---|---|---|---|
| | | | 1 byte | 2 bytes | 3 bytes | 4 bytes |
| 0 | 0 | 0 | 0000000V | 000000VV | 00000VVV | 0000VVVV |
| 0 | 0 | 1 | 000000V0 | 00000VV0 | 0000VVV0 | 000VVVV0 |
| 0 | 1 | 0 | 00000V00 | 0000VV00 | 000VVV00 | 00VVVV00 |
| 0 | 1 | 1 | 0000V000 | 000VV000 | 00VVV000 | 0VVVV000 |
| 1 | 0 | 0 | 000V0000 | 00VV0000 | 0VVV0000 | VVVV0000 |
| 1 | 0 | 1 | 00V00000 | 0VV00000 | VVV00000 | — |
| 1 | 1 | 0 | 0V000000 | VV000000 | — | — |
| 1 | 1 | 1 | V0000000 | — | — | — |

TABLE 24b

| 3 LSB Addr bits | Number of bytes | | | |
|---|---|---|---|---|
| | 5 bytes | 6 bytes | 7 bytes | 8 bytes |
| 0 0 0 | 000VVVVV | 00VVVVVV | 0VVVVVVV | VVVVVVVV |
| 0 0 1 | 00VVVVV0 | 0VVVVVV0 | VVVVVVV0 | — |
| 0 1 0 | 0VVVVV00 | VVVVVV00 | — | — |
| 0 1 1 | VVVVV000 | — | — | — |
| 1 0 0 | — | — | — | — |
| 1 0 1 | — | — | — | — |
| 1 1 0 | — | — | — | — |
| 1 1 1 | — | — | — | — |

Tables 25a and 25b show the byte positions for 64 bit bus transfers in big endian mode.

TABLE 25a

| 3 LSB Addr bits | Number of bytes | | | |
|---|---|---|---|---|
| | 1 byte | 2 bytes | 3 bytes | 4 bytes |
| 0 0 0 | V0000000 | VV000000 | VVV00000 | VVVV0000 |
| 0 0 1 | 0V000000 | 0VV00000 | 0VVV0000 | 0VVVV000 |
| 0 1 0 | 00V00000 | 00VV0000 | 00VVV000 | 00VVVV00 |
| 0 1 1 | 000V0000 | 000VV000 | 000VVV00 | 000VVVV0 |
| 1 0 0 | 0000V000 | 0000VV00 | 0000VVV0 | 0000VVVV |
| 1 0 1 | 00000V00 | 00000VV0 | 00000VVV | — |
| 1 1 0 | 000000V0 | 000000VV | — | — |
| 1 1 1 | 0000000V | — | — | — |

TABLE 25b

| 3 LSB Addr bits | Number of bytes | | | |
|---|---|---|---|---|
| | 5 bytes | 6 bytes | 7 bytes | 8 bytes |
| 0 0 0 | VVVVV000 | VVVVVV00 | VVVVVVV0 | VVVVVVVV |
| 0 0 1 | 0VVVVV00 | 0VVVVVV0 | 0VVVVVVV | — |
| 0 1 0 | 00VVVVV0 | 00VVVVVV | — | — |
| 0 1 1 | 000VVVVV | — | — | — |
| 1 0 0 | — | — | — | — |
| 1 0 1 | — | — | — | — |
| 1 1 0 | — | — | — | — |
| 1 1 1 | — | — | — | — |

When the external bus is limited to 32 bits, only the four least significant bytes of the bus are used for transferring data. This means that D[31:0] are used in little endian transfers and D[63:32] are used for big endian transfers. The byte positions based upon the 2 least significant bits of the address for little endian are shown in Table 26. The X's indicate bytes of the 64 bit bus that are ignored. Dashes again indicate transfers that cannot be performed.

TABLE 26

| 2 LSB Addr bits | Number of bytes | | | |
|---|---|---|---|---|
| | 1 byte | 2 bytes | 3 bytes | 4 bytes |
| 0 0 | XXXX000V | XXXX00VV | XXXX0VVV | XXXXVVVV |
| 0 1 | XXXX00V0 | XXXX0VV0 | XXXXVVV0 | — |
| 1 0 | XXXX0V00 | XXXXVV00 | — | — |
| 1 1 | XXXXV000 | — | — | — |

The byte positions based upon the 2 least significant bits of the address for big endian are shown in Table 27.

TABLE 27

| 2 LSB Addr bits | Number of bytes | | | |
|---|---|---|---|---|
| | 1 byte | 2 bytes | 3 bytes | 4 bytes |
| 0 0 | 000VXXXX | 00VVXXXX | 0VVVXXXX | VVVVXXXX |
| 0 1 | 00V0XXXX | 0VV0XXXX | VVV0XXXX | — |
| 1 0 | 0V00XXXX | VV00XXXX | — | — |
| 1 1 | V000XXXX | — | — | — |

When the external bus is limited to 16 bits, only the two least significant bytes D[15:0] for little endian or D[63:48] for big endian are used for transferring data. Table 28 shows the byte positions for the little endian mode based upon the least significant bit of the address.

TABLE 28

| LSB Addr bit | Number of bytes | |
|---|---|---|
| | 1 byte | 2 bytes |
| 0 | XXXXXX0V | XXXXXXVV |
| 1 | XXXXXXV0 | — |

Table 29 shows the byte positions for the little endian mode based upon the least significant bit of the address.

TABLE 29

| LSB Addr bit | Number of bytes | |
|---|---|---|
| | 1 byte | 2 bytes |
| 0 | V0XXXXXX | VVXXXXXX |
| 1 | 0VXXXXXX | — |

When the external bus is configured for 8 bits, only the least significant byte D[7:0] for little endian or D[63:56] for big endian is used for transferring data. Thus the byte positions are fixed for this bus size.

When transferring 32 bit external data on the internal crossbar bus, transfer controller 80 performs ordinary 64 bit accesses, using the "1 byte" "2 bytes" "3 bytes" and "4 bytes" byte positions from Tables 24a and 24b and Tables 25a and 25b. When transferring 16 bit external data on the internal crossbar bus, transfer controller 80 performs ordinary 64 bit accesses, using the "1 byte" and "2 bytes" byte positions from Tables 24a and 24b and Tables 25a and 25b.

The endian mode for multiprocessor integrated circuit 100 is selected at reset using the $\overline{\text{UTIME}}$ input. Multiprocessor integrated circuit 100 samples and latches the value of $\overline{\text{UTIME}}$ on the clock cycle before the rising edge on the $\overline{\text{RESET}}$ input. If $\overline{\text{UTIME}}$ was sampled low ("0") at the end of reset, multiprocessor integrated circuit 100 will operate in big endian mode until the next hardware reset occurs. If $\overline{\text{UTIME}}$ was sampled high ("1"), multiprocessor integrated circuit 100 will operate in little endian mode.

As discussed in above the packet transfer parameters are endian independent at the word (32 bit) level only. Transfer controller 80 will always fetch and store packet transfer parameters as double-word (64 bit) transfers. Transfer controller 80 will swap 32 bit words according to the selected endian. Any 16 bit quantities within words such as A Count and B Count are not swapped according to the endian because the field containing these values is considered to be a single 32 bit quantity. Likewise, the 64 bit transparency word and 64 bit color register value field is always treated as a single 64 bit quantity and its bytes are not swapped according to the endian.

Local memory read and write cycles are used to transfer data and instructions between memory and multiprocessor integrated circuit 100. These cycles can occur as a result of a packet transfer, a cache request, or a direct external access request to transfer controller 80. Read cycles transfer data from memory to multiprocessor integrated circuit 100. Transfer controller 80 outputs "00000" on STATUS[4:0] at the beginning of the cycle to indicate that a read is occurring. During the cycle, $\overline{WE}$ is held inactive high, $\overline{TRG}$ is driven low after the fall of $\overline{RAS}$ to enable memory output drivers and $\overline{DDIN}$ is active low during the cycle so that data and transceivers will drive into multiprocessor integrated circuit 100. Transfer controller 80 switches D[63:0] to high impedance to allow it to be driven from the memory and latches input data during the appropriate column state. Transfer controller 80 always reads a 64 bit double-word and then extracts and aligns the appropriate data bytes. Thus for bus sizes less than 64 bits the invalid bytes are discarded.

Figure 39:
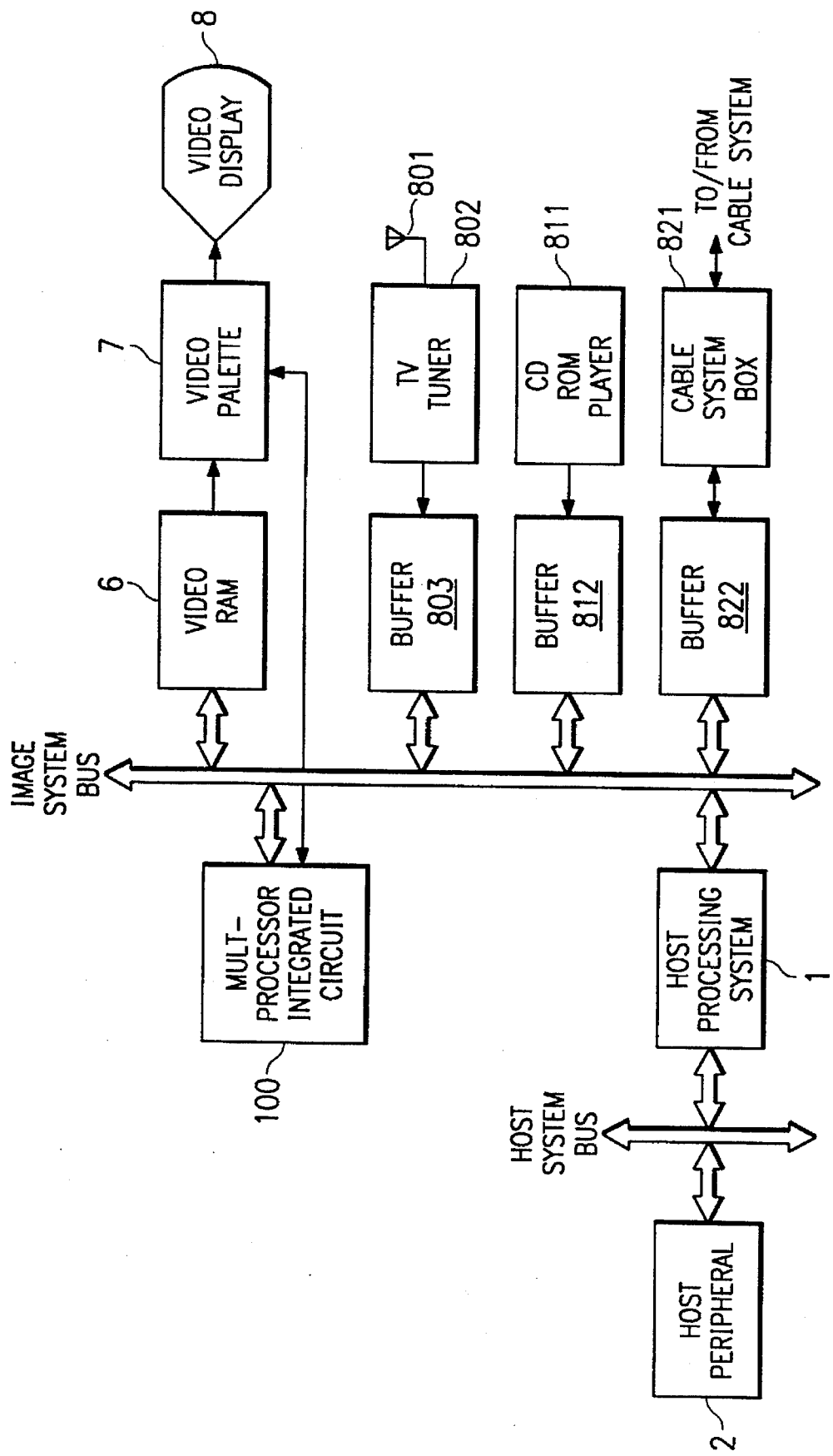
FIG. 39 illustrates an example embodiment of a high definition television system.

FIG. 39 illustrates use of multiprocessor integrated circuit 100 of this invention in a high definition television system. FIG. 39 illustrates three sources of high definition television signals. These are broadcast television signals, compact disk read only memory signals and cable television signals.

Antenna 801 receives broadcast radio frequency signals including high definition television signals. Television tuner 802 includes a tuned receiver which selects a particular radio frequency signal, a demodulator that extracts image data encoded on the radio frequency signal and an analog to digital converter. Television tuner 802 thus generates digital signals corresponding to the high definition television images. These digital signals are temporarily stored in buffer 803, which is also connected to the image system bus.

Compact disk read only memory (CD ROM) player 811 reads data permanently stored on compact disks. These include image data corresponding to the desired high definition television program. Compact disk read only memory player 811 supplies digital data read from the compact disk to buffer 812 for temporary storage. Buffer 812 is also connected to the image system bus.

Cable system box 821 is bidirectionally connect to a cable system. This bidirectional connection permits transmission of high definition television signals to the user from the cable system and transmission of requests, queries and the like from the user to the cable system. The cable system may employ digital transmission to the user or may include radio frequency transmission similar to the radio frequency broadcasts mentioned above. Cable system box 821 includes any needed conversion circuits to supply digital image data to buffer 822 for temporary storage. Note that buffer 822 is also connected to the image system bus.

High definition television will very likely be transmitted in a data compressed format regardless of the mode of transmission. Multiprocessor integrated circuit 100 is programmed to receive the compressed data, decompress this data into individual television frames and supply the frame data to video random access memory 6. As previously described above, this data is recalled from video random access memory 6 and supplied to video palette 7. Video palette 7 generates the proper video signals to drive video display 8. This process of decompressing the image data as supplying it for display includes a lot of data movement both within multiprocessor integrated circuit 100 and along the image system bus. Transfer controller 80 response to requests for packet transfers from master processor 60 and digital image/graphics processors 71, 72, 73 and 74 to control this data movement and coordinate this data movement with other image system bus use such as memory refresh.

FIG. 40 illustrates an another system embodiment of this invention. In FIG. 40 multiprocessor integrated circuit 101 includes master processor 60 and a single digital image/graphics processor 71. Multiprocessor integrated circuit 101 requires less silicon substrate area than multiprocessor integrated circuit 100 and consequently can be constructed less expensively. Multiprocessor integrated circuit 101 is constructed using the same techniques as previously noted for construction of multiprocessor integrated circuit 100. Because the width of each digital image/graphics processor matches the width of its corresponding memory and the associated portions of crossbar 50, multiprocessor integrated circuit 100 may be cut between digital image/graphics processors 71 and 72 to obtain the design of multiprocessor integrated circuit 101. Multiprocessor integrated circuit 101 can be employed for applications when the processing capacity of four digital image/graphics processors is not required.

Multiprocessor integrated circuit 101 is illustrated in FIG. 40 as part of a color facsimile apparatus. Modem 1301 is bidirectionally coupled to a telephone line for sending and receiving. Modem 1301 also communicates with buffer 1302, which is further coupled the image system bus. Modem 1301 receives a facsimile signal via the telephone line. Modem 1301 demodulates these signals, which are then temporarily stored in buffer 1302. Transfer controller 80 services buffer 1302 by transferring data to data memories 22, 23 and 24 for processing by digital image/graphics processor 71. In the event that digital image/graphics processor 71 cannot keep ahead of the incoming data, transfer controller 80 may also transfer data from buffer 1302 to memory 9. Digital image/graphics processor 71 processes the image data of the incoming facsimile. This may include image decompression, noise reduction, error correction, color base correction and the like. Once processed, transfer controller 80 transfers image data from data memories 22, 23 and 24 to video random access memory (VRAM) 1303. Printer controller 1304 recalls the image data under control of frame controller 90 and supplies it to color printer 1305, which forms the hard copy.

The apparatus of FIG. 40 can also send a color facsimile. Imaging device 3 scans the source document. Imaging device 3 supplies the raw image data to image capture controller 4 that operates under control of frame controller 90. This image data is stored in video random access memory 1303. Note that the embodiment illustrated in FIG. 40 shares video random access memory 1303 for both image capture and image display in contrast to the embodiment of FIG. 1, which uses separate video random access memories. Transfer controller 80 transfers this image data to data memories 22, 23 and 24. Digital image/graphics processor 71 then processes the image data for image compression, error correction redundancy, color base correction and the like. The processed data is transferred to buffer 1302 by transfer controller 80 as needed to support the facsimile transmission. Depending upon the relative data rates, transfer controller 80 may temporarily store data in memory 9 before transfer to buffer 1302. This image data in buffer 1302 is modulated by modem 1301 and transmitted via the telephone line.

Note that the presence of an imaging device and a color printer in the same system permits this system to also operate as a color copier. In this event data compression and decompression may not be required. However, digital image/graphics processor 71 is still useful for noise reduction and color base correction. It is also feasible for digital image/graphics processor 71 to be programmed to deliberately shift colors so that the copy has different coloring than the original. This technique, known as false coloring, is useful to conform the dynamic range of the data to the dynamic range of the available print colors.

We claim:

1. A data processing device comprising:

an internal memory storing data at a plurality of corresponding addresses, said plurality of addresses of said internal memory including a subset of internal addresses less than all possible addresses;

an external memory interface operative to access an external memory having addresses not within said subset of internal addresses, wherein said internal memory and external memory comprise a single address space;

packet transfer parameters stored at a predetermined set of addresses in said internal memory, said packet transfer parameters including an indication of a number of guide table entries and an initial table pointer indicating an address in said internal memory;

a control circuit operative to receive a packet transfer request and connected to said internal memory to receive packet transfer parameters;

a guide table including said number of guide table entries indicated in said packet transfer parameters, each guide table entry stored in said internal memory beginning at an initial address and including a start address, an address value and dimension values defining a block of addresses, each guide table entry including a table pointer indicating an initial address of a next guide table entry, a first guide table entry having an initial address corresponding to said table pointer of said packet transfer parameters; and an address generating circuit coupled to said control circuit, said internal memory and said external memory interface, said address generating circuit operative to receive said number of guide table entries and said table pointer from said packet transfer parameters, said address generating circuit forming a set of block of addresses for memory access corresponding said guide table entry by forming a block start address from a predetermined combination of said start address and said address value of said guide table entry pointed to by said table pointer, said first block start address being said start address, forming a block of addresses from said block start address and said dimension values of said guide table entry pointed to by said table pointer, performing a memory access at said block of addresses, and replacing said table pointer with said table pointer of said current guide table entry to point to a next entry in said guide table following said memory access if less memory accesses than said number of guide table entries have been performed;

said address generating circuit generating addresses within both said subset of internal addresses of said internal memory and not within said subset of internal addresses corresponding to external memory, said address generating circuit accessing said external memory via said external memory interface.

2. The data processing device of claim 1, wherein:

said address generating circuit forms said predetermined combination of said starting address and said address value of said guide table entry pointed to by said table pointer by adding said address value to said prior block starting address.

3. The data processing device of claim 1, wherein:

said address generating circuit forms said predetermined combination of said starting address and said address value of said guide table entry pointed to by said table pointer by adding said guide table value pointed to by said table pointer to said starting address.

4. The data processing device of claim 1, wherein:

said dimension values of each guide table entry comprise a horizontal dimension value and a vertical dimension value of an array of pixels.

5. The data processing device of claim 1, wherein:

said memory access consists of a memory read from said block of addresses.

6. The data processing device of claim 1, wherein:

said memory access consists of a memory write to said block of addresses.

7. An integrated circuit comprising on a single semiconductor chip:

an internal memory storing data at a plurality of corresponding addresses, said plurality of addresses including a subset of internal addresses less than all possible addresses;

an external memory interface operative to access external memory not included on said single semiconductor chip having addresses not within said subset of internal addresses, wherein said internal memory and external memory comprise a single address space;

packet transfer parameters stored at a predetermined set of addresses in said internal memory, said packet transfer parameters including an indication of a number of guide table entries and an initial table pointer indicating an address in said internal memory;

a guide table including said number of guide table entries indicated in said packet transfer parameters, each guide table entry stored in said internal memory beginning at an initial address and including a start address, an address value and dimension values defining a block of addresses, each guide table entry including a table pointer indicating an initial address of a next guide table entry, a first guide table entry having an initial address corresponding to said table pointer of said packet transfer parameters;

a data processor having circuitry for generating packet transfer requests;

a data transfer controller connected to said internal memory, said external memory interface and said data processor, said data transfer controller including a control circuit operative to receive a packet transfer request and initiate a packet transfer; and an address generating circuit coupled to said control circuit, said internal memory and said external memory interface, said address generating circuit operative to receive said number of guide table entries and said table pointer from said packet transfer parameters, said address generating circuit forming a set of block of addresses for memory access corresponding said guide table entry by forming a block start address from a predetermined combination of said start address and said address value of said guide table entry pointed to by said table pointer, said first block start address being said start address, forming a block of addresses from said block start address and said dimension values of said guide table entry pointed to by said table pointer, performing a memory access at said block of addresses, and replacing said table pointer with said table pointer of said current guide table entry to point to a next entry in said guide table following said memory access if less memory accesses than said number of guide table entries have been performed;

said address generating circuit generating addresses within both said subset of internal addresses of said memory and not within said subset of internal addresses corresponding to external memory, said address generating circuit accessing said external memory via said external memory interface.

8. The integrated circuit of claim 7, wherein:

said address generating circuit forms said predetermined combination of said starting address and said address value of said guide table entry pointed to by said table pointer by adding said address value to said prior block starting address.

9. The integrated circuit of claim 7, wherein:

said address generating circuit forms said predetermined combination of said starting address and said address value of said guide table entry pointed to by said table pointer by adding said guide table value pointed to by said table pointer to said starting address.

10. The integrated circuit of claim 7, wherein:

said dimension values of each guide table entry comprise a horizontal dimension value and a vertical dimension value of an array of pixels.

11. The integrated circuit of claim 7, wherein:

said memory access consists of a memory read from said block of addresses.

12. The integrated circuit of claim 7, wherein:

said memory access consists of a memory write to said block of addresses.

13. A data processing device comprising:

an internal memory storing data at a plurality of corresponding addresses, said plurality of addresses of said internal memory including a subset of internal addresses less than all possible addresses;

an external memory interface operative to access an external memory having addresses not within said subset of internal addresses, wherein said internal memory and external memory comprise a single address space;

packet transfer parameters stored at a predetermined set of addresses in said internal memory, said packet transfer parameters including an indication of a number of guide table entries and an initial table pointer indicating an address in said internal memory;

a guide table including said number of guide table entries indicated in said packet transfer parameters, each guide table entry stored in said internal memory beginning at an initial address and including a source start address, a source address value and source dimension values defining a source block of addresses and a destination start address, a destination address value and destination dimension values defining a destination block of addresses, each guide table entry including a table pointer indicating an initial address of a next guide table entry, a first guide table entry having an initial address corresponding to said table pointer of said packet transfer parameters; and an address generating circuit coupled to said control circuit and to said internal memory, said address generating circuit operative to receive said number of guide table entries and said table pointer from said packet transfer parameters, said address generating circuit forming a set of source and destination block of addresses for memory access corresponding said guide table entry by forming a source block start address from a predetermined combination of said source start address and said source address value of said guide table entry pointed to by said table pointer, said first source block start address being said start address, forming a block of source addresses from said source block start address and said source dimension values of said guide table entry pointed to by said table pointer, forming a destination block start address from a predetermined combination of said destination start address and said destination address value of said guide table entry pointed to by said table pointer, said first destination block start address being said start address, forming a block of destination addresses from said destination block start address and said destination dimension values of said guide table entry pointed to by said table pointer, performing a memory transfer of data from said block of source addresses to said block of destination addresses, and replacing said table pointer with said table pointer of said current guide table entry to point to a next entry in said guide table following said memory access if less memory accesses than said number of guide table entries have been performed;

said address generating circuit generating addresses within both said subset of internal addresses of said internal memory and not within said subset of internal addresses corresponding to external memory, said address generating circuit accessing said external memory via said external memory interface.

14. The data processing device of claim 13, wherein:

said address generating circuit forms said predetermined combination of said source starting address and said source address value of said guide table entry pointed to by said table pointer by adding said source address value to said prior source block starting address.

15. The data processing device of claim 13, wherein:

said address generating circuit forms said predetermined combination of said destination starting address and said destination address value of said guide table entry pointed to by said table pointer by adding said destination address value to said prior destination block starting address.

16. The data processing device of claim 13, wherein:

said address generating circuit forms said predetermined combination of said source starting address and said source address value of said guide table entry pointed to by said table pointer by adding said source address value to said starting address.

17. The data processing device of claim 13, wherein:

said address generating circuit forms said predetermined combination of said destination starting address and said destination address value of said guide table entry pointed to by said table pointer by adding said destination address value to said starting address.

18. The data processing device of claim 13, wherein:

said source dimension values of each guide table entry comprise a horizontal source dimension value and a vertical source dimension value of an array of pixels; and said destination dimension values of each guide table entry comprise a horizontal destination dimension value and a vertical destination dimension value of an array of pixels.

19. An integrated circuit comprising on a single semiconductor chip:

an internal memory storing data at a plurality of corresponding addresses, said plurality of addresses including a subset of internal addresses less than all possible addresses;

an external memory interface operative to access external memory not included on said single semiconductor chip having addresses not within said subset of internal addresses, wherein said internal memory and external memory comprise a single address space;

packet transfer parameters stored at a predetermined set of addresses in said internal memory, said packet transfer parameters including an indication of a number of guide table entries and an initial table pointer indicating an address in said internal memory;

a guide table including said number of guide table entries indicated in said packet transfer parameters, each guide table entry stored in said internal memory beginning at an initial address and including a source start address, a source address value and source dimension values defining a source block of addresses and a destination start address, a destination address value and destination dimension values defining a destination block of addresses, each guide table entry including a table pointer indicating an initial address of a next guide table entry, a first guide table entry having an initial address corresponding to said table pointer of said packet transfer parameters; and a data processor having circuitry for generating packet transfer requests;

a data transfer controller connected to said internal memory and a said data processor, said data transfer controller including a control circuit operative to receive a packet transfer request and initiate a packet transfer; and an address generating circuit coupled to said control circuit and to said internal memory, said address generating circuit operative to receive said number of guide table entries and said table pointer from said packet transfer parameters, said address generating circuit forming a set of block of addresses for memory access corresponding said guide table entry by forming a source block start address from a predetermined combination of said source start address and said source address value of said guide table entry pointed to by said table pointer, said first source block start address being said start address, forming a block of source addresses from said source block start address and said source dimension values of said guide table entry pointed to by said table pointer, forming a destination block start address from a predetermined combination of said destination start address and said destination address value of said guide table entry pointed to by said table pointer, said first destination block start address being said start address, forming a block of destination addresses from said destination block start address and said destination dimension values of said guide table entry pointed to by said table pointer, performing a memory transfer of data from said block of source addresses to said block of destination addresses, and replacing said table pointer with said table pointer of said current guide table entry to point to a next entry in said guide table following said memory access if less memory accesses than said number of guide table entries have been performed;

said address generating circuit generating addresses within both said subset of internal addresses of said internal memory and not within said subset of internal addresses corresponding to external memory, said address qeneratinq circuit accessing said external memory via said external memory interface.

20. The integrated circuit of claim 19, wherein:

said address generating circuit forms said predetermined combination of said source starting address and said source address value of said guide table entry pointed to by said table pointer by adding said source address value to said prior source block starting address.

21. The integrated circuit of claim 19, wherein:

said address generating circuit forms said predetermined combination of said destination starting address and said destination address value of said guide table entry pointed to by said table pointer by adding maid destination address value to said prior destination block starting address.

22. The integrated circuit of claim 19, wherein:

said address generating circuit forms said predetermined combination of said source starting address and said source address value of said guide table entry pointed to by said table pointer by adding said source address value to said starting address.

23. The integrated circuit of claim 19, wherein:

said address generating circuit forms said predetermined combination of said destination starting address and said destination address value of said guide table entry pointed to by said table pointer by adding said destination address value to said starting address.

24. The integrated circuit of claim 19, wherein:

said source dimension values of each guide table entry comprise a horizontal source dimension value and a vertical source dimension value of an array of pixels; and said destination dimension values of each guide table entry comprise a horizontal destination dimension value and a vertical destination dimension value of an array of pixels.

* * * * *